US012670648B2

(12) United States Patent (10) Patent No.: US 12,670,648 B2
Ma et al. (45) Date of Patent: Jun. 30, 2026

(54) METHOD AND APPARATUS FOR PROCESSING ROTATION ANIMATION SPECIAL EFFECT, AND READABLE STORAGE MEDIUM

(71) Applicant: BEIJING ZITIAO NETWORK TECHNOLOGY CO., LTD., Beijing (CN)

(72) Inventors: Ruifeng Ma, Beijing (CN); Weifeng Huang, Beijing (CN); Zongren Dong, Beijing (CN); Yuan Xu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 253 days.

(21) Appl. No.: 18/567,632

(22) PCT Filed: Jun. 20, 2022

(86) PCT No.: PCT/CN2022/099693
§ 371 (c)(1),
(2) Date: Dec. 6, 2023

(87) PCT Pub. No.: WO2023/273930
PCT Pub. Date: Jan. 5, 2023

(65) Prior Publication Data
US 2024/0282036 A1 Aug. 22, 2024

(30) Foreign Application Priority Data

Jun. 29, 2021 (CN) .......................... 202110726972.9
Jun. 29, 2021 (CN) .......................... 202110729961.6

(51) Int. Cl.
*G06T 13/80* (2011.01)
*G06T 13/20* (2011.01)

(52) U.S. Cl.
CPC .............. *G06T 13/80* (2013.01); *G06T 13/20* (2013.01)

(58) Field of Classification Search
None
See application file for complete search history.

(56) References Cited

U.S. PATENT DOCUMENTS

2009/0046097 A1 2/2009 Franklin
2020/0285858 A1 9/2020 Xu et al.

FOREIGN PATENT DOCUMENTS

CN 108259496 A 7/2018
CN 109035373 A 12/2018
(Continued)

OTHER PUBLICATIONS

Joona Raappana; "Great Particles and How to Make Them: Development of guidelines for the Unity Particle System." (2018). (Year : 2018).*

(Continued)

*Primary Examiner* — Peter Hoang
(74) *Attorney, Agent, or Firm* — Astute IP Law Group

(57) ABSTRACT

The present disclosure relates to a method and apparatus for processing a rotation animation special effect, and a readable storage medium. The method comprises: obtaining an object to be rotated; displaying a rotation parameter configuration window, and associating said object with the rotation parameter configuration window, the rotation parameter configuration window comprising a plurality of configuration items for generating a target rotation animation special effect; and generating a configuration file of the target rotation animation special effect according to configuration information of the plurality of configuration items, the target rotation animation special effect being an animation special effect of rotating said object with a rotation point as the center.

20 Claims, 25 Drawing Sheets

(56)                    References Cited

FOREIGN PATENT DOCUMENTS

| CN | 109064387 A | 12/2018 |
| CN | 110225246 A | 9/2019 |
| CN | 108388434 B | 3/2021 |
| CN | 112991146 A | 6/2021 |
| CN | 108388424 B | 9/2021 |
| EP | 0449469 A2 | 10/1991 |
| EP | 3629140 A1 | 4/2020 |

OTHER PUBLICATIONS

International Search Report and Written Opinion issued in PCT/CN2022/099693, dated Sep. 7, 2022, with English translation, 15 pages provided.
Office Action received for Chinese Patent Application No. 202110726972.9, mailed on Dec. 11, 2025, 18 pages (9 pages of English Translation and 9 pages of Original Document).

* cited by examiner

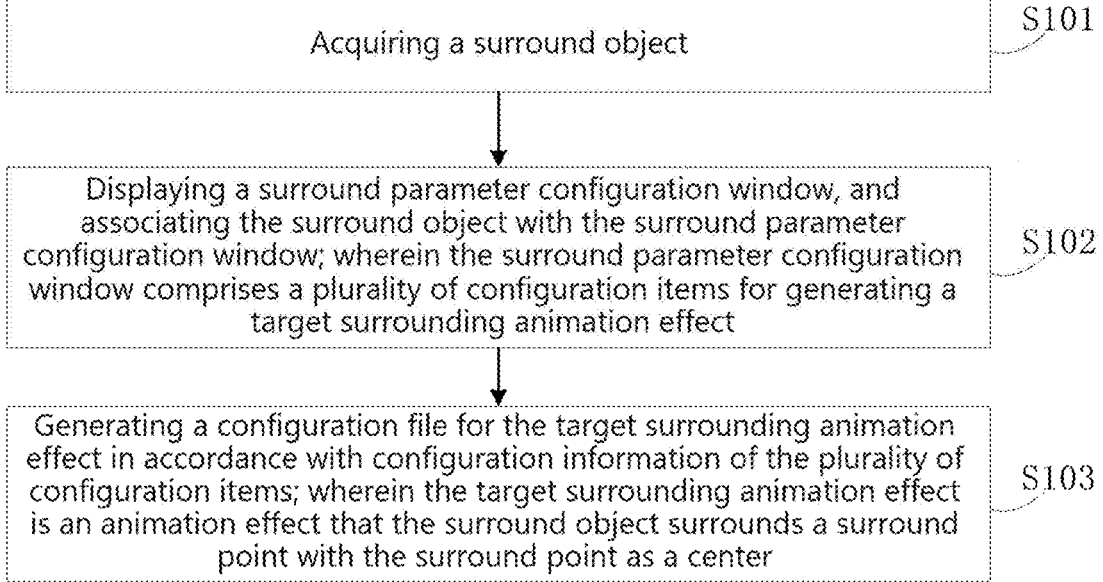

Acquiring a surround object                                                    S101

Displaying a surround parameter configuration window, and
associating the surround object with the surround parameter
configuration window; wherein the surround parameter configuration     S102
window comprises a plurality of configuration items for generating a
target surrounding animation effect Generating a configuration file for the target surrounding animation
effect in accordance with configuration information of the plurality of
configuration items; wherein the target surrounding animation effect    S103
is an animation effect that the surround object surrounds a surround
point with the surround point as a center

Fig.1

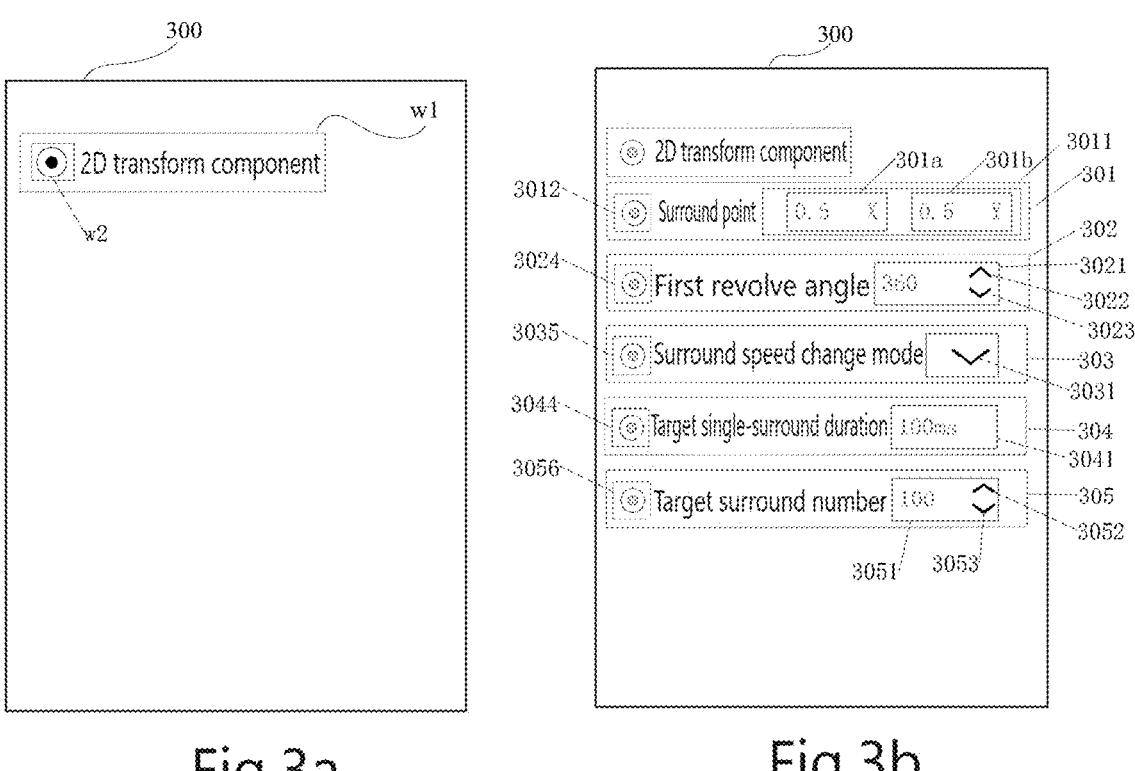
Fig.3a
Fig.3b
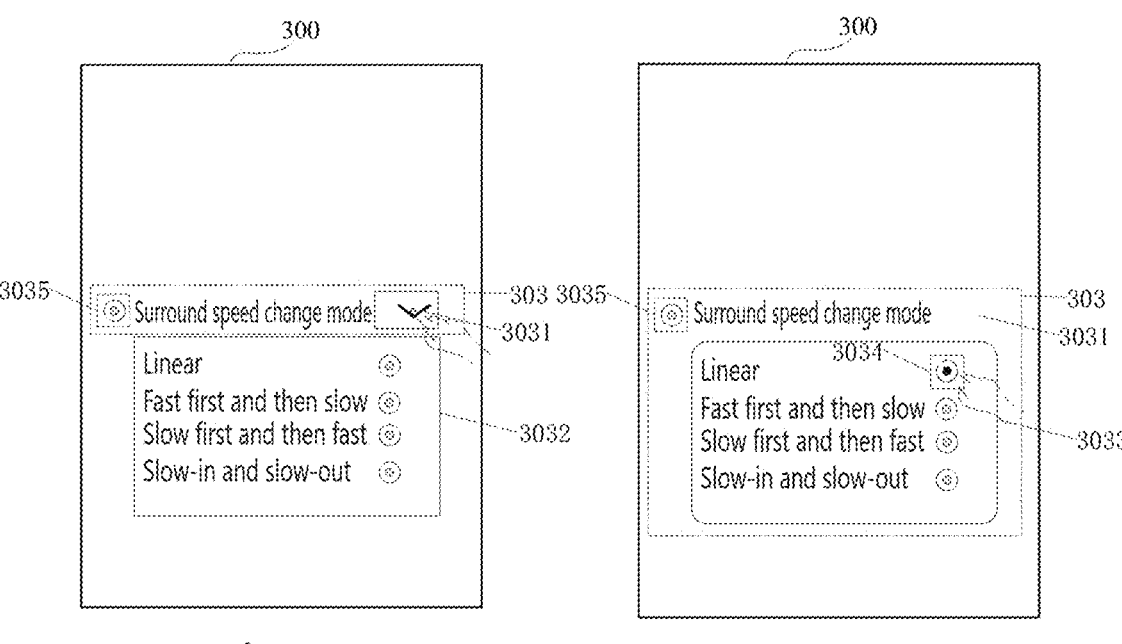
Fig.3c
Fig.3d

300
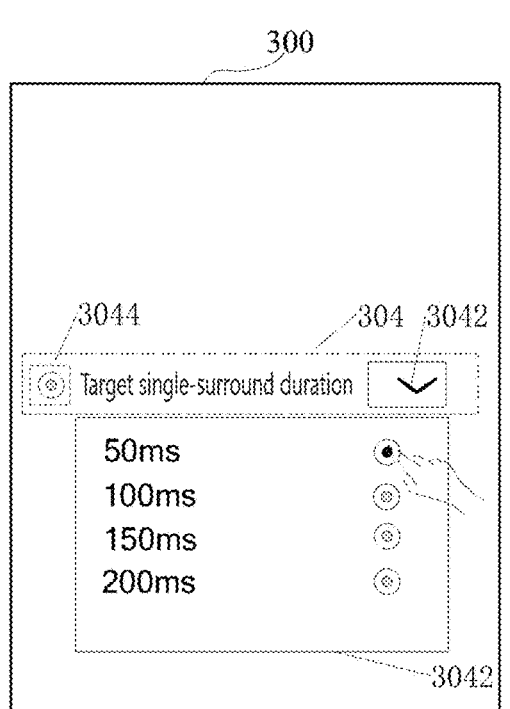
Fig.3e
300
Fig.3f
300
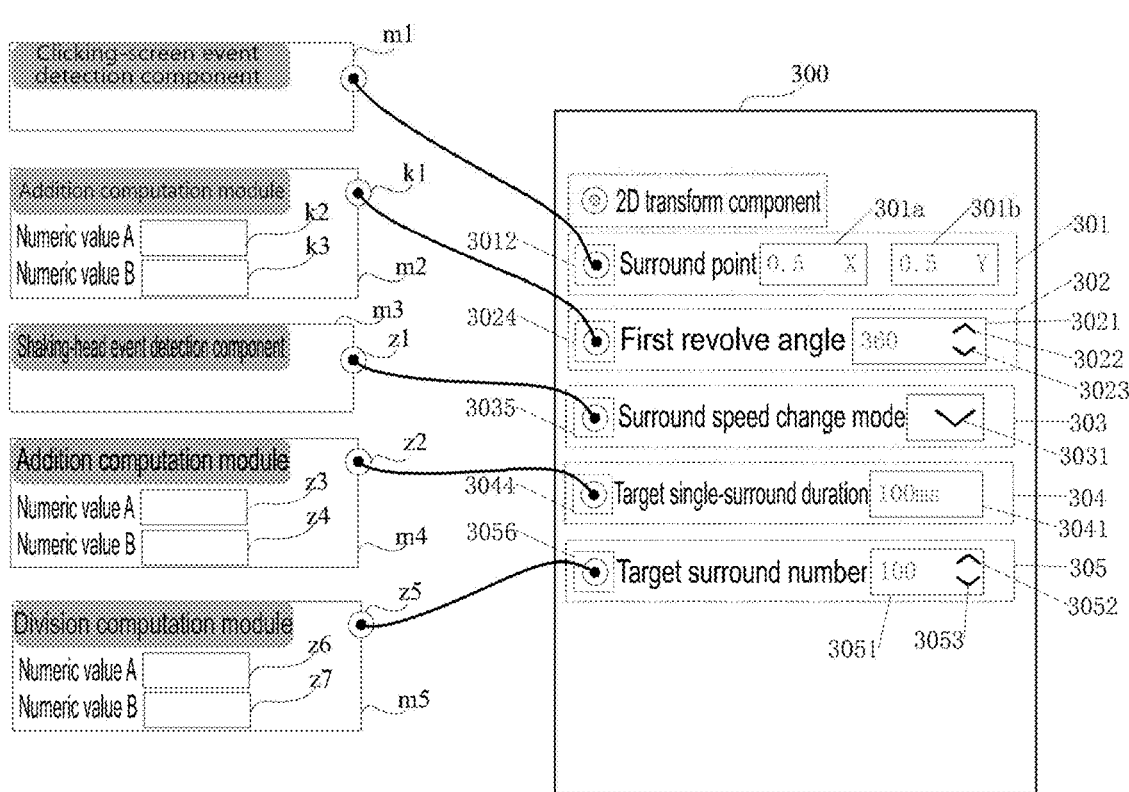
Fig.3g

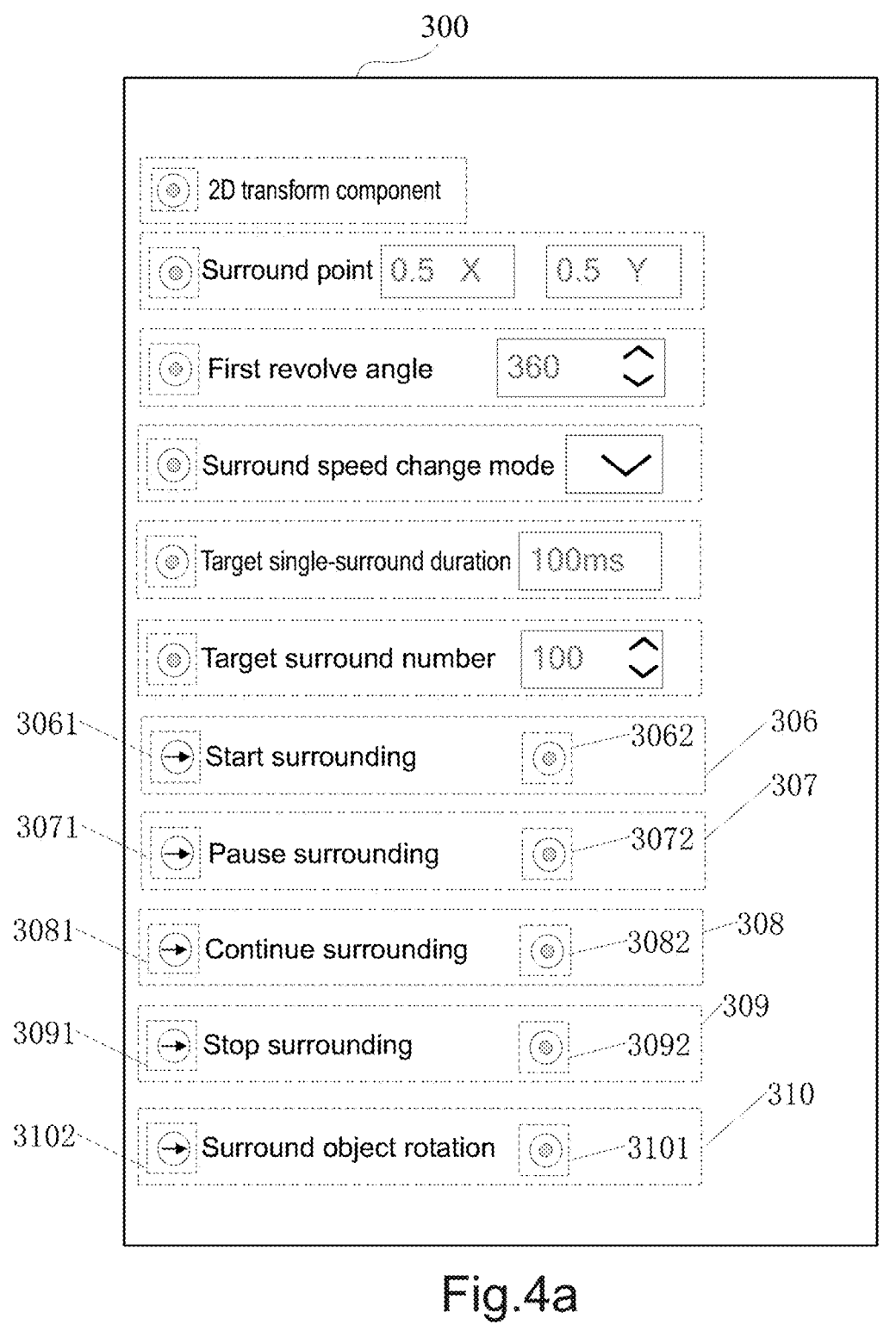

300

2D transform component

Surround point    0.5  X        0.5  Y

First revolve angle        360

Surround speed change mode

Target single-surround duration    100ms

Target surround number        100

3061    Start surrounding        3062        306

3071    Pause surrounding        3072        307

3081    Continue surrounding        3082        308

3091    Stop surrounding        3092        309

3102    Surround object rotation        3101        310

Fig.4a

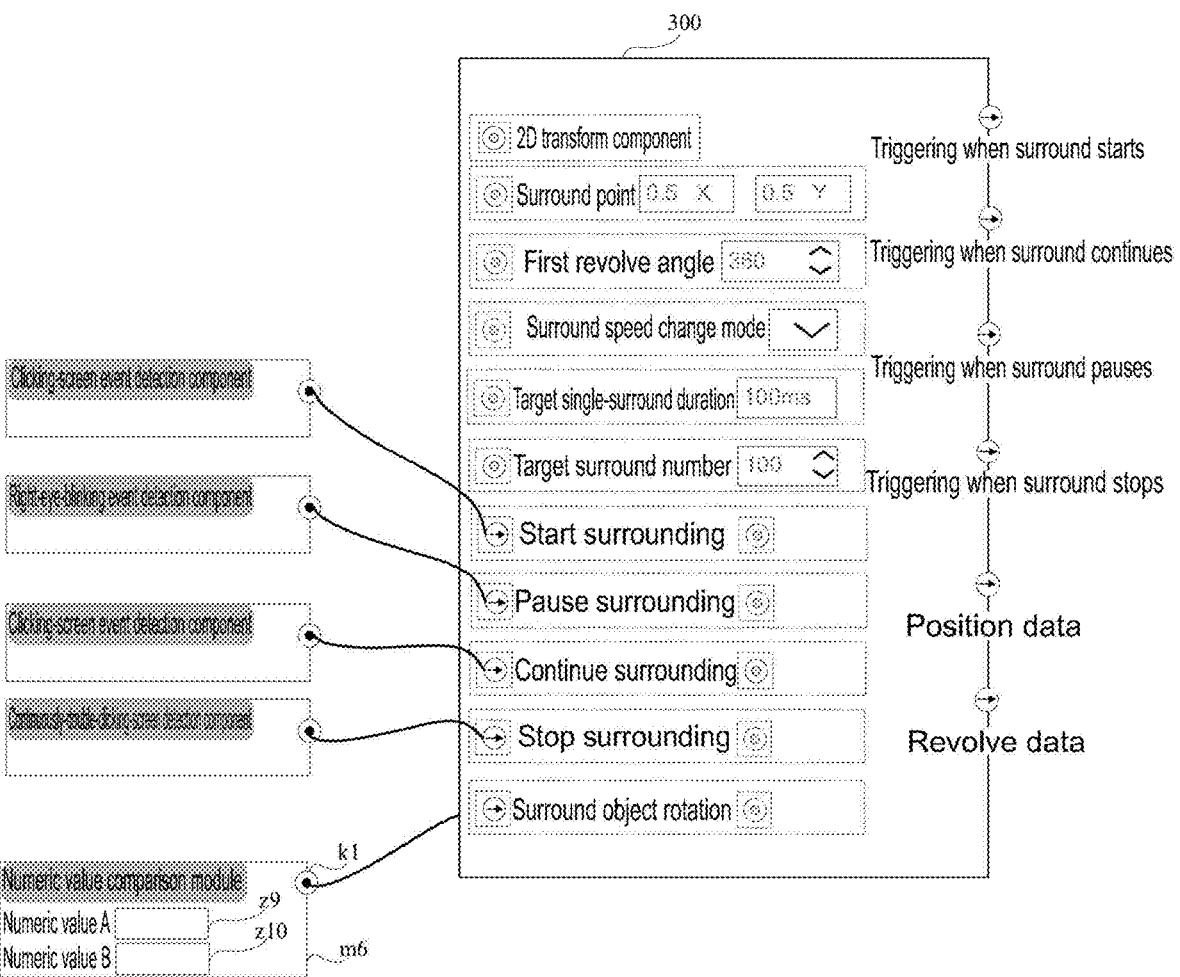
Fig.4b
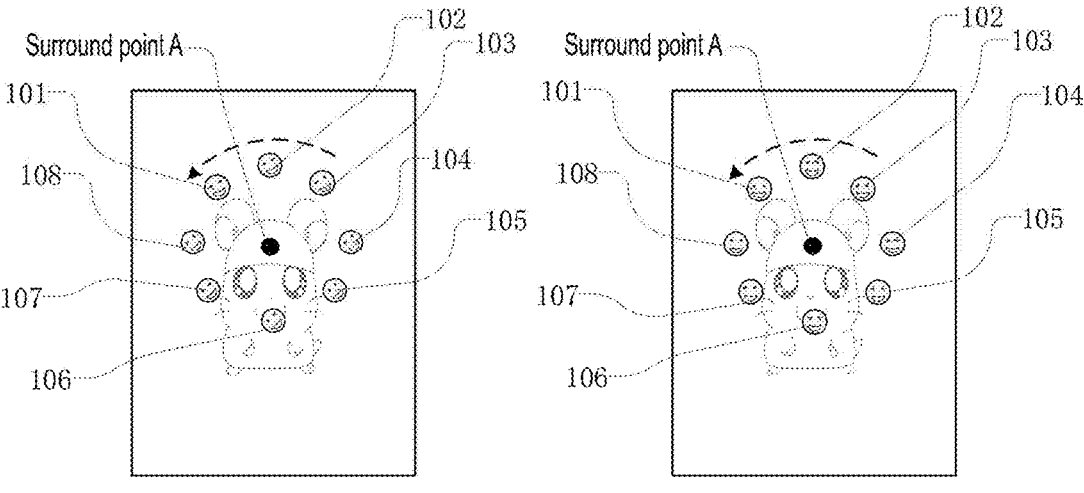
Fig.5a                    Fig.5b

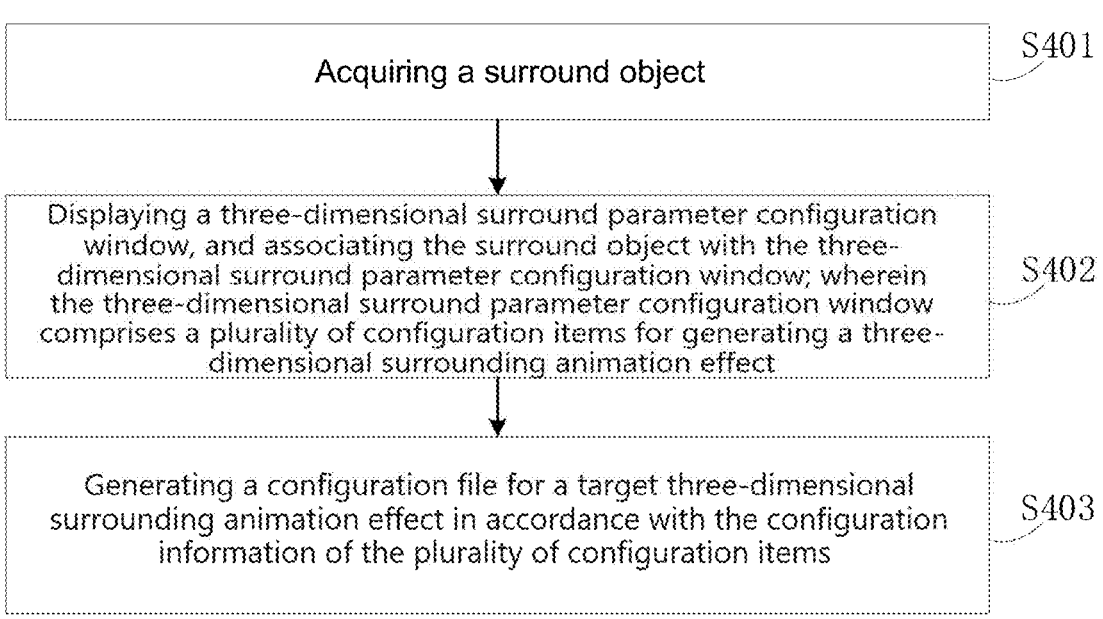

| | |
|---|---|
| Acquiring a surround object | S401 |
| Displaying a three-dimensional surround parameter configuration window, and associating the surround object with the three-dimensional surround parameter configuration window; wherein the three-dimensional surround parameter configuration window comprises a plurality of configuration items for generating a three-dimensional surrounding animation effect | S402 |
| Generating a configuration file for a target three-dimensional surrounding animation effect in accordance with the configuration information of the plurality of configuration items | S403 |

Fig.11

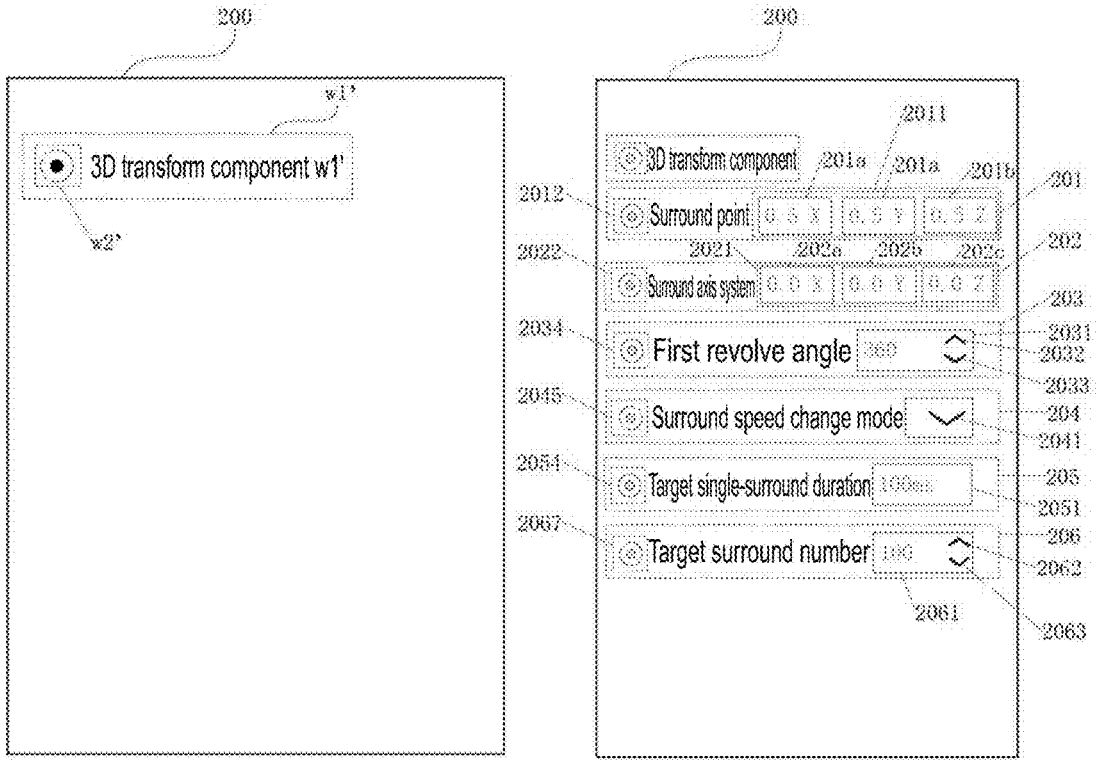

3D transform component

Surround point

Surround axis system   0.0 X   0.0 Y   0.0 Z

First revolve angle

Surround speed change mode

Target single-surround duration

Target surround number

2071   Start surrounding   2072   207

2081   Pause surrounding   2082   208

2091   Continue surrounding   2091   209

2101   Stop surrounding   2102   210

2112   Surround object rotation   2111   211

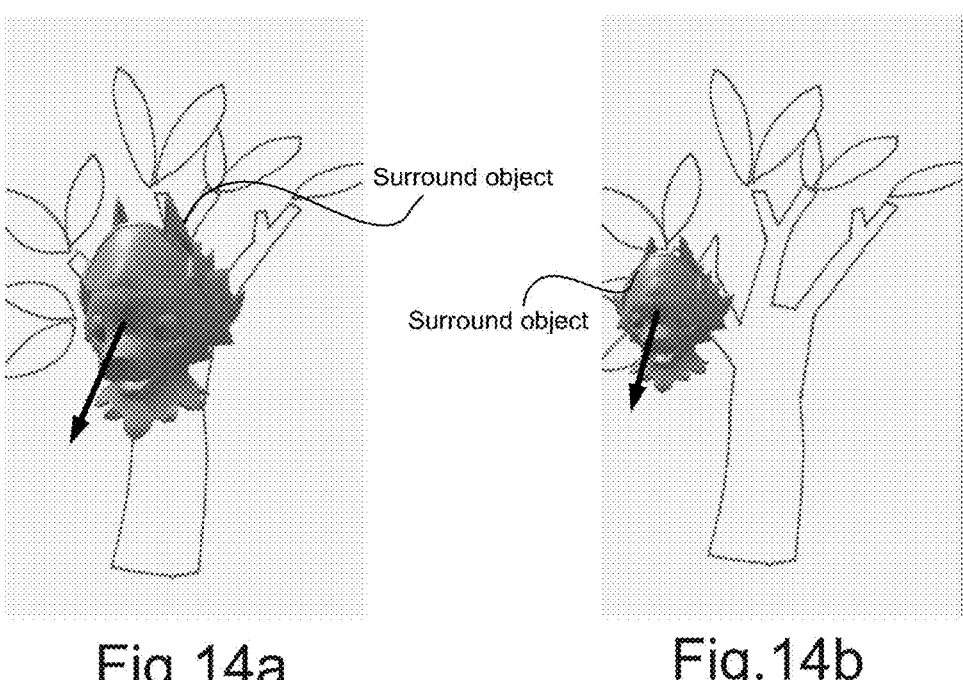
Fig.14a                    Fig.14b
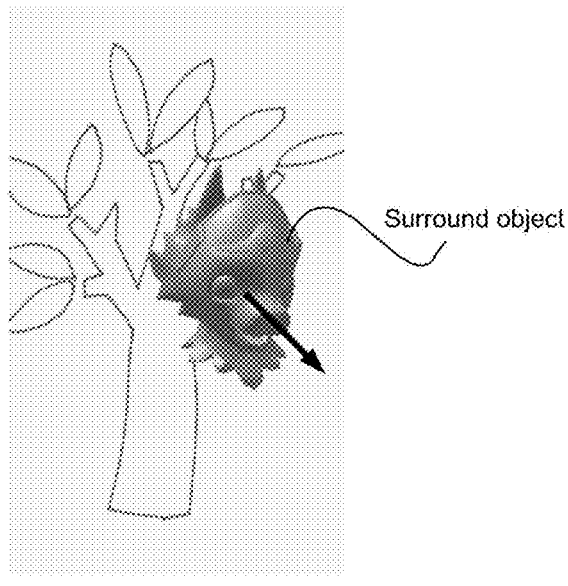
Fig.14c

Effect editing interface

Effect editing interface

Effect editing interface

Effect editing interface

Effect editing interface

Effect editing interface

METHOD AND APPARATUS FOR PROCESSING ROTATION ANIMATION SPECIAL EFFECT, AND READABLE STORAGE MEDIUM

CROSS-REFERENCE TO RELATED APPLICATIONS

This application is a U.S. National Stage under 35 U.S.C. § 371 of International Application No. PCT/CN2022/099693, as filed on Jun. 20, 2022, which is based on and claims the priority to the Chinese Patent Application No. 202110729961.6 entitled "METHOD AND APPARATUS FOR PROCESSING ROTATION ANIMATION SPECIAL EFFECT, AND READABLE STORAGE MEDIUM" filed on Jun. 29, 2021 and the Chinese Patent Application No. 202110726972.9 entitled "METHOD AND APPARATUS FOR PROCESSING ROTATION ANIMATION SPECIAL EFFECT, AND READABLE STORAGE MEDIUM" filed on Jun. 29, 2021. The disclosure of each of these applications is incorporated herein by reference in its entirety.

TECHNICAL FIELD

The present disclosure relates to the field of Internet technology, and in particular, to a method and apparatus for processing a surrounding animation effect, and a readable storage medium.

BACKGROUND

When a user performs creation using an application with a video editing function, he often uses some effects, so that the video creation is more interesting. A two-dimensional (2D) surrounding animation effect is an effect that is popular among people, which specifically refers to an effect that a surrounding object (for example, a sticker, an ornamental character, or the like) revolves around a certain point on a two-dimensional plane. In addition, a three-dimensional (3D) surrounding animation effect is also an effect that is popular among people, which specifically refers to an effect that a surrounding object (for example, a sticker, an orna-mental character, or the like) revolves in a virtual three-dimensional space.

SUMMARY

The present disclosure provides a method and apparatus for processing a surrounding animation effect, and a read-able storage medium.

In a first aspect, the present disclosure provides a method for processing a surrounding animation effect, comprising:
  acquiring a surrounding object;
  displaying a surrounding parameter configuration win-dow, and associating the surrounding object with the surrounding parameter configuration window; wherein the surrounding parameter configuration window com-prises a plurality of configuration items for generating a target surrounding animation effect; and
  generating a configuration file for the target surrounding animation effect in accordance with configuration information of the plurality of configuration items; wherein the target surrounding animation effect is an animation effect that the surrounding object surrounds a surrounded point with the surrounded point as a center.

In a second aspect, the present disclosure provides an apparatus for processing a surrounding animation effect, comprising:
  an acquiring module configured to acquire a surrounding object;
  a displaying module configured to display a surrounding parameter configuration window; and
  a processing module configured to associate the surround-ing object with the surrounding parameter configura-tion window; wherein the surrounding parameter con-figuration window comprises a plurality of configuration items for generating a target surrounding animation effect;
  wherein the processing module is further configured to generate a configuration file for the target surrounding animation effect in accordance with configuration information of the plurality of configuration items; wherein the target surrounding animation effect is an animation effect that the surrounding object surrounds a surrounded point with the surrounded point as a center.

In a third aspect, the present disclosure provides an electronic device, comprising: a memory and a processor, wherein the memory is configured to store computer pro-gram instructions, and the processor is configured to execute the computer program instructions to implement the method in accordance with the first aspect.

In a fourth aspect, the present disclosure provides a non-transitory readable storage medium, comprising: com-puter program instructions which, when executed by at least one processor of an electronic device, implement the method in accordance with the first aspect.

In a fifth aspect, the present disclosure provides a com-puter program product, comprising a computer program which, when executed by a processor, implements the method in accordance with the first aspect.

In a sixth aspect, the present disclosure provides a com-puter program which, when executed by a processor, imple-ments the method in accordance with the first aspect.

BRIEF DESCRIPTION OF THE DRAWINGS

The accompanying drawings herein, which are incorpo-rated in and constitute a part of this specification, illustrate embodiments consistent with the present disclosure and, together with the description, serve to explain the principles of the present disclosure.

In order to more clearly illustrate the embodiments of the present disclosure or technical solutions in the related art, the drawings that need to be used in the description of the embodiments or related art will be briefly described below, and it is apparent that for one of ordinary skill in the art, other drawings can also be acquired without paying out creative efforts.

FIG. 1 is a flowchart of a method for processing a surrounding animation effect in accordance with an embodi-ment of the present disclosure;

FIGS. 3a to 3g are schematic diagrams of a two-dimen-sional surrounding parameter configuration window in accordance with the present disclosure;

FIGS. 4a to 4b are schematic diagrams of a two-dimensional surrounding parameter configuration window in accordance with the present disclosure;

FIGS. 5a to 5b are schematic diagrams of a surrounding object in two cases of rotation and non-rotation in accordance with the present disclosure;

FIG. 11 is a flowchart of a method for processing a surrounding animation effect in accordance with an embodiment of the present disclosure;

FIGS. 12a to 12h are schematic diagrams of a three-dimensional surrounding parameter configuration window in accordance with the present disclosure;

FIGS. 14a to 14c are schematic comparison diagrams of rotation and non-rotation of a surrounding object in accordance with the present disclosure;

DETAILED DESCRIPTION

Figure 2A:
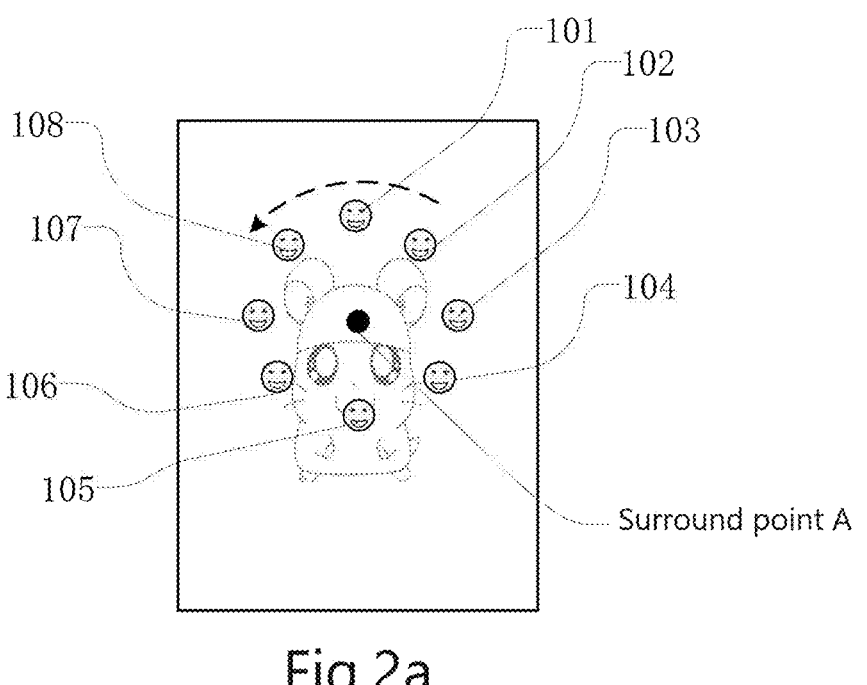
FIG. 2a is a schematic diagram of a two-dimensional surrounding animation effect in accordance with an embodi-ment of the present disclosure.

In order that the above objectives, features and advantages of the present disclosure may be more clearly understood, solutions of the present disclosure will be further described below. It should be noted that, in the case of no conflict, the embodiments of the present disclosure and features in the embodiments may be combined with each other.

In the following description, numerous specific details are set forth in order to provide thorough understanding of the present disclosure, but the present disclosure may be implemented in other ways than those described herein; and it is apparent that the embodiments in the description are only some embodiments of the present disclosure, rather that all embodiments.

In the related art, a 2D or 3D surrounding animation effect is produced and made by means of handwriting scripts, resulting in inefficient production of the 2D or 3D surrounding animation effect. In addition, due to differentiation among effect scripts written by users, it is difficult to maintain the effect scripts.

The present disclosure provides a method and apparatus for processing a surrounding animation effect, and a readable storage medium, wherein the method comprises: packaging requirements for making a two-dimensional or three-dimensional surrounding animation effect, and providing a visual two-dimensional or three-dimensional surrounding parameter configuration window for a user, thereby facilitating the operation of the user. After a component bearing a surrounding object is associated with the two-dimensional or three-dimensional surrounding parameter configuration window by the user, two-dimensional or three-dimensional surrounding parameters corresponding to the surrounding object can be configured by operating configuration items provided in the two-dimensional or three-dimensional surrounding parameter configuration window. And then, in accordance with configuration information of each configuration item in the two-dimensional or three-dimensional surrounding parameter configuration window associated with the surrounding object, a configuration file of a target two-dimensional or three-dimensional surrounding animation effect is automatically generated. As compared with the manner of handwriting scripts in the related art, the method provided by the present disclosure is more convenient and fast, and can effectively improve the production efficiency of the two-dimensional or three-dimensional surrounding animation effect. Moreover, the method provided by the present disclosure can be suitable for the production and making of the target two-dimensional or three-dimensional surrounding animation effect with any type of material as the surrounding object, and is wide in application range.

Moreover, in accordance with the method provided by the present disclosure, in an interface provided by the apparatus for processing a surrounding animation effect, association relations among the surrounding objects included in the target two-dimensional or three-dimensional surrounding animation effect can be seen.

FIG. 1 is a flowchart of a method for processing a surrounding animation effect in accordance with an embodiment of the present disclosure. Referring to FIG. 1, the method of this embodiment comprises:

S101, acquiring a surrounding object;

S102, displaying a surrounding parameter configuration window, and associating the surrounding object with the surrounding parameter configuration window; wherein the surrounding parameter configuration window comprises a plurality of configuration items for generating a target surrounding animation effect; and S103, generating a configuration file for the target surrounding animation effect in accordance with configuration information of the plurality of configuration items; wherein the target surrounding animation effect is an animation effect that the surrounding object surrounds a surrounded point with the surrounded point as a center.

Hereinafter, the situation where the target surrounding animation effect is a two-dimensional target surrounding animation effect will be described with reference to FIGS. 2a to 10; and, the situation where the target surrounding animation effect is a three-dimensional target surrounding animation effect will be described with reference to FIGS. 11 to 20.

Here, first, the 2D surrounding animation effect is exemplarily described by referring to FIG. 2a, where a surrounding object is an emoji sticker, which is on a two-dimensional plane, takes a point A as a surrounded point, and revolves in a counterclockwise direction indicated by an arrow. In a practical application, the number of the surrounding object may be one or more. The surrounding animation effect shown in FIG. 2a includes 8 emoji stickers, which are emoji stickers 101 to 108 respectively, and all take the point A as the surrounded point and revolve in the counterclockwise direction indicated by the arrow.

At present, the 2D surrounding animation effect is produced and made in a manner of handwriting scripts, and inefficiency of the handwriting scripts results in inefficiency of the production of the 2D surrounding animation effect. In addition, due to different styles of scripts written by users, it is difficult to maintain codes later.

Based on the above problems, the embodiments of the present disclosure provide a method for processing a surrounding animation effect, where requirements for a 2D surrounding animation effect are packaged in one node, and a visualized two-dimensional surrounding parameter configuration window is provided, configuration of two-dimensional surrounding parameters can be performed by operating a plurality of configuration items in the two-dimensional surrounding parameter configuration window, and a background can automatically generate an executable program file (i.e., a configuration file) corresponding to the two-dimensional surrounding animation effect in accordance with configuration information of the configuration items corresponding to the two-dimensional surrounding parameters. Due to the provision of the visualized two-dimensional surrounding parameter configuration window, the operation is simple and convenient for the user, so that the production efficiency of the 2D surrounding animation effect is effectively improved. In addition, when the surrounding animation effect is maintained later, this can be implemented by operating the two-dimensional surrounding parameter configuration window, which solves the problem of difficulty in later maintenance of handwriting scripts in the related art.

The method for processing a surrounding animation effect provided by the present disclosure can be executed by an apparatus for processing a surrounding animation effect, wherein the apparatus for processing a surrounding animation effect can be implemented by any software and/or hardware. Exemplarily, the apparatus for processing a surrounding animation effect may include an electronic device such as a tablet computer, a mobile phone (e.g., a foldable mobile phone, a large-screen mobile phone, or the like), a wearable device, an vehicle-mounted device, an augmented reality (AR)/virtual reality (VR) device, a notebook computer, an ultra-mobile personal computer (UMPC), a netbook, a smart home device, or the like. The apparatus for processing a surrounding animation effect may further include an application program.

Figure 2B:
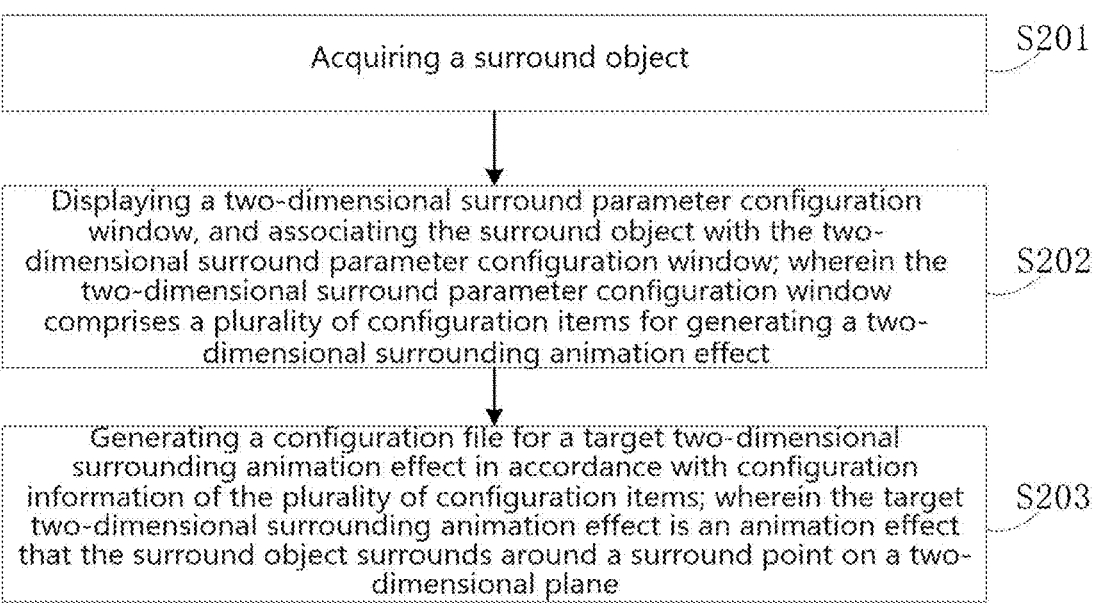
FIG. 2b is a flowchart of a method for processing a surrounding animation effect in accordance with an embodi-ment of the present disclosure.

FIG. 2b is a flowchart of a method for processing a surrounding animation effect in accordance with an embodiment of the present disclosure. Referring to FIG. 2b, the method of this embodiment comprises:

S201, acquiring a surrounding object.

Herein, the surrounding object may include various types of materials such as a sticker, an ornamental character, an image, a photo, or the like. The surrounding object may be a material with a static effect, for example, a static emoji sticker, a static ornamental character, a static photo, a static image, or the like; or, the surrounding object may be a material with a dynamic effect, for example, a dynamic emoji sticker, an ornamental character with a dynamic effect, or the like. The present disclosure does not limit the specific type of the surrounding object.

In a practical application, the number of the surrounding object may be one or more, and the present disclosure does not limit the number of the surrounding object included in one 2D surrounding animation effect.

It should be noted that, if there are a plurality of surrounding objects, the plurality of surrounding objects may be the same or different.

In a possible implementation, the apparatus for processing a surrounding animation effect can provide an effect editing interface, which can also be referred to as a visualized creation interface; and the user can add a 2D transform component in the effect editing interface, by inputting a 2D transform component adding instruction.

Herein, the 2D transform component is a set of visualized components bearing the surrounding object. The 2D transform component may be one set of visualized functions provided by the apparatus for processing a surrounding animation effect. Exemplarily, the 2D transform component may include a first component for bearing information of the surrounding object itself, and a second component for bearing attribute information of the surrounding object. Then, by operating interaction interfaces provided by the first component and the second component, the information of the surrounding object itself is stored into the first component, and the attribute information of the surrounding object is stored into the second component.

It should be understood that, the 2D transform component may also include a component for bearing other information of the surrounding object, and a user may perform relevant settings by operating the corresponding components, which is not limited by the embodiment of the present disclosure.

Herein, the above-mentioned information of the surrounding object itself may include information such as fill type, size mode, color, transparency, texture and the like of the surrounding object; and the attribute information of the surrounding object may include: size information, scaling information, initial revolve information, an initial position of a center point of the surrounding object, and the like.

Optionally, the inputting the 2D transform component adding instruction by the user may be acquiring an add option corresponding to the 2D transform component through a specified path, and inputting the 2D transform component adding instruction by clicking the add option. Or, when the apparatus for processing a surrounding animation effect supports positioning the 2D transform component by means of search, a name of the 2D transform component can be inputted into a search box, so that the add option corresponding to the 2D transform component is acquired, and the 2D transform component adding instruction is inputted by clicking the add option.

When there are a plurality of surrounding objects, each surrounding object corresponds to one 2D transform component in the effect editing interface. To facilitate distinguishing the surrounding objects, in the 2D transform component, identification information of the surrounding object may be displayed, for example, a number of the surrounding object, a name of the surrounding object, and the like.

S202, displaying a two-dimensional surrounding parameter configuration window, and associating the surrounding object with the two-dimensional surrounding parameter configuration window; wherein the two-dimensional surrounding parameter configuration window comprises a plurality of configuration items for generating a two-dimensional surrounding animation effect.

In a possible implementation, in accordance with a two-dimensional surrounding parameter configuration window adding instruction inputted by the user, the two-dimensional surrounding parameter configuration window is displayed in the effect editing interface.

Herein, the implementation of inputting the two-dimensional surrounding parameter configuration window adding instruction by the user may be similar to that of inputting the 2D transform component adding instruction by the user, which may refer to the description in step S201, and which is not repeated here for brevity.

If there are a plurality of surrounding objects, in a possible implementation, by repeatedly inputting the two-dimensional surrounding parameter configuration window adding instruction, the same number of two-dimensional surrounding parameter configuration windows as the surrounding objects may be displayed in the effect editing interface.

In another possible implementation, first, one two-dimensional surrounding parameter configuration window is displayed in the effect editing interface by inputting a two-dimensional surrounding parameter configuration window adding instruction; and then, copy and paste operations are performed by selecting the two-dimensional surrounding parameter configuration window, so that the same number of the two-dimensional surrounding parameter configuration windows with as the surrounding objects are displayed in the effect editing interface.

The implementation of adding the two-dimensional surrounding parameter configuration window to the effect editing interface is not limited in the embodiment of the present disclosure.

Hereinafter, a detailed description will be made to the two-dimensional surrounding parameter configuration window by FIGS. 3a to 3g.

First, how to associate the 2D transform component for the surrounding object with the two-dimensional surrounding parameter configuration window is exemplarily described.

Exemplarily, referring to FIG. 3a, the two-dimensional surrounding parameter configuration window 300 includes: a 2D transform component configuration item w1, wherein the 2D transform component configuration item w1 includes a visualized input port w2.

Figure 7:
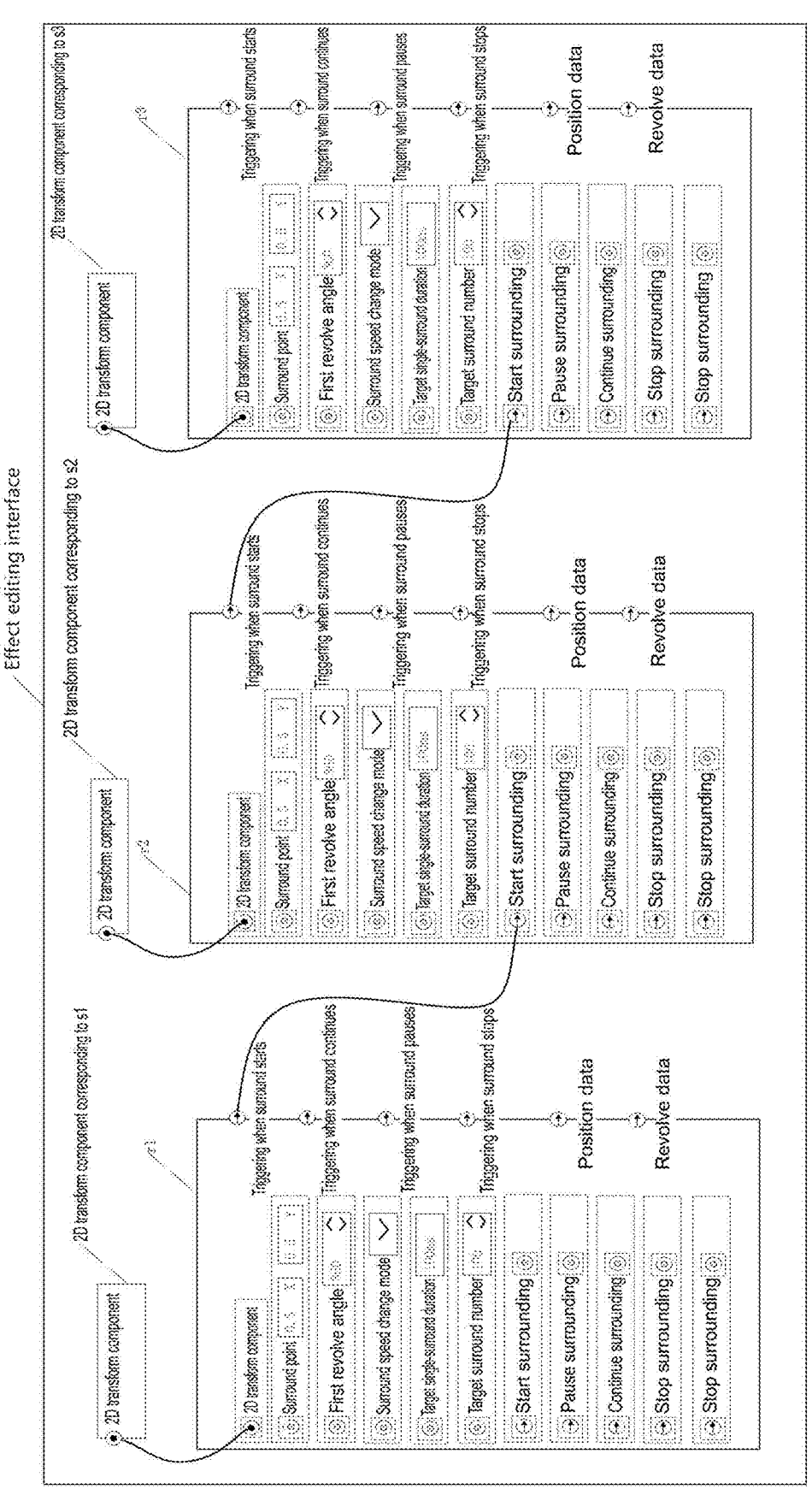
FIG. 7 is a schematic diagram of a two-dimensional surrounding parameter configuration window in accordance with the present disclosure.

Therefore, exemplarily, an interaction interface of the 2D transform component corresponding to the surrounding object (e.g., as shown in FIG. 7) may be connected with the input port w2 of the 2D transform component configuration item w1 in the two-dimensional surrounding parameter configuration window, thereby associating the surrounding object with the two-dimensional surrounding parameter configuration window.

For example, the user may first suspend a cursor of a mouse in the area of the interaction interface of the 2D transform component to select the 2D transform component;

then, long press a left button of the mouse and move the mouse to move the cursor of the mouse to the area of the input port w2, and then stop pressing the left button of the mouse. In accordance with a movement trajectory of the mouse, one line appears between the interaction interface of the 2D transform component and the input port w2, which indicates that the surrounding object is associated with the two-dimensional surrounding parameter configuration window 300.

If the user needs to modify the association between the 2D transform component and the two-dimensional surrounding parameter configuration window 300, this can be realized by deleting the line. For example, the user may position the cursor of the mouse at any point on the line and input a delete instruction to delete the line, thereby canceling the association between the 2D transform component and the two-dimensional surrounding parameter configuration window 300. In a practical application, this is not limited to implementation by the mouse, and the user may also implement this by manually inputting a sliding trajectory on a touch screen or the like.

It should be understood that before the 2D transform component for the surrounding object is not associated with the two-dimensional surrounding parameter configuration window, there is no association between the surrounding object and the two-dimensional surrounding parameter configuration window, so that the operation of the user for the configuration item provided in the two-dimensional surrounding parameter configuration window cannot be associated to the surrounding object, or, it can also be understood that the two-dimensional surrounding parameters configured by the user through the two-dimensional surrounding parameter configuration window does not have any relation with the surrounding object.

After the 2D transform component for the surrounding object is associated with the two-dimensional surrounding parameter configuration window, there is an association relation between the surrounding object and the two-dimensional surrounding parameter configuration window, and the operation of the user for the configuration item provided in the two-dimensional surrounding parameter configuration window can be associated to the surrounding object, or, it can also be understood that the user configures the two-dimensional surrounding parameters of the surrounding object through the two-dimensional surrounding parameter configuration window.

When there are a plurality of surrounding objects, each surrounding object corresponds to one 2D transform component. For each surrounding object, the 2D transform component corresponding to the surrounding object may be associated with one two-dimensional surrounding parameter configuration window in the above manner. In this way, for each surrounding object, it can be independently configured through its associated two-dimensional surrounding parameter configuration window, so that the atomization requirement of control of the surrounding object is met.

After associating the 2D transform component corresponding to the surrounding object with the two-dimensional surrounding parameter configuration window, the user may perform configuration operations for configuration items in the two-dimensional surrounding parameter configuration window corresponding to each surrounding object, thereby acquiring configuration information of the configuration items.

Next, other configuration items provided in the two-dimensional surrounding parameter configuration window than the 2D transform component configuration item will be described in detail in conjunction with FIGS. 3*b* to 3*f*.

In this solution, the two-dimensional surrounding parameter configuration window may include: one or more of a surrounded point configuration item, a first revolve angle configuration item, a revolve speed change mode configuration item, a target single-surrounding duration configuration item, a target surrounding number configuration item, and a surrounding object rotation configuration item.

It can be understood that each of the above configuration items corresponds to a two-dimensional surrounding parameter.

FIG. 3*b* exemplarily shows an schematic interface diagram of a two-dimensional surrounding parameter configuration window. Referring to FIG. 3*b*, the two-dimensional surrounding parameter configuration window 300 may comprise: a surrounded point configuration item 301, a first revolve angle configuration item 302, a revolve speed change mode configuration item 303, a target single-surrounding duration configuration item 304, and a target surrounding number configuration item 305.

It should be understood that, in a practical application, if some two-dimensional surrounding parameters may adopt uniform default values, configuration items corresponding to such two-dimensional surrounding parameters may be displayed in the two-dimensional surrounding parameter configuration window, or the configuration items corresponding to such two-dimensional surrounding parameters may not be displayed.

In addition, if more two-dimensional surrounding parameters need to be configured, configuration items corresponding to the more two-dimensional surrounding parameters can be set in the two-dimensional surrounding parameter configuration window to satisfy the flexible configuration of the two-dimensional surrounding parameters.

Hereinafter, the configuration items shown in FIG. 3*b* will be described one by one:

1. Surrounded Point Configuration Item 301:

Herein, the surrounded point configured in the surrounded point configuration item 301 is a revolve center of the surrounding object, and therefore, the surrounded point may also be referred to as another name such as a revolve point, a revolve center, or the like.

The surrounded point configured in the surrounded point configuration item 301 is a point on a two-dimensional plane, wherein the two-dimensional plane can be defined by a two-dimensional coordinate system; when it is assumed that the two-dimensional coordinate system is an XY coordinate system, a position of the surrounded point in the two-dimensional plane can be determined by coordinate values of an X-axis and a Y-axis.

In a possible implementation, referring to FIG. 3*b*, the surrounded point configuration item 301 includes: a coordinate input area 3011. Here, the coordinate input area 3011 may include an input box 301*a* for a horizontal coordinate and an input box 301*b* for a vertical coordinate, and the user may configure a horizontal coordinate and a vertical coordinate of the surrounded point by operating the input box 301*a* for the horizontal coordinate (i.e., the X-axis coordinate) and the input box 301*b* for the vertical coordinate (i.e., the Y-axis coordinate) respectively.

Optionally, the horizontal and vertical coordinates of the surrounded point may be normalized coordinate values or non-normalized coordinate values. For example, a value 0.5 of the horizontal coordinate and a value 0.5 of the vertical coordinate shown in FIG. 3*b* are both normalized coordinate values.

It should be noted that, the surrounded point configured by the input boxes 301*a* and 301*b* is a fixed point, so that the surrounding object revolves by taking the fixed surrounded point as the revolve center in each surrounding cycle.

Optionally, in the input boxes 301*a* and 301*b* included in the two-dimensional surrounding parameter configuration window 300, a set of default horizontal and vertical coordinates of the surrounded point may be displayed. If the default horizontal and vertical coordinates of the surrounded point meet the requirements of the user, reconfiguration by the user is not needed, which can reduce user operations, and improve the production efficiency of the surrounding animation effect.

In another possible implementation, referring to FIG. 3*b*, the surrounded point configuration item 301 may include a visualized input port 3012, which may receive configuration information of the surrounded point delivered by another module or component.

The "another module or component" mentioned herein may be, but is not limited to, an addition computation module, a subtraction computation module, a division computation module, a random-number generation module, a clicking-screen event detection component, or the like. When the surrounding animation effect is practically made, it is enough to connect the input port 3012 with an interaction interface provided by a visualization module or component to be associated, and the specific implementation of the connection is similar to the foregoing implementation of connecting the 2D transform component with the 2D transform component configuration items.

Exemplarily, referring to FIG. 3*g*, in an effect editing interface, an interaction interface of a clicking-screen event detection component m1 is connected with the input port 3012 by a line, so that the interaction interface of the clicking-screen event detection component m1 can deliver a detected screen position clicked by the user to the input port 3012, to configure the clicked screen position as a surrounded point.

The surrounded point configured through the input port 3012 may be dynamically changed, for example, the surrounded point configured through the input port 3012 may be periodically transformed in accordance with discrete points with a fixed interval on a curve of a certain shape (such as a circle, a triangle, an ellipse or the like); and for another example, a position of a surrounding object b in a current frame of the surrounding animation effect may be configured through the input port 3012 as a surrounded point of a surrounding object a in a next frame of the surrounding animation effect.

In a practical application, the two-dimensional surrounding parameter configuration window may only include the coordinate input area 3011, or only include the visualized input port 3012, or as shown in FIG. 3*b*, will simultaneously provide the two configurations (i.e., the manner of inputting coordinates, and the manner of receiving input coordinate information through the input port 3012) for the user to select.

2. First Revolve Angle Configuration Item 302:

The first revolve angle represents a revolve angle corresponding to the surrounding object revolving for one cycle. For example, the first revolve angle may be 360 degrees, 270 degrees, 180 degrees, or the like.

In a possible implementation, referring to FIG. 3*b*, the first revolve angle configuration item 302 may include an input box 3021, wherein the user can configure the first revolve angle by operating the input box 3021.

Optionally, the first revolve angle configuration item 302 may further include: controls 3022 and 3023, wherein the control 3022 is used for increasing a value of the first revolve angle displayed in the input box 3021; and the control 3023 is used for decreasing the value of the first revolve angle displayed in the input box 3021.

It should be noted that the first revolve angle configured by the input box 3021 is a fixed value, so that the first revolve angle corresponding to each surrounding cycle is the same in the process of the revolving of the surrounding object.

In another possible implementation, referring to FIG. 3b, the first revolve angle configuration item 302 may further include an input port 3024, wherein the input port 3024 may receive configuration information of the first revolve angle delivered by another module or component.

The "another module or component" mentioned herein may be, but is not limited to, an addition computation module, a subtraction computation module, a division computation module, a random-number generation module, or the like. When the surrounding animation effect is practically made, it is enough to connect the input port 3024 with an interaction interface provided by a visualization module or component to be associated, and the specific implementation of the connection is similar to the foregoing implementation of connecting the 2D transform component with the 2D transform component configuration items.

Exemplarily, referring to FIG. 3g, an output port k1 of an addition computation module m2 is connected with the input port 3024 by a line, the addition computation module m2 includes input boxes k2 and k3, the user can operate two values in the input boxes k2 and k3, and the addition computation module m2 performs an addition operation on the two values and delivers the addition computation result to the input port 3024, to configure the first revolve angle.

Optionally, in the two-dimensional surrounding parameter configuration window 300, the first revolve angle configuration item 302 may display a default first revolve angle. If the default first revolve angle meets the requirements of the user, reconfiguration by the user is not needed, which can reduce user operations, and improve the production efficiency of the surrounding animation effect.

It should be noted that, the two-dimensional surrounding parameter configuration window may only include the input box 3021, or only include the visualized input port 3024, or, as shown in FIG. 3b, will simultaneously provide the two configurations (i.e., the manner of inputting the first revolve angle, and the manner of receiving the first revolve angle through the input port 3024) for the user to select, and of course, other manners can also be adopted.

3. Surrounding Speed Change Mode Configuration Item 303

Herein, the surrounding speed change mode refers to a speed change mode of the surrounding object in one surrounding cycle. The surrounding speed change mode may include, but is not limited to, linear, fast first and then slow, slow first and then fast, slow-in and slow-out, or the like.

In a possible implementation, referring to FIG. 3b, the surrounding speed change mode configuration item 303 includes: a control 3031, wherein when a user operation (e.g. a click operation) for the control 3031 is received, a menu bar 3032 may be displayed in the two-dimensional surrounding parameter configuration window, as shown in FIG. 3c, wherein a plurality of surrounding speed change modes are provided in the menu bar 3032. The user can select an option provided in the menu bar to configure the surrounding speed change mode.

In another possible implementation, referring to FIG. 3d, in the two-dimensional surrounding parameter configuration window, the surrounding speed change mode configuration item 303 includes: an area 3033; wherein the area 3033 includes areas corresponding to a plurality of surrounding speed change modes, and each surrounding speed change mode correspondingly includes a name of the surrounding speed change mode and a control 3034, wherein the control 3034 is used for identifying a selected state of its corresponding surrounding speed change mode.

In the case shown in FIG. 3d, if a control corresponding to one of the surrounding speed change modes is in the selected state, controls corresponding to all other surrounding speed change modes are in an unselected state.

Optionally, in combination with the cases shown in FIG. 3b to FIG. 3d, the surrounding speed change mode configuration item 303 may include an input port 3035, wherein the input port 3035 is used for receiving configuration information of the surrounding speed change mode delivered by another module or component.

The "another module or component" mentioned herein may be, but is not limited to, a timer, an event detection component, or the like. When the surrounding animation effect is practically made, it is enough to connect the input port 3035 with an interaction interface provided by a visualization module or component to be associated, and the specific implementation of the connection is similar to the foregoing implementation of connecting the 2D transform component with the 2D transform component configuration items.

It is assumed that, it is needed to, when a shaking-head event is detected, configure the surrounding speed change mode of the surrounding object as slow-in and slow-out. Exemplarily, referring to FIG. 3g, an output port z1 of a shaking-head event detection component m3 is connected with the input port 3035 by a line, so that the shaking-head event detection component m3, when detecting a shaking-head event, delivers indication information to the input port 3035 to configure the surrounding speed change mode as slow-in and slow-out.

Optionally, in the two-dimensional surrounding parameter configuration window 300, the surrounding speed change mode configuration item 303 may display a default surrounding speed change mode. If the default surrounding speed change mode meets the requirements of the user, reconfiguration by the user is not needed, which can reduce user operations, and improve the production efficiency of the surrounding animation effect.

It should be noted that, in the two-dimensional surrounding parameter configuration window 300, the surrounding speed change mode configuration item 303 can be implemented in the manner of selecting from among the options provided in the menu bar after the menu bar is displayed by a trigger operation as shown in FIG. 3b in combination with FIG. 3c, or in the manner of displaying the menu bar by default as shown in FIG. 3d, or in the manner of receiving the surrounding speed change mode through the input port 3035, or in other manners.

4. Target Single-Surrounding Duration Configuration Item 304

Herein, the target single-surrounding duration represents a time required for revolving for one surrounding cycle.

In a possible implementation, referring to FIG. 3b, the target single-surrounding duration configuration item 304 may include an input box 3041. The user can input the target single-surrounding duration by operating the input box 3041.

In another possible implementation, referring to FIG. 3e, the target single-surrounding duration configuration item 304 may include a control 3042, and when an operation (such as a click operation) of the user for the control 3042 is detected, a menu bar 3043 is displayed in the two-dimensional surrounding parameter configuration window; the menu bar 3043 provides a plurality of different single-surrounding durations, so that the user can select an option provided in the menu bar to configure the target single-surrounding duration.

In the case shown in FIG. 3e, if one of the single-surrounding durations is in a selected state, all the other single-surrounding durations are in an unselected state. The selected single-surrounding duration is the target single-surrounding duration.

Optionally, in the two-dimensional surrounding parameter configuration window, the target single-surrounding duration configuration item 304 may display a default target single-surrounding duration. If the default target single-surrounding duration meets the requirements of the user, reconfiguration by the user is not needed, which can reduce user operations, and improve the production efficiency of the surrounding animation effect.

Optionally, in conjunction with the cases shown in FIG. 3b and FIG. 3e, the target single-surrounding duration configuration item 304 may include an input port 3044, wherein the input port 3044 is used for receiving configuration information of the target single-surrounding duration delivered by another module or component.

The "another module or component" mentioned herein may be, but is not limited to, an addition computation module, a subtraction computation module, a division computation module, a random-number generation module, or the like. When the surrounding animation effect is practically made, it is enough to connect the input port 3044 with an interaction interface provided by a visualization module or component to be associated, and the specific implementation of the connection is similar to the foregoing implementation of connecting the 2D transform component with the 2D transform component configuration items.

Exemplarily, referring to FIG. 3g, an output port z2 of a multiplication computation module m4 is connected with the input port 3044 by a line, the multiplication computation module m4 includes input boxes z3 and z4; the multiplication computation module m4 multiply two values in the input boxes z3 and z4 and delivers the multiplication computation result to the input port 3044 to configure the target single-surrounding duration.

It should be noted that, in the two-dimensional surrounding parameter configuration window 300, the target single-surrounding duration configuration item 304 may be implemented in the manner of inputting the target single-surrounding duration as shown in FIG. 3b, or in the manner of selecting from among the options provided in the menu bar as shown in FIG. 3e, or in the manner of receiving the target single-surrounding duration through the input port 3044, or in other manners.

5. Target Surrounding Number Configuration Item 305

Herein, the target surrounding number represents a total number of surrounding cycles that the surrounding object needs to complete.

In a possible implementation, referring to FIG. 3b, the target surrounding number configuration item 305 may include an input box 3051, by operating which, the user may input the target surrounding number.

Optionally, the target surrounding number configuration item 305 may further include a control 3052 and a control

3053; wherein the control 3052 is used for increasing a value of the target surrounding number displayed in the input box 3051; and the control 3053 is used for decreasing the value of the target surrounding number displayed in the input box 3051.

In a practical application, a default target surrounding number may be displayed in the input box 3051.

In another possible implementation, referring to FIG. 3f, the target surrounding number configuration item 305 may include a control 3054; when an operation (e.g., a click operation) of the user for the control 3054 is detected, as shown in FIG. 3f, a menu bar 3055 is displayed in the two-dimensional surrounding parameter configuration window; and the menu bar 3055 provides a plurality of surrounding numbers. The user configures the target surrounding number by selecting an option provided in the menu bar 3055.

In another possible implementation, the target surrounding number configuration item 305 may include: a display box and a scroll bar, wherein a value in the scroll bar is displayed in the display box. The user can adjust the value in the scroll bar by a sliding operation, thereby configuring the target surrounding number.

Optionally, in conjunction with the cases shown in FIG. 3b and FIG. 3f, the target surrounding number configuration item 305 may include an input port 3056, wherein the input port 3056 is used for receiving configuration information of the target surrounding number delivered by another module or component.

The "another module or component" mentioned herein may be, but is not limited to, an addition computation module, a subtraction computation module, a division computation module, a random-number generation module, or the like. When the surrounding animation effect is practically made, it is enough to connect the input port 3056 with an interaction interface provided by a visualization module or component to be associated, and the specific implementation of the connection is similar to the foregoing implementation of connecting the 2D transform component with the 2D transform component configuration items.

Exemplarily, referring to FIG. 3g, an output port z5 of a division computation module m5 is connected with the input port 3056 by a line, and the division computation module m5 includes input boxes z6 and z7; the division computation module m5 performs a division operation on two values in the input boxes z6 and z7, and delivers the division computation result to the input port 3056 to configure the target single-surrounding duration.

Optionally, in the two-dimensional surrounding parameter configuration window 300, the target surrounding number configuration item 305 may display a default target surrounding number. If the default target surrounding number meets the requirements of the user, reconfiguration by the user is not needed, which can reduce user operations, and improve the production efficiency of the surrounding animation effect.

It should be noted that, in the two-dimensional surrounding parameter configuration window 300, the target surrounding number configuration item may be implemented in the manner of inputting the target surrounding number as shown in FIG. 3b, in the manner of selecting from the options provided in the menu bar as shown in FIG. 3f, in the manner of receiving the target surrounding number through the input port 3056, or in other manners.

It should be understood that, in a practical application, the implementations of the configuration items shown in FIGS. 3c to 3f described above may be used in combination.

In this solution, the configuration items for generating the target two-dimensional surrounding animation effect is provided in the two-dimensional surrounding parameter configuration window for the user to operate, and if the default values corresponding to the configuration items meet the requirements, modifications are not needed by the user; and if the default values corresponding to the configuration items do not meet the requirements, reconfiguration can be made in accordance with the user operation.

S203, generating a configuration file for a target two-dimensional surrounding animation effect in accordance with configuration information of the plurality of configuration items; wherein the target two-dimensional surrounding animation effect is an animation effect that the surrounding object surrounds around a surrounded point on a two-dimensional plane.

In this solution, the target two-dimensional surrounding animation effect is an animation effect that the surrounding object revolves on a surrounding plane with the surrounded point as a revolve center.

Specifically, for the surrounding object, the configuration information of the configuration items displayed in the associated two-dimensional surrounding parameter configuration window is stored into an effect script template corresponding to the two-dimensional surrounding parameter configuration window, to acquire an effect script segment corresponding to the surrounding object.

If a target two-dimensional surrounding animation effect to be generated includes one surrounding object, a configuration file for the target two-dimensional surrounding animation effect is generated in accordance with an effect script segment corresponding to the surrounding object.

If a target two-dimensional surrounding animation effect to be generated includes a plurality of surrounding objects, for each surrounding object, an effect script segment corresponding to each surrounding object can be acquired in a similar manner; and then, the script segments corresponding to the plurality of surrounding objects respectively are spliced to acquire a configuration file for the target two-dimensional surrounding animation effect.

In the method provided by this embodiment, by packaging requirements for making a two-dimensional surrounding animation effect, and providing a visual two-dimensional surrounding parameter configuration window for a user, the operation of the user is facilitated. After a component bearing a surrounding object is associated with the two-dimensional surrounding parameter configuration window, two-dimensional surrounding parameters corresponding to the surrounding object can be configured by operating configuration items provided in the two-dimensional surrounding parameter configuration window. And then, in accordance with configuration information of each configuration item in the two-dimensional surrounding parameter configuration window associated with the surrounding object, a configuration file of a target two-dimensional surrounding animation effect is automatically generated. As compared with the manner of handwriting scripts in the related art, the method provided by the embodiment is more convenient and fast, and can effectively improve the production efficiency of the two-dimensional surrounding animation effect. Moreover, the method provided by the embodiment can be suitable for the production and making of the target two-dimensional surrounding animation effect with any type of material as the surrounding object, and is wide in application range.

In a practical application scenario, for the target two-dimensional surrounding animation effect, it might be also needed to configure information for controlling the surrounding object to start surrounding, pause surrounding, continue surrounding, and stop surrounding in the target two-dimensional surrounding animation effect. Therefore, the two-dimensional surrounding parameter configuration window may further include: an event-triggering type of configuration item, wherein the event-triggering type of configuration item may include: one or more of a start surrounding configuration item, a pause surrounding configuration item, a continue surrounding configuration item, and a stop surrounding configuration item.

Correspondingly, if the user inputs a configuration operation for a first target configuration item, the configuration file corresponding to the target two-dimensional surrounding animation effect may further include configuration information of the first target configuration item. The first target configuration item may include one or more of the start surrounding configuration item, the pause surrounding configuration item, the continue surrounding configuration item, and the stop surrounding configuration item described above.

If the first target configuration item includes a plurality of configuration items, the configuration operation includes a plurality of operations.

FIG. 4a is a schematic interface diagram of a two-dimensional surrounding parameter configuration window in accordance with another embodiment of the present disclosure. Referring to FIG. 4a, the two-dimensional surrounding parameter configuration window 300 further includes: a start surrounding configuration item 306. The start surrounding configuration item 306 is used for receiving configuration information for controlling the surrounding object to start revolving that is inputted by the user.

In a possible implementation, the start surrounding configuration item 306 includes a visualized input port 3061; and when the input port 3061 receives a signal triggering the surrounding object to start revolving, the surrounding object is controlled to start revolving.

Exemplarily, it is assumed that controlling the surrounding object to start surrounding is triggered by an event. Referring to FIG. 4b, an event detection component (e.g., a clicking-screen event detection component as shown in FIG. 4b) may be added in the effect editing interface by inputting a corresponding event detection component adding instruction, and the event detection component is associated with the input port 3061 of the start surrounding configuration item 306 through an association operation; and when the event detection component detects the corresponding event, the event detection component delivers, to the start surrounding configuration item 306, a signal indicating the surrounding object to start revolving. The input port 3061 receives the signal and modifies, in the configuration file, configuration information of a corresponding two-dimensional surrounding parameter in an effect script segment corresponding to the surrounding object, so that when the effect script segment being run, the surrounding object can be controlled to start revolving.

The above event that triggers to start surrounding may be, for example, but is not limited to: a clicking-screen event, an expression event (e.g., smiling, opening-mouth, or the like), a hand gesture event, an action event (e.g., nodding, turning head from side to side), or the like.

Optionally, the start surrounding configuration item 306 includes a control 3062; when an operation (e.g., a click operation) of the user for the control 3062 is received, the surrounding object is controlled to start revolving.

It should be appreciated that, the control 3062 may facilitate the operation of the user in the process of producing and making the surrounding animation effect, for example, the user can, when previewing the target two-dimensional surrounding animation effect, control the surrounding object to start revolving by clicking the control 3062.

Referring to FIG. 4a, the two-dimensional surrounding parameter configuration window 300 may further include: a pause surrounding configuration item 307. The pause surrounding configuration item 307 is used for receiving configuration information for controlling the surrounding object to pause revolving that is inputted by the user.

In a possible implementation, the pause surrounding configuration item 307 includes a visualized input port 3071; and when the input port 3071 receives a signal triggering the surrounding object to pause revolving, the surrounding object is controlled to pause revolving.

Exemplarily, it is assumed that controlling the surrounding object to pause revolving is triggered by an event. Referring to FIG. 4b, an event detection component (e.g., a right-eye-blinking event detection component shown in FIG. 4b) may be added in the effect editing interface by inputting a corresponding event detection component adding instruction, and the event detection component is associated with the input port 3071 of the pause surrounding configuration item 307 through an association operation; and when the event detection component detects the corresponding event, the event detection component delivers, to the pause surrounding configuration item 307, a signal indicating the surrounding object to pause revolving. The input port 3071 receives the signal and modifies, in the configuration file, configuration information of a corresponding two-dimensional surrounding parameter in an effect script segment corresponding to the surrounding object, and by running the effect script segment, the surrounding object can be controlled to pause revolving.

The above event that triggers to pause surrounding may be, for example: a clicking-screen event, an expression event (e.g., smiling, opening-mouth, or the like), a hand gesture event, an action event (e.g., nodding, turning head from side to side, blinking, or the like), or the like.

Optionally, the pause surrounding configuration item 307 includes: a control 3072; when an operation (e.g., a click operation) of the user for the control 3072 is received, the surrounding object is controlled to pause revolving.

It should be appreciated that, the control 3072 may facilitate the operation of the user in the process of producing and making the surrounding animation effect, for example, the user can, when previewing the target two-dimensional surrounding animation effect, control the surrounding object to pause revolving by clicking the control 3072.

Referring to FIG. 4a, the two-dimensional surrounding parameter configuration window includes: a continue surrounding configuration item 308. The continue surrounding configuration item 308 is used for receiving configuration information for controlling the surrounding object to continue revolving from a pause position that is inputted by the user.

In a possible implementation, the continue surrounding configuration item 308 includes a visualized input port 3081; and when the input port 3081 receives a signal triggering the surrounding object to continue revolving, the surrounding object is controlled to continue revolving from the pause position.

Exemplarily, assumed that an event that triggers continue surrounding is clicking-screen; and referring to FIG. 4b, an event detection component (e.g., a clicking-screen event detection component as shown in FIG. 4b) may be added in the effect editing interface by inputting a corresponding event detection component adding instruction, and the event detection component is associated with the input port of the continue surrounding configuration item 308 through an association operation; and when the event detection component detects the corresponding event, the event detection component delivers, to the continue surrounding configuration item 308, a signal indicating the surrounding object to continue surrounding. The input port 3081 receives the signal and modifies, in the configuration file, configuration information of a corresponding two-dimensional surrounding parameter in the effect script segment corresponding to the surrounding object, and by running the effect script segment, the surrounding object can be controlled to continue revolving.

The above event that triggers to continue surrounding may be, for example, but is not limited to: a clicking-screen event, an expression event (e.g., smiling, opening-mouth, or the like), a hand gesture event, an action event (e.g., nodding, turning head from side to side), or the like.

While the surrounding object is in the state of pause surrounding, when a detection unit detects an operation of clicking a screen by the user, the detection unit delivers, to the input port 3081, a signal triggering the surrounding object to continue revolving, and the input port 3081 receives the signal and controls the surrounding object to continue revolving from the pause position in accordance with the signal.

Optionally, the continue surrounding configuration item 308 includes: a control 3082; and when an operation (e.g., a click operation) of the user for the control 3082 is received, the surrounding object is controlled to continue revolving from the pause position.

It should be appreciated that, the control 3082 may facilitate the operation of the user in the process of producing and making a surrounding animation effect, for example, the user can, when previewing the target two-dimensional surrounding animation effect, control the surrounding object to continue revolving from the pause position by clicking the control 3082.

Referring to FIG. 4a, the two-dimensional surrounding parameter configuration window 300 further includes: a stop surrounding configuration item 309. The stop surrounding configuration item 309 is used for receiving configuration information for controlling the surrounding object to stop revolving and restore to an initial position that is inputted by the user. The "initial position" herein refers to a position of the surrounding object set when the surrounding object is acquired, and the initial position of the surrounding object may be acquired by the 2D transform component.

In a possible implementation, the stop surrounding configuration item 309 includes a visualized input port 3091; and when the input port 3091 receives a signal triggering the surrounding object to stop revolving, the surrounding object is controlled to stop revolving and restore to the initial position.

Exemplarily, assume that the event that triggers stop surrounding is continuously-double-clicking-screen; referring to FIG. 4b, an event detection component (e.g., a continuously-double-clicking-screen detection component shown in FIG. 4b) may be added in the effect editing interface by inputting a corresponding event detection component adding instruction, and the event detection component is associated with the input port of the stop surrounding configuration item 309 through an association operation; and when the event detection component detects the corresponding event, the event detection component delivers, to the stop surrounding configuration item 309, a signal indicating the surrounding object to stop surrounding. The input port 3091 receives the signal and modifies, in the configuration file, configuration information of a corresponding two-dimensional surrounding parameter in an effect script segment corresponding to the surrounding object, and by running the effect script segment, the surrounding object can be controlled to stop revolving.

The above event that triggers to stop surrounding may be, for example: a clicking-screen event, an expression event (e.g., smiling, opening-mouth, or the like), a hand gesture event, an action event (e.g., nodding, turning head from side to side, blinking, or the like), or the like.

Optionally, the stop surrounding configuration item 309 includes a control 3092; and when an operation (e.g., a click operation) of the user for the control 3092 is received, the surrounding object is controlled to stop revolving and restore to the initial position.

It should be appreciated that, the control 3092 can facilitate the operation of the user in the process of producing and making the surrounding animation effect, for example, the user can, when previewing the target two-dimensional surrounding animation effect, control the surrounding object to stop revolving and restore to the initial position by clicking the control 3092.

In a practical application, the events that trigger the surrounding object to start surrounding, pause surrounding, continue surrounding, and stop surrounding may also be, for example, an expression event, a hand gesture event, a voice event, or the like, and are not limited to the aforementioned clicking-screen event.

In this embodiment, by providing the above start surrounding configuration item, the pause surrounding configuration item, the continue surrounding configuration item, and the stop surrounding configuration item through the two-dimensional surrounding parameter configuration window, the user can input the configuration information for controlling the target two-dimensional surrounding animation effect by operating the corresponding configuration items, so that the operation is simple and convenient for the user. Compared with the manner of handwriting scripts in the related art, the method provided by this embodiment is more convenient and efficient, and can effectively improve the production efficiency of the two-dimensional surrounding animation effect.

Optionally, on the basis of the embodiment shown in FIG. 4a, the two-dimensional surrounding parameter configuration window 300 may further include: a surrounding object rotation configuration item 310. The surrounding object rotation configuration item 310 is used for receiving configuration information for controlling the surrounding object to rotate that is inputted by the user.

Referring to FIG. 4a, the surrounding object rotation configuration item 310 may comprise: a control 3101.

When the control 3101 is on, the surrounding object rotates while revolving around the surrounded point; and when the control 3101 is off, the surrounding object does not rotate while revolving around the surrounded point.

Exemplarily, taking the 2D surrounding animation effect shown in FIG. 2a as an example, the situations of rotation and non-rotation of the surrounding object will be described in conjunction with FIGS. 5a and 5b. Assuming that the control 3101 is on, when the surrounding object revolves to a next frame of the surrounding animation effect, and when the surrounding object rotates, as shown in FIG. 5a, a horizontal direction of the surrounding object is not in parallel to a lateral direction of the XY coordinate system, and a vertical direction of the surrounding object is not in parallel to a longitudinal direction of the XY coordinate system either; and assuming that the control 3101 is off, when the surrounding object revolves to a next frame of the surrounding animation effect, the surrounding object is as shown in FIG. 5b, where a horizontal direction of the surrounding object is in parallel to the lateral direction of the XY coordinate system, and a vertical direction of the surrounding object is also in parallel to the longitudinal direction of the XY coordinate system. In a practical application, the control 3101 may be set to be on or off in accordance with requirements.

In some cases, the surrounding object rotation configuration item 310 may include: a visualized input port 3102. The input port 3102 is used for receiving configuration information for the surrounding object to rotate, that is delivered by another module or component.

The "another module or component" mentioned herein may be, but is not limited to, an addition computation module, a subtraction computation module, a division computation module, a random-number generation module, a numeric value comparison module, or the like. When the surrounding animation effect is practically made, it is enough to connect the input port 3102 with an interaction interface provided by a visualization module or component to be associated, and the specific implementation of the connection is similar to the foregoing implementation of connecting the 2D transform component with the 2D transform component configuration items.

Exemplarily, referring to FIG. 4b, in the effect editing interface, an output port z8 of a numeric value comparison module m6 is connected with the input port 3102 by a line, and, the numeric value comparison module m6 includes input boxes z9 and z10, the numeric value comparison module m6 compares two values in the input boxes z9 and z10, and delivers the comparison result to the input port 3102, to configure the surrounding object rotation configuration item.

It should be noted that, the above configuration items 301 to 310 may respectively include one input port, or a plurality of input ports.

In some cases, the plurality of surrounding objects may be associated with each other. For example, a revolving state of the surrounding object b is controlled using a revolving state of the surrounding object a; for another example, a surrounded point of the surrounding object b is configured using a position of the surrounding object a. In some cases, it might be needed to deliver some relevant information of the surrounding object to some modules or components of the apparatus for processing a surrounding animation effect. Therefore, the two-dimensional surrounding parameter configuration window corresponding to the surrounding object may also include some visualized output items, e.g., start-surrounding trigger configuration item, pause-surrounding trigger configuration item, continue-surrounding trigger configuration item, stop-surrounding trigger configuration item, position data output configuration item, revolve data output configuration item, and the like.

Correspondingly, if the user inputs a configuration operation for a second target configuration item, the configuration file corresponding to the target two-dimensional surrounding animation effect may further include configuration information of the second target configuration item. The second target configuration item may include one or more of a start-surrounding trigger configuration item, a pause-surrounding trigger configuration item, a continue-surrounding trigger configuration item, and a stop-surrounding trigger configuration item.

If the user inputs a configuration operation for the position data output configuration item and/or the revolve data output configuration item, the configuration file may further include configuration information of the position data output configuration item and/or the revolve data output configuration item.

Hereinafter, a detailed description will be exemplarily made to these output items through the embodiments shown in FIGS. 6a to 6f.

Figure 6A:
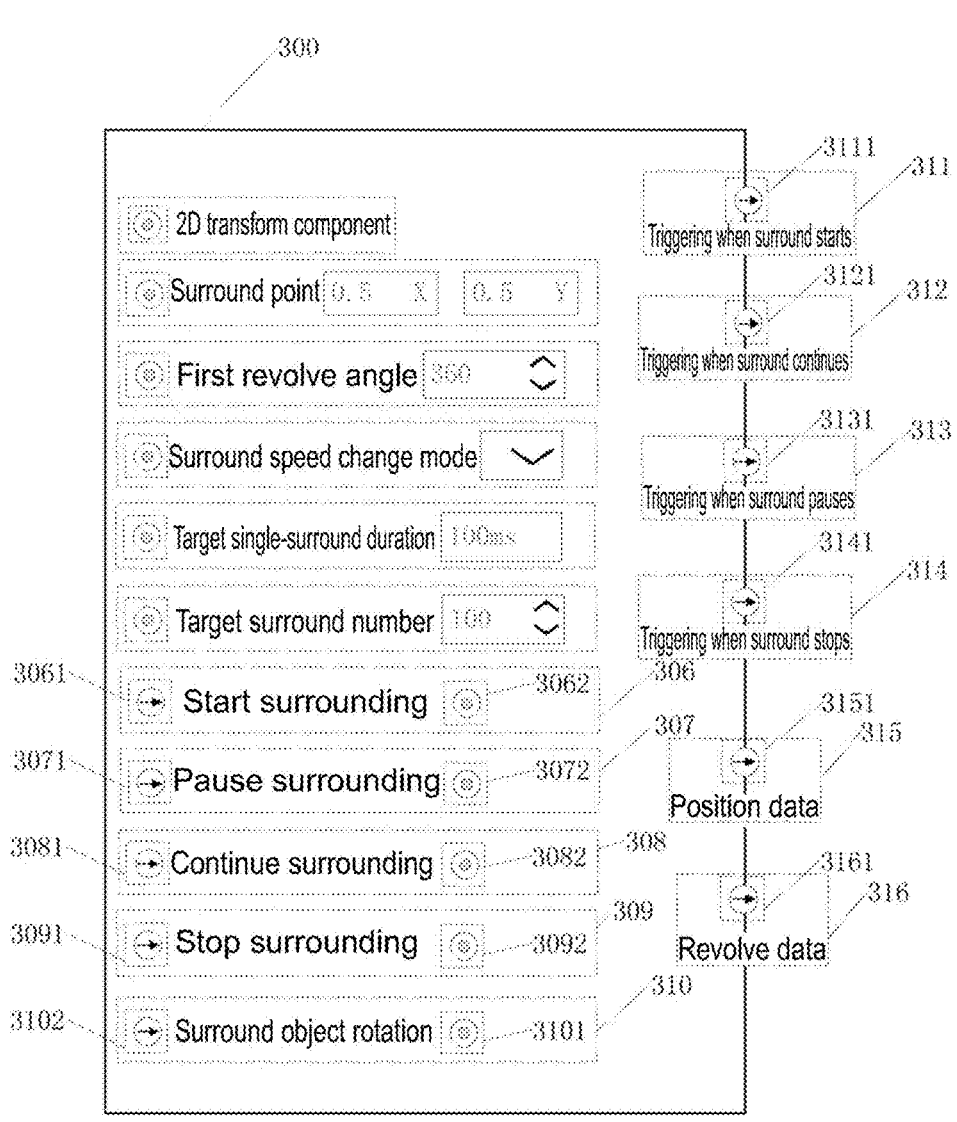
FIG. 6a is a schematic diagram of a two-dimensional surrounding parameter configuration window in accordance with the present disclosure.

Referring to FIG. 6a, on the basis of the embodiment shown in FIG. 4a, the two-dimensional surrounding parameter configuration window 300 further includes: a start-surrounding trigger configuration item 311, wherein the start-surrounding trigger configuration item 311 is used for, when it is detected that the surrounding object starts surrounding for a first time, outputting a first signal for indicating that the surrounding object has started surrounding for the first time.

In a possible implementation, the start-surrounding trigger configuration item 311 includes a visualized output port 3111. The user may, in the effect editing interface, connect the output port 3111 with a module or component to be associated, thereby configuring the output port 3111 to deliver, to the associated module or component, the first signal indicating that the surrounding object has started surrounding.

Figure 6B:
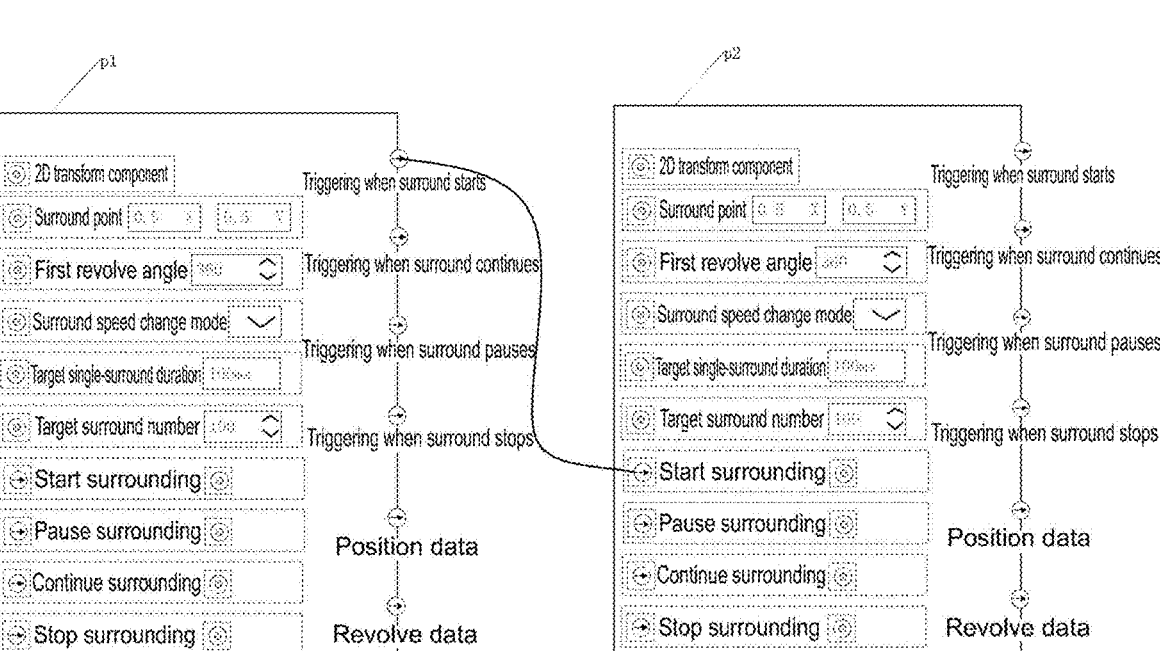
FIG. 6b to 6f are schematic interface diagrams wherein two-dimensional surrounding parameter configuration windows are associated with each other in accordance with the present disclosure.

Exemplarily, referring to FIG. 6b, the effect editing interface includes a two-dimensional surrounding parameter configuration window p1 associated with the surrounding object a and a two-dimensional surrounding parameter configuration window p2 associated with the surrounding object b; and the user connects a start-surrounding trigger configuration item in the two-dimensional surrounding parameter configuration window p1 with a start surrounding configuration item in the two-dimensional surrounding parameter configuration window p2 through an operation (e.g., a keyboard or mouse operation, or the like), so as to trigger the surrounding object b to synchronously revolve when the surrounding object a has started revolving.

Continuing to refer to FIG. 6a, based on the embodiment shown in FIG. 4a, the two-dimensional surrounding parameter configuration window 300 further includes: a continue-surrounding trigger configuration item 312; wherein the continue-surrounding trigger configuration item 312 is used for, when it is detected that the surrounding object continues surrounding, outputting a second signal for indicating that the surrounding object has continued surrounding.

In a possible implementation, the continue-surrounding trigger configuration item 312 includes a visualized output port 3121. The user can, in the effect editing interface, connect the output port 3121 with a module or component to be associated, thereby configuring the output port 3121 to deliver, to the associated module or component, the second signal indicating that the surrounding object has continued surrounding.

Figure 6C:
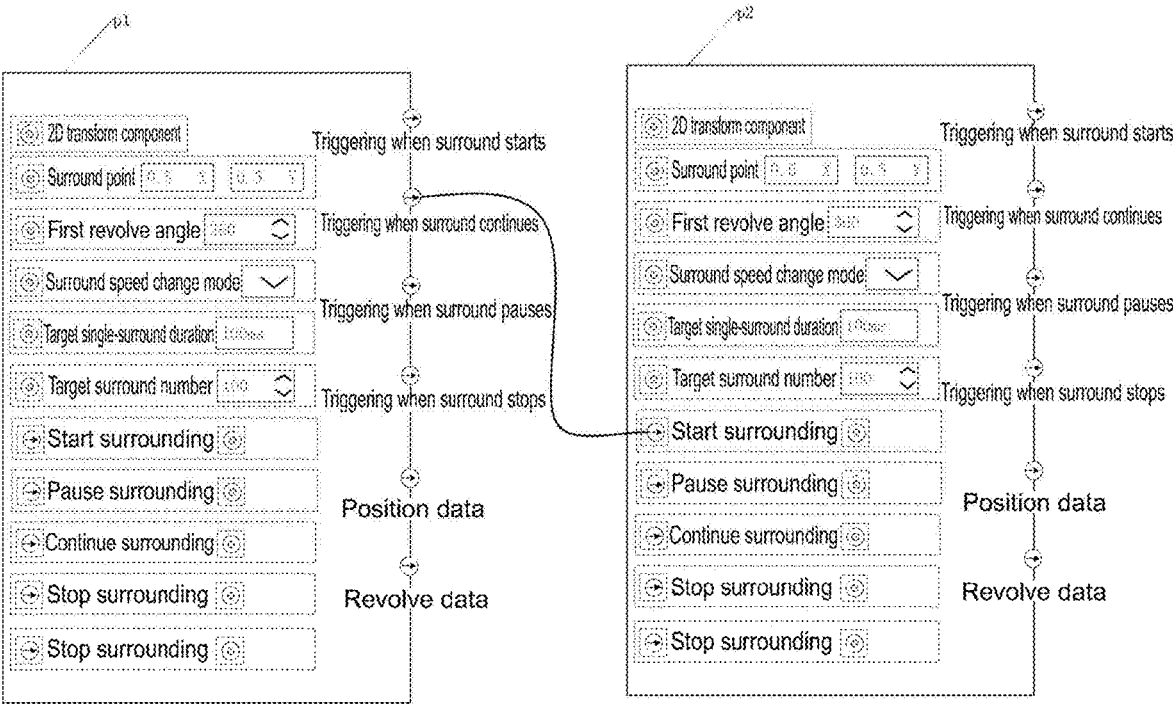

Exemplarily, referring to FIG. 6c, where a two-dimensional surrounding parameter configuration window p1 associated with the surrounding object a and a two-dimensional surrounding parameter configuration window p2 associated with the surrounding object b are included, and the user connects a continue-surrounding trigger configuration item in the two-dimensional surrounding parameter configuration window p1 with a start surrounding configuration item in the two-dimensional surrounding parameter configuration window p2 through an operation (e.g., a keyboard and mouse operation, or the like), so as to trigger the surrounding object b to start revolving when the surrounding object a starts to enter a second surrounding cycle.

Referring to FIG. 6a, on the basis of the embodiment shown in FIG. 3a, the two-dimensional surrounding parameter configuration window 300 further includes: a pause-surrounding trigger configuration item 313, wherein the pause-surrounding trigger configuration item 313 is used for, when it is detected that the surrounding object pauses surrounding, outputting a third signal for indicating that the surrounding object has paused surrounding.

In a possible implementation, the pause-surrounding trigger configuration item 313 includes a visualized output port 3131. The user can, in the effect editing interface, connect the output port 3131 with a module or component to be associated, thereby configuring the output port 3131 to deliver, to the associated module or component, the third signal indicating that the surrounding object has paused surrounding.

Figure 6D:
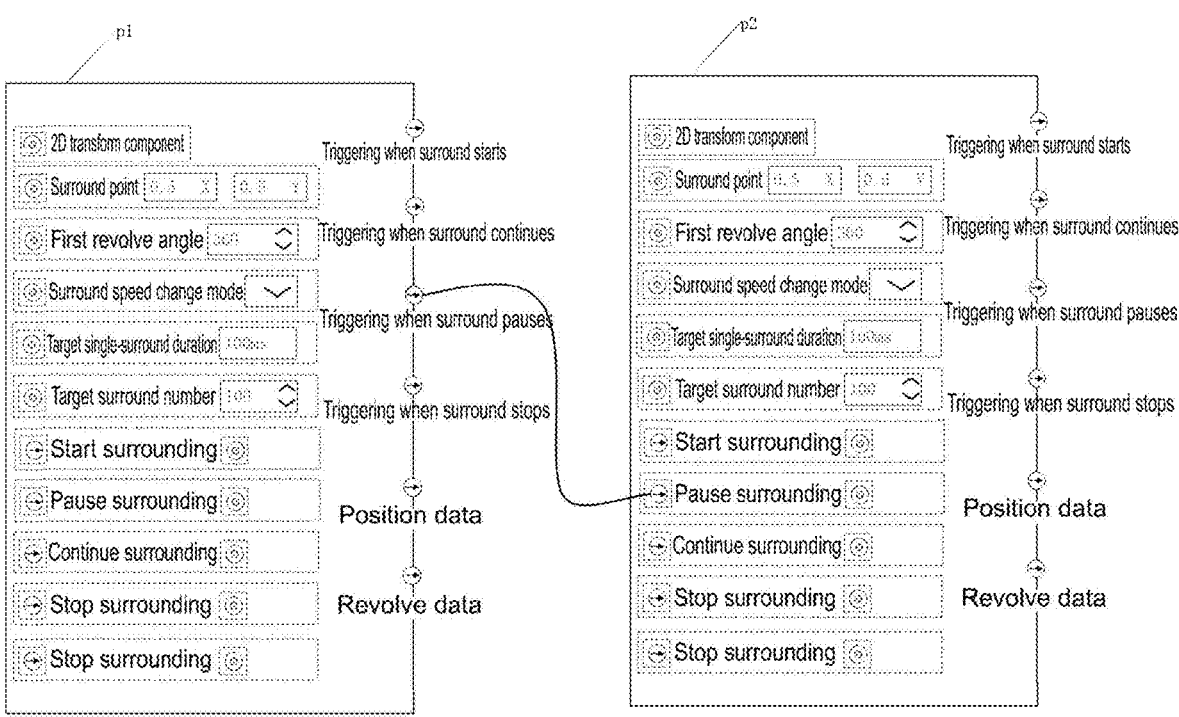

Exemplarily, referring to FIG. 6d, where a two-dimensional surrounding parameter configuration window p1 associated with the surrounding object a and a two-dimensional surrounding parameter configuration window p2 associated with the surrounding object b are included, and the user connects a pause-surrounding trigger configuration item in the two-dimensional surrounding parameter configuration window p1 with a pause surrounding configuration item in the two-dimensional surrounding parameter configuration window p2 through an operation (e.g., a keyboard or mouse operation, or the like), so as to trigger the surrounding object b to synchronously pause surrounding when the surrounding object a has paused surrounding.

Referring to FIG. 6a, on the basis of the embodiment shown in FIG. 3a, the two-dimensional surrounding parameter configuration window 300 further includes: a stop-surrounding trigger configuration item 314, wherein the stop-surrounding trigger configuration item 314 is used for, when it is detected that the surrounding object stops surrounding, outputting a fourth signal for indicating that the surrounding object has stopped surrounding.

In a possible implementation, the stop-surrounding trigger configuration item 314 includes a visualized output port 3141. The user can, in the effect editing interface, connect the output port 3141 with a module or component to be associated, thereby configuring the output port 3141 to deliver, to the associated module or component, the fourth signal indicating that the surrounding object has stopped surrounding.

Figure 6E:
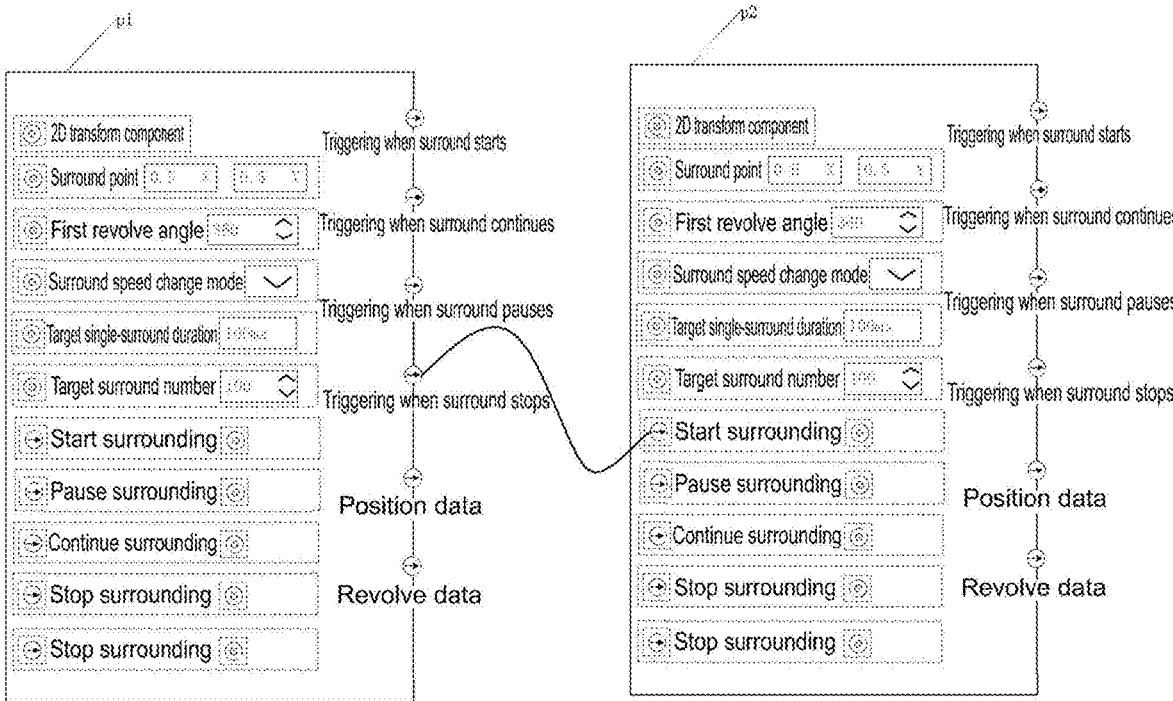

Exemplarily, referring to FIG. 6e, an effect editing interface includes a two-dimensional surrounding parameter configuration window p1 associated with the surrounding object a and a two-dimensional surrounding parameter configuration window p2 associated with the surrounding object b, and the user connects a stop-surrounding trigger configuration item in the two-dimensional surrounding parameter configuration window p1 with a start surrounding configuration item in the two-dimensional surrounding parameter configuration window p2 through an operation (e.g., a keyboard or mouse operation, or the like), so as to trigger the surrounding object b to start revolving when the surrounding object a has stopped surrounding.

Referring to FIG. 6a, on the basis of the embodiment shown in FIG. 3a, the two-dimensional surrounding parameter configuration window 300 further includes: a position data output configuration item 315, wherein the position data output configuration item 315 is used for outputting position information (such as the lateral coordinate and the longitudinal coordinate of the surrounding object) of the surrounding object in a currently displayed frame of the surrounding animation effect.

In a possible implementation, the position data output configuration item 315 includes a visualized output port 3151. The user can, in the effect editing interface, connect the output port 3151 with a module or component to be associated, thereby configuring the output port 3151 to deliver the position data of the surrounding object to the associated module or component.

Figure 6F:
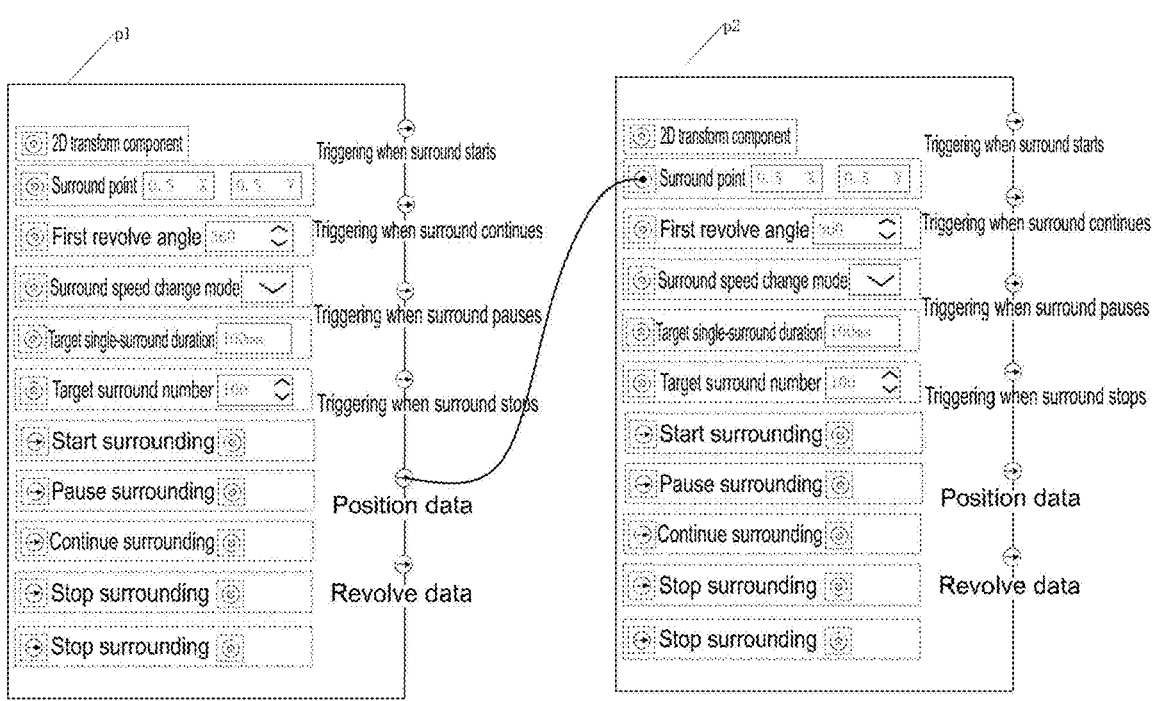

Exemplarily, referring to FIG. 6f, where a two-dimensional surrounding parameter configuration window p1 associated with the surrounding object a and a two-dimensional surrounding parameter configuration window p2 associated with the surrounding object b are included, and the user connects a position data output configuration item in the two-dimensional surrounding parameter configuration window p1 with a surrounded point configuration item in the two-dimensional surrounding parameter configuration window p2 through an operation (such as a keyboard or mouse operation), so as to output position data of the surrounding object a in a current frame of the surrounding animation effect to the surrounded point configuration item of the surrounding object b, and configure the position of the surrounding object a in the current frame of the surrounding animation effect as the surrounded point of the surrounding object b in a next frame of the surrounding animation effect.

Referring to FIG. 6a, on the basis of the embodiment shown in FIG. 3a, the two-dimensional surrounding parameter configuration window 300 further includes: a revolve data output configuration item 316, wherein the revolve data output configuration item 316 is used for outputting revolve data of the surrounding object. The revolve data may include: an angle at which the surrounding object has already revolved in a current surrounding cycle.

In a possible implementation, the revolve data output configuration item 316 includes a visualized output port 3161. The user can, in the effect editing interface, connect the output port 3161 with a module or component to be associated, thereby configuring the output port 3161 to deliver the revolve data of the surrounding object to the associated module or component.

Figure 6G:
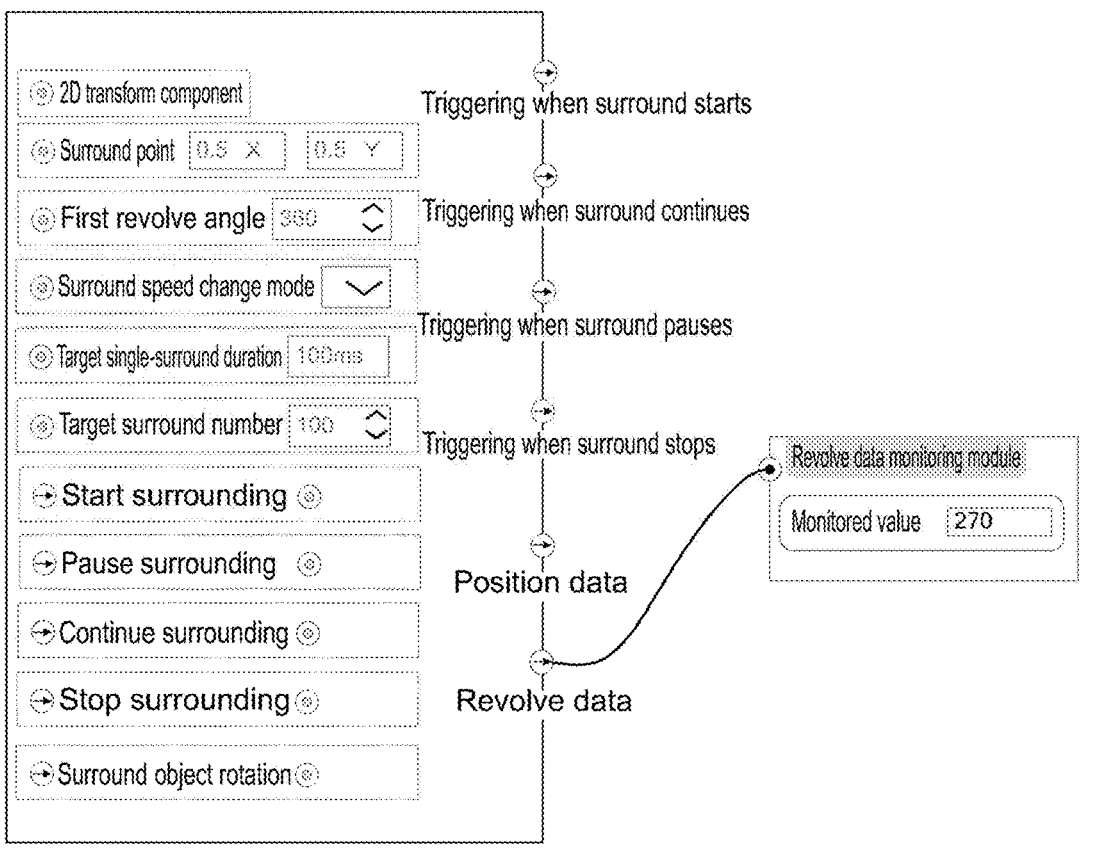
FIG. 6g is a schematic interface diagram wherein a two-dimensional surrounding parameter configuration window and a visualization module are associated with each other in accordance with the present disclosure

Exemplarily, referring to FIG. 6g, where a two-dimensional surrounding parameter configuration window p1 associated with the surrounding object a and a visualized revolve data monitoring module (i.e. a revolve data monitoring module shown in FIG. 6g) are included, and the user can connect a revolve data output configuration item in the two-dimensional surrounding parameter configuration window p1 with an input port of the revolve data monitoring module by a visualized connection line, so as to monitor an angle at which the surrounding object a has already revolved in a current surrounding cycle in real time.

FIGS. 6b to 6g exemplarily illustrate, by taking two surrounding objects as an example, how to associate a configuration item in a two-dimensional surrounding parameter configuration window of one surrounding object with a configuration item in a two-dimensional surrounding parameter configuration window of another surrounding object, so as to achieve an associated control between the two surrounding objects. The above association manners in FIG. 6b to FIG. 6g can be used alone or in combination.

FIG. 7 is a schematic structural diagram wherein two-dimensional surrounding parameter configuration windows of a plurality of surrounding objects are sequentially associated in accordance with an embodiment of the present disclosure. Specifically, the case wherein two-dimensional surrounding parameter configuration windows of 3 surrounding objects are associated with each other is shown in an effect editing interface shown in FIG. 7. It is assumed that the 3 surrounding objects in FIG. 7 are surrounding objects s1, s2, and s3, respectively, wherein a two-dimensional surrounding parameter configuration window corresponding to the surrounding object s1 is r1, a two-dimensional surrounding parameter configuration window corresponding to the surrounding object s2 is r2, and a two-dimensional surrounding parameter configuration window corresponding to the surrounding object s3 is r3.

Referring to FIG. 7, a start surrounding configuration item of r1 is connected with a clicking-screen event detection component; a start-surrounding trigger configuration item of r1 is connected with a start surrounding configuration item of r2; and a start-surrounding trigger configuration item of r2 is connected with a start surrounding configuration item of r3. By associating the two-dimensional surrounding parameter configuration windows corresponding to the 3 surrounding objects respectively in the manner shown in FIG. 7, when the clicking-screen event detection component detects an event of clicking a screen by the user, the surrounding objects s1, s2, and s3 can be controlled to synchronously start revolving.

When the surrounding animation effect is practically made, if there are further more surrounding objects, the plurality of surrounding animation effects can be associated in a similar manner to that shown in FIG. 7. Of course, it is no limited to the association manner shown in FIG. 7, and the association may be made by means of other configuration items.

Figure 8:
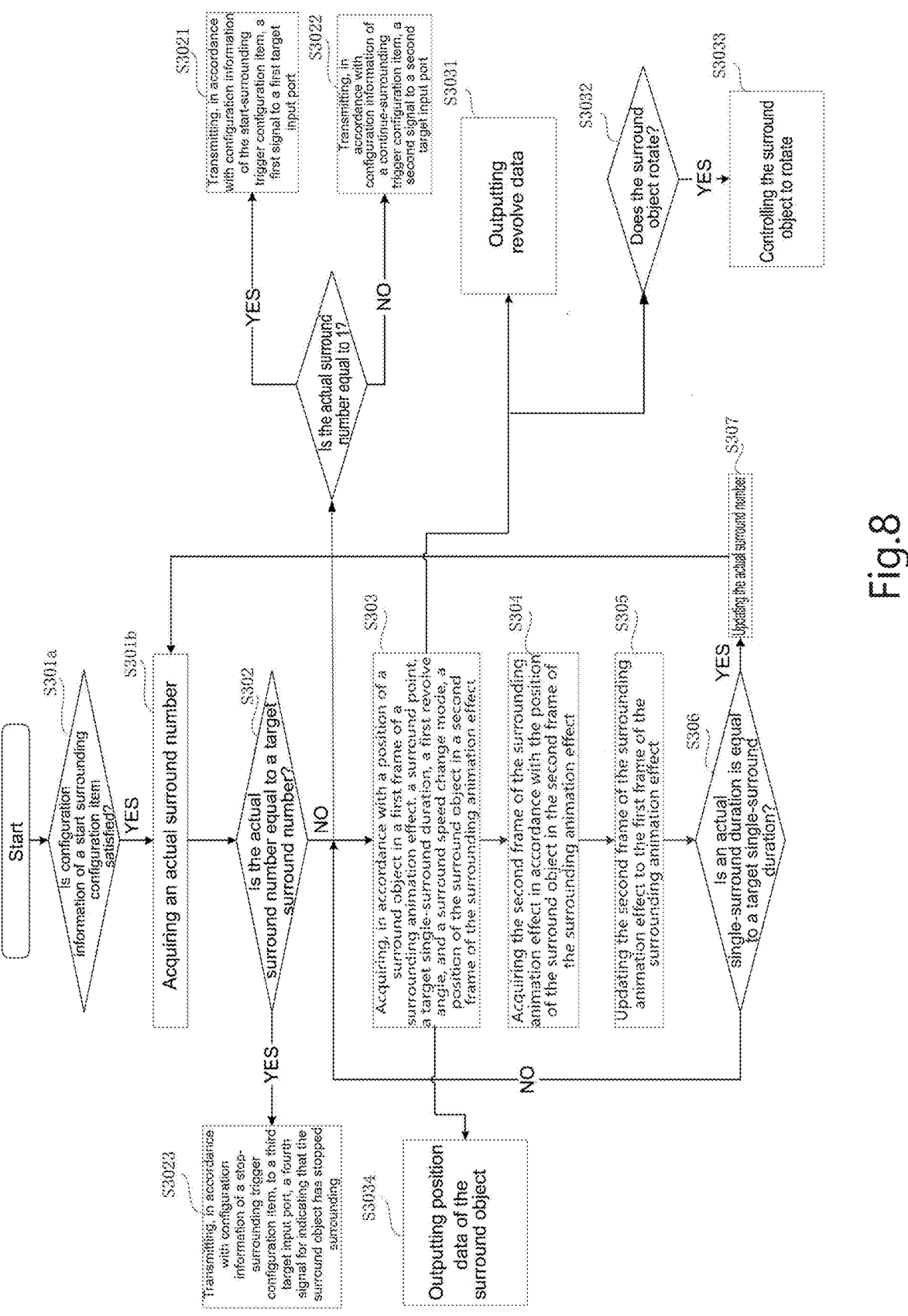
FIG. 8 is a flowchart of a method for processing a surrounding animation effect in accordance with another embodiment of the present disclosure.

FIG. 8 is a flowchart of a control principle of a target two-dimensional surrounding animation effect in accordance with an embodiment of the present disclosure. Exemplarily, taking one surrounding object as an example, the control principle of the target two-dimensional surrounding animation effect may include the following steps:

S301a: detecting whether configuration information of a start surrounding configuration item is satisfied.

When it is detected that the configuration information of the start surrounding configuration item is satisfied, a start surrounding identification is set to "true", and an actual surrounding number of the surrounding object is acquired. When the configuration information of the start surrounding configuration item is not satisfied, a start surrounding identification is "false".

In some cases, there might not be any trigger condition for triggering the surrounding object to start surrounding, then the start surrounding identification is "true" in the configuration file, without the need of detecting whether the configuration information of the start surrounding configuration item is satisfied, that is, the step S301a can be omitted, and the state of the start surrounding identification can be directly detected.

S301b: acquiring the actual surrounding number. An initial value of the actual surrounding number may be 0.

S302: determining whether the actual surrounding number is equal to a target surrounding number. If the actual surrounding number is less than the target surrounding number, step S303 is performed. If the actual surrounding number is equal to the target surrounding number, the surrounding is stopped.

S303: acquiring a position of the surrounding object in a second frame of the surrounding animation effect in accordance with a position of the surrounding object in a first frame of the surrounding animation effect, a surrounded point, and a second revolve angle.

Herein, the first frame of the surrounding animation effect and the second frame of the surrounding animation effect are two adjacent frames of the surrounding animation effect, and the first frame of the surrounding animation effect precedes the second frame of the surrounding animation effect; and an initial value of the position of the surrounding object in the first frame of the surrounding animation effect is a position of the surrounding object set when the surrounding object is acquired.

Herein, the position of the surrounding object set when the surrounding object is acquired may also be referred to as an initial position of the surrounding object. Optionally, the initial position of the surrounding object may be acquired by a component for bearing attribute information of the surrounding object in a 2D transform component for the surrounding object.

A possible implementation may include the following steps:

first, acquiring a time difference between the first frame of the surrounding animation effect and the second frame of the surrounding animation effect.

Next, performing calculation in accordance with a target single-surrounding duration, a first revolve angle, a surrounding speed change mode, and the time difference between the first frame of the surrounding animation effect and the second frame of the surrounding animation effect to acquire the second revolve angle. The second revolve angle refers to an angle at which the surrounding object needs to revolve when the first frame of the surrounding animation effect is updated to the second frame of the surrounding animation effect.

Then, acquiring the position of the surrounding object in the second frame of the surrounding animation effect in accordance with the position of the surrounding object in the first frame of the surrounding animation effect, the surrounded point, and the second revolve angle. Specifically, calculation is performed in accordance with the surrounded point and the second revolve angle to acquire a coordinate transformation matrix; and then calculation is performed in accordance with the coordinate transformation matrix and the position of the surrounding object in the first frame of the surrounding animation effect to acquire the position of the surrounding object in the second frame of the surrounding animation effect.

Hereinafter, a detailed description will be given in conjunction with the above-described implementation of acquiring the position of the surrounding object in the second frame of the surrounding animation effect and a coordinate system shown in FIG. 9.

Figure 9:
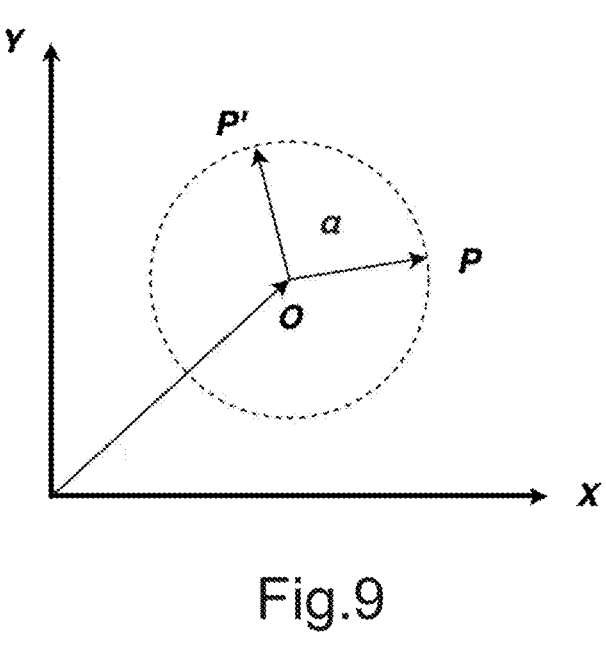
FIG. 9 is a schematic diagram of a position change of a surrounding object in accordance with the present disclosure.

Referring to FIG. 9, an XY coordinate system is established. A surrounding object revolves in the XY coordinate system by taking a surrounded point O as a revolve center, wherein the point O has a coordinate of $(x_0, y_0)$. And the surrounding object revolves an angle $\alpha$ within unit time dt, from a point P to a point P', wherein the point P has a coordinate of $(x_1, y_1)$, and the point P' has a coordinate of $(x', y')$.

The unit time dt mentioned herein is the above-described time difference between the first frame of the surrounding animation effect and the second frame of the surrounding animation effect; and the revolve angle of the surrounding object within unit time dt is $\alpha$, which is the above-described second revolve angle.

The second revolve angle $\alpha$ is acquired by calculation in accordance with a curve type corresponding to a surrounding speed change mode configured by a surrounding speed change mode configuration item, a target single-surrounding duration, the unit time difference dt, and the first revolve angle.

A revolve matrix for the angle $\alpha$ satisfies formula (1), which is as follows:

$$\begin{bmatrix} \cos(\alpha) & -\sin(\alpha) \\ \sin(\alpha) & \cos(\alpha) \end{bmatrix} \qquad \text{Formula (1)}$$

The formula (1) is also a revolve matrix for rotation of the surrounding object.

A vector that needs to revolve is denoted as $\overrightarrow{OP} = (x_1 - x_0, y_1 - y_0)$.

The vector $\overrightarrow{OP'}$ after revolving is acquired by matrix computation, and satisfies formula (2):

$$\begin{bmatrix} x_2 \\ y_2 \end{bmatrix} = \begin{bmatrix} \cos(\alpha) & -\sin(\alpha) \\ \sin(\alpha) & \cos(\alpha) \end{bmatrix} \begin{bmatrix} x_1 - x_0 \\ y_1 - y_0 \end{bmatrix} \qquad \text{Formula (2)}$$

The coordinate of the point P' satisfies formula (3), which is as follows:

$$x' = x_2 + x_0 \qquad \text{Formula (3)}$$
$$y' = y_2 + y_0$$

S304: acquiring the second frame of the surrounding animation effect in accordance with the position of the surrounding object in the second frame of the surrounding animation effect.

Specifically, in accordance with the position of the surrounding object in the second frame of the surrounding animation effect, the attribute information (i.e., the position information) of the surrounding object borne in the 2D transform component is updated, thereby acquiring the second frame of the surrounding animation effect.

S305: updating the second frame of the surrounding animation effect to the first frame of the surrounding animation effect.

S306: detecting an actual single-surrounding duration of the surrounding object, and determining whether the actual single-surrounding duration is equal to the target single-surrounding duration.

If the actual single-surrounding duration is less than the target single-surrounding duration, the process returns to the steps S303 to S306; and if the actual single-surrounding duration is equal to the target single-surrounding duration, step S307 is performed.

S307: updating the actual surrounding number; and returning to the steps S301b to S306. Specifically, the value of the actual surrounding number is increased by 1.

By performing the above steps S301a to S307, the surrounding is stopped until the actual surrounding number is equal to the target surrounding number.

Optionally, in the above process, when it is determined whether the actual surrounding number is equal to the target surrounding number, if it is determined that the actual surrounding number is equal to 1, step S3021 may be further performed: in accordance with configuration information of a start-surrounding trigger configuration item, transmitting, to a first target input port, a first signal for indicating that the surrounding object has started surrounding.

Herein, the first target input port is an input port of a module or component connected with an output port of the start-surrounding trigger configuration item.

Optionally, in the above process, when determining whether the actual surrounding number is equal to the target surrounding number, if it is determined that the actual surrounding number is greater than 1 and less than the target surrounding number, step S3022 may be further performed: in accordance with configuration information of a continue-surrounding trigger configuration item, transmitting, to a second target input port, a second signal for indicating that the surrounding object has continued surrounding.

The second target input port is an input port of the module or component connected with an output port of the continue-surrounding trigger configuration item.

Optionally, in the above process, when it is determined that the actual surrounding number is equal to the target surrounding number, step S3023 may be further performed: if the actual surrounding number is equal to the target surrounding number, in accordance with configuration information of a stop-surrounding trigger configuration item, transmitting, to a third target input port, a fourth signal for indicating that the surrounding object has stopped surrounding.

The third target input port is an interaction interface of a module or component connected with an output port of the stop-surrounding trigger configuration item.

Optionally, after the step S303 is performed, S3031: outputting revolve data, may be further included.

Specifically, the revolve data of the surrounding object is delivered to a fourth target input port, wherein the revolve data includes an angle at which the surrounding object has already revolved in a current surrounding cycle.

The fourth target input port is an input port of a module or component connected with a revolve data output configuration item associated with the surrounding object in the effect editing interface.

Optionally, the following steps may be further included:

S3032: determining whether the surrounding object rotates. If the surrounding object rotates, step S3033 is performed.

S3033: controlling the surrounding object to rotate.

Specifically, it can be determined whether it is needed to control the surrounding object to rotate in accordance with configuration information of a surrounding object rotation configuration item. If it is determined that the surrounding object needs to rotate, the surrounding object is controlled to rotate, in accordance with the revolve matrix in the formula (1).

Further, S3034: outputting position data of the surrounding object, may be further included.

Specifically, the position data of the surrounding object is delivered to a fifth target input port. The position data of the surrounding object comprises the position of the surrounding object in the second frame of the surrounding animation effect.

The fifth target input port is an input port of a module or component connected with a position data output configuration item associated with the surrounding object in the effect editing interface.

Optionally, in the above process, if it is detected that configuration information of a pause surrounding configuration item is satisfied, a start surrounding identification is set to "false", a pause surrounding identification is set to "true", and the surrounding object is controlled to pause surrounding. If the pause-surrounding trigger configuration item is connected with a corresponding port, a signal indicating that the surrounding object has paused surrounding is delivered to a port connected with the pause-surrounding trigger configuration item.

Optionally, assuming that the surrounding object is in a pause surrounding state, if it is detected that configuration information of a continue surrounding configuration item is satisfied, a start surrounding identification is set to "true", a pause surrounding identification is set to "false", and the surrounding object is controlled to continue surrounding from a pause position.

Optionally, in the above process, if it is detected that configuration information of a stop surrounding configuration item is satisfied, a start surrounding identification is set to "false", a stop surrounding identification is set to "true", and the surrounding object is controlled to pause surrounding, and in accordance with the component bearing the attribute information of the surrounding object in the 2D transform component, an initial position of the surrounding object is acquired, and the surrounding object is restored to the initial position.

The above process is a implementation principle for updating the frame of the surrounding animation effect for one surrounding object, and if the target two-dimensional surrounding animation effect comprises a plurality of surrounding objects, the above process is executed for each surrounding object, so that the update can be synchronously performed.

Exemplarily, the present disclosure provides an apparatus for processing the surrounding animation effect.

Figure 10:
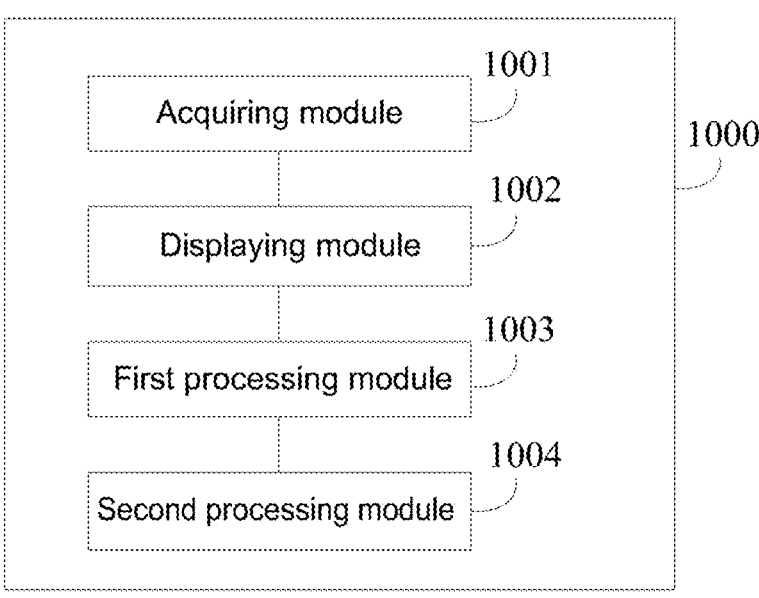
FIG. 10 is a schematic structural diagram of an apparatus for processing a surrounding animation effect in accordance with an embodiment of the present disclosure.

FIG. 10 is a schematic structural diagram of an apparatus for processing the surrounding animation effect in accordance with an embodiment of the present disclosure. As shown in FIG. 10, the apparatus 1000 for processing the surrounding animation effect in accordance with this embodiment comprises:

an acquiring module 1001 configured to acquire a surrounding object;

a displaying module 1002 configured to display a two-dimensional surrounding parameter configuration window;

a first processing module 1003 configured to associate the surrounding object with the two-dimensional surrounding parameter configuration window; wherein the two-dimensional surrounding parameter configuration window comprises a plurality of configuration items for generating a target two-dimensional surrounding animation effect; and to generate a configuration file for the target two-dimensional surrounding animation effect in accordance with configuration information of the plurality of configuration items; wherein the target two-dimensional surrounding animation effect is an animation effect that the surrounding object surrounds around a surrounded point on a two-dimensional plane.

The apparatus provided by this embodiment may be used for executing the technical solution in any of the above method embodiments, and has similar implementation principle and technical effects, so that reference may be made to the detailed description in the foregoing method embodiments, which is not repeated herein for brevity.

In some embodiments of the present disclosure, alternatively, the apparatus 1000 for processing the surrounding animation effect may comprise:

an acquiring module 1001 configured to acquire a surrounding object;

a displaying module 1002 configured to display a surrounding parameter configuration window;

a first processing module 1003 configured to associate the surrounding object with the surrounding parameter configuration window; wherein the surrounding parameter configuration window comprises a plurality of configuration items for generating a target surrounding animation effect; and a second processing module 1004 configured to generate a configuration file for the target surrounding animation effect in accordance with configuration information of the plurality of configuration items; wherein the target surrounding animation effect is an animation effect that the surrounding object surrounds a surrounded point with the surrounded point as a center.

Hereinafter, the case where the target surrounding animation effect is a three-dimensional target surrounding animation effect will be described with reference to FIGS. 11 to 20.

FIG. 11 is a flowchart of a method for processing a surrounding animation effect in accordance with an embodiment of the present disclosure. Referring to FIG. 11, the method of this embodiment comprises:

S401, acquiring a surrounding object.

In a possible implementation, an apparatus for processing the surrounding animation effect can provide an effect editing interface, wherein the effect editing interface can also be referred to as a visualized creation interface; and the user can add a 3D transform component in the effect editing interface by inputting a 3D transform component adding instruction.

Herein, the 3D transform component is a set of visualized components bearing the surrounding object. The 3D transform component may be one set of visualized functions provided by the apparatus for processing a surrounding animation effect. Exemplarily, the 3D transform component may include a first component for bearing information of the surrounding object itself, and a second component for bearing attribute information of the surrounding object. Next, by operating interaction interfaces provided by the first component and the second component, the information of the surrounding object itself is stored into the first component, and the attribute information of the surrounding object is stored into the second component.

It should be understood that, the 3D transform component may further include a component for bearing other information of the surrounding object, and the user may perform relevant settings by operating a corresponding component, which is not limited in the embodiment of the present disclosure.

S402, displaying a three-dimensional surrounding parameter configuration window, and associating the surrounding object with the three-dimensional surrounding parameter configuration window; wherein the three-dimensional surrounding parameter configuration window comprises a plurality of configuration items for generating a three-dimensional surrounding animation effect.

In a possible implementation, in accordance with a three-dimensional surrounding parameter configuration window adding instruction inputted by the user, the three-dimensional surrounding parameter configuration window is displayed in an interface (for example, the foregoing effect editing interface) provided by the apparatus for processing the surrounding animation effect.

Herein, the implementation of inputting the three-dimensional surrounding parameter configuration window adding instruction by the user may be similar to that of inputting the 3D transform component adding instruction by the user, so that reference can be made to the description in step S401, which is not repeated herein for brevity.

Hereinafter, a detailed description will be made for the three-dimensional surrounding parameter configuration window by FIGS. 12a to 12g.

First, how to associate the 3D transform component of the surrounding object with the three-dimensional surrounding parameter configuration window is exemplarily described.

Exemplarily, reference is made to a three-dimensional surrounding parameter configuration window 200 shown in FIG. 12a, which includes: a 3D transform component configuration item w1'. The 3D transform component configuration item w1' includes a visualized input port w2'. The input port w2' is an interaction interface for associating the 3D surrounding component of the surrounding object.

Therefore, exemplarily, the interaction interface of the 3D transform component corresponding to the surrounding object may be connected with the input port w2' of the 3D transform component configuration item w1' in the three-dimensional surrounding parameter configuration window, thereby associating the surrounding object with the three-dimensional surrounding parameter configuration window.

Functions and configurations of the 3D transform component configuration item w1' and the visualized input port w2' shown in FIG. 12a are similar to those of the 2D transform component configuration item w1 and the visualized input port w2 described with reference to FIG. 3a, so that they are not repeated herein.

Next, in conjunction with FIGS. 12b to 12h, a detailed description will be made to other configuration items provided in the three-dimensional surrounding parameter configuration window, than the 3D transform component configuration item.

In this solution, the three-dimensional surrounding parameter configuration window may include: one or more of a surrounded point configuration item, a surrounding axis system configuration item, a first revolve angle configuration item, a revolve speed change mode configuration item, a target single-surrounding duration configuration item, a target surrounding number configuration item, and a surrounding object rotation configuration item.

It can be understood that each of the above configuration items corresponds to one three-dimensional surrounding parameter.

FIG. 12b exemplarily illustrates an schematic interface diagram of a three-dimensional surrounding parameter configuration window. The three-dimensional surrounding parameter configuration window 200 described with reference to FIG. 12b includes: a surrounded point configuration item, a surrounding axis system configuration item, a first revolve angle configuration item, a revolve speed change mode configuration item, a target single-surrounding duration configuration item, and a target surrounding number configuration item.

In a practical application, if some three-dimensional surrounding parameters adopt uniform default values, the configuration item may be displayed in the three-dimensional surrounding parameter configuration window, or the configuration item for the three-dimensional surrounding parameter may not be displayed. Of course, if there are further more three-dimensional surrounding parameters for the user to configure, more configuration items for the three-dimensional surrounding parameters may be set in the three-dimensional surrounding parameter configuration window, to satisfy the flexible configuration of the three-dimensional surrounding parameters.

The configuration items shown in FIG. 12*b* are described below one by one:

1. Surrounded Point Configuration Item 201:

Herein, a surrounded point configured in the surrounded point configuration item 201 is one point on a surrounding axis system.

Because there are numerous surrounding planes perpendicular to the surrounding axis system, when a first surrounding plane where the surrounding object is located and a second surrounding plane where the surrounded point is located are the same plane, the surrounded point configured in the surrounded point configuration item 201 is an actual revolve center of the surrounding object; and when the first surrounding plane where the surrounding object is located and the second surrounding plane where the surrounded point is located are different surrounding planes, the surrounded point configured in the surrounded point configuration item 201 is not an actual revolve center of the surrounding object; in this case, the actual revolve center of the surrounding object is an intersection point between the first surrounding plane and the surrounding axis system, and the actual revolve center of the surrounding object can be determined by calculation in accordance with the surrounded point.

That is to say, the surrounded point in this solution have at least the following functions: 1. determining the surrounding axis system; and 2. determining the actual revolve center of the surrounding object.

The surrounded point configured in the surrounded point configuration item 201 is one point in a three-dimensional space. The "three-dimensional space" mentioned herein may be defined by a three-dimensional coordinate system; and assuming that the three-dimensional coordinate system is an XYZ coordinate system, a position of the surrounded point may be determined by coordinate values in three directions of an X-axis, a Y-axis, and a Z-axis.

In a possible implementation, referring to FIG. 12*b*, the surrounded point configuration item 201 includes: a coordinate input area 2011. The coordinate input area 2011 may include an input box 201*a* for the x-axis coordinate, an input box 201*b* for the y-axis coordinate, and an input box 201*c* for the z-axis coordinate, so that the user may configure the position of the surrounded point in the three-dimensional space by operating the input boxes 201*a*, 201*b*, and 201*c*, respectively.

Optionally, the x-axis, y-axis, and z-axis coordinate values of the surrounded point may be normalized coordinate values or non-normalized coordinate values. For example, an x-axis coordinate value of 0.5, a y-axis coordinate value of 0.5, and a z-axis coordinate value of 0.5 shown in FIG. 12*b* are all normalized coordinate values.

It should be noted that the surrounded point configured by the input boxes 201*a*, 201*b*, and 201*c* is a fixed point, and the surrounding object revolves with the fixed surrounded point as the revolve center in each surrounding cycle.

Optionally, in the three-dimensional surrounding configuration window 200, a set of default coordinate values may be displayed in the input boxes 201*a*, 201*b*, and 201*c* of the surrounded point configuration item 201. If the default coordinate values of the surrounded point meets the requirements of the user, reconfiguration by the user is not needed, which can reduce user operations and improve the production efficiency of the effect.

In another possible implementation, referring to FIG. 12*b*, the surrounded point configuration item 201 may include a visualized input port 2012, which may receive configuration information of the surrounded point delivered by another module or component.

The "another module or component" mentioned herein may be, but is not limited to, an addition computation module, a subtraction computation module, a division computation module, a random-number generation module, a clicking-screen event detection component, or the like. When the surrounding animation effect is practically made, an interaction interface provided by a visualization module or component to be associated is connected with the input port 2012, and the specific implementation of the connection is similar to the foregoing implementation of connecting the 3D transform component with the 3D transform component configuration items.

Figures 12C, 12D:
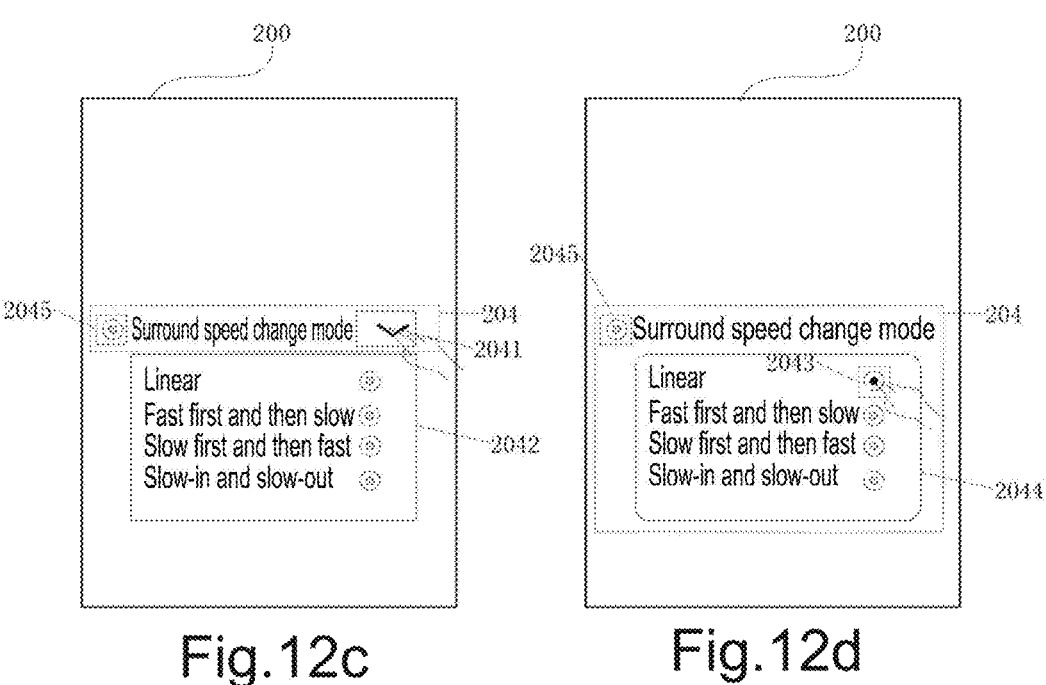
Figures 12E, 12F:
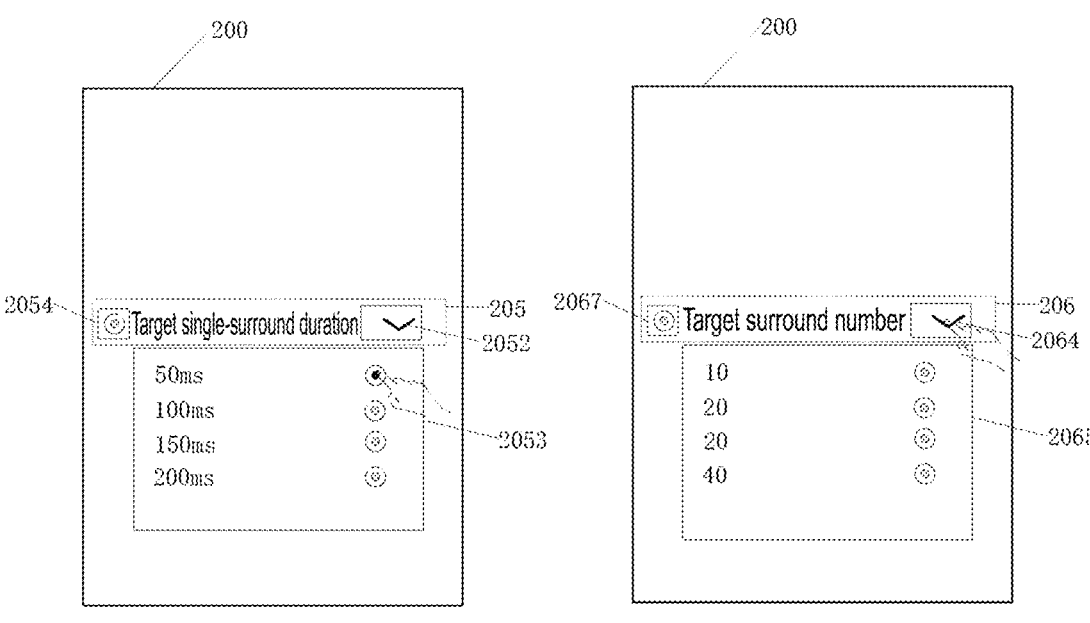
Figure 12G:
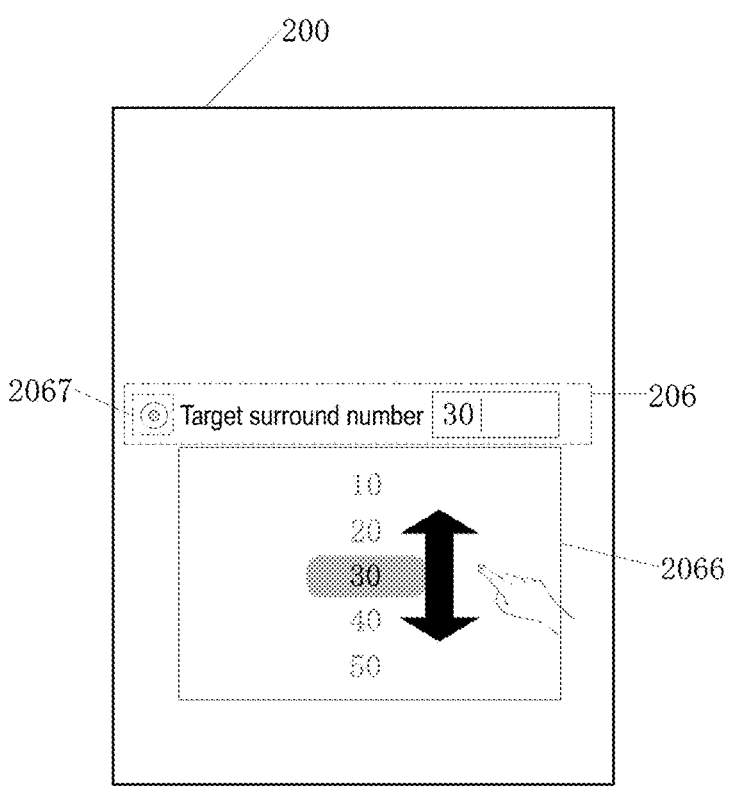
Figure 12H:
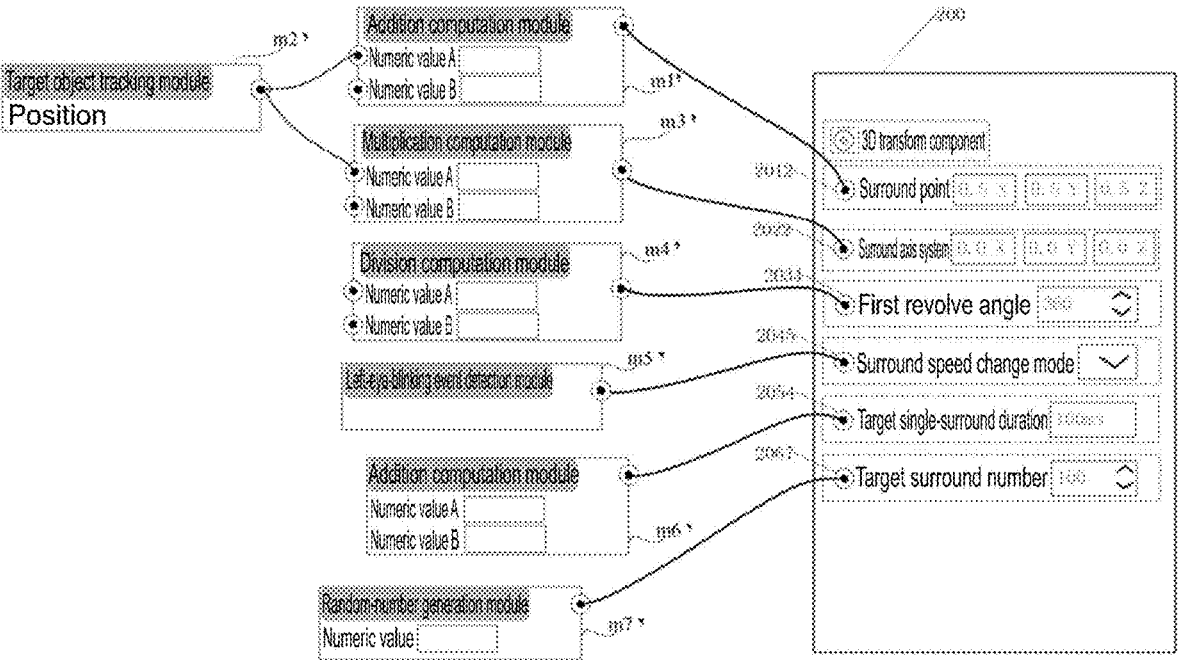

Exemplarily, referring to FIG. 12*h*, an interaction interface of an addition computation module m1' is connected with the input port 2012 by a line, so that the interaction interface of the addition computation module m1' can deliver an addition computation result of values A and B to the input port 2012 to configure the addition computation result as the surrounded point.

And in a practical application, the module or component connected with the input port 2012 may also be connected with one or more modules or components, and acquire data for the addition computation from the connected module or component. Exemplarily, as shown in FIG. 12*h*, the addition computation module m1' is also connected with a target object tracking module m2', so that the target object tracking module m2' delivers a detected position of a target object to the addition computation module m1'.

In this solution, the surrounded point configured through the input port 2012 may be fixed or may be dynamically changed. For example, the surrounded point configured through the input port 2012 may be periodically transformed in accordance with discrete points with a fixed interval on a curve (e.g., a circle, a triangle, an ellipse, or the like) of a certain shape; and for another example, a position of the surrounding object b in a current frame of the surrounding animation effect may be configured as a surrounded point of the surrounding object a in a next frame of the surrounding animation effect through the input port 2012.

In a practical application, the three-dimensional surrounding parameter configuration window 200 may only include the coordinate input area 2011, or only include the visualized input port 2012, or, as shown in FIG. 12*b*, will provide both the two configuration modes of the coordinate input area 2011 and the input port 2012 for the user to select.

2. Surrounding Axis System Configuration Item 202

Herein, the surrounding axis system may also be referred to as a surrounding axis, revolve axis, first revolve axis, or other names. The surrounding axis system represents a straight line passing through the surrounded point and being perpendicular to a revolve plane, wherein the surrounded point is located on the revolve plane.

In a possible implementation, referring to FIG. 12*b*, the surrounding axis system configuration item 202 includes: an input area 2021. The input area 2021 may include an input box 202*a* for an x-axis coordinate, an input box 202*b* for a y-axis coordinate, and an input box 202*c* for a z-axis coordinate.

It should be noted that the above input boxes 202a, 202b and 202c determine one reference point in the three-dimensional coordinate system; and the surrounding axis system is determined in accordance with this reference point and the surrounded point. Specifically, in accordance with this reference point and the surrounded point, one line segment can be determined by taking the reference point and the surrounded point as end points, and this line segment is infinitely extended in two extension directions, so that the acquired straight line is the surrounding axis system.

Specifically, the user can configure coordinates of the above reference point in the x-axis, the y-axis, and the z-axis by operating the input box 202a, the input box 202b, and the input box 202c, respectively.

Optionally, the x-axis coordinate value, the y-axis coordinate value, and the z-axis coordinate value of the reference point may be normalized coordinate values, or non-normalized coordinate values. For example, an x-axis coordinate value of 0.1, a y-axis coordinate value of 0.1, and a z-axis coordinate value of 0.1 shown in FIG. 12b are all normalized coordinate values.

Optionally, in the three-dimensional surrounding configuration window 200, a set of default coordinate values of the reference point may be displayed in the input box 202a, the input box 202b, and the input box 202c included in the surrounding axis system configuration item 202. If the default coordinate values of the reference point meets the requirements of the user, reconfiguration by the user is not needed, which can reduce user operations and improve the production efficiency of the effect.

In another possible implementation, referring to FIG. 12b, the surrounding axis system configuration item 202 may include a visualized input port 2022, which may receive configuration information of the reference point delivered by another module or component.

The "another module or component" mentioned herein may be, but is not limited to, an addition computation module, a subtraction computation module, a multiplication computation module, a division computation module, a random-number generation module, a clicking-screen event detection component, or the like. When the surrounding animation effect is practically made, it is enough to connect the input port 2022 with an interaction interface provided by a visualization module or component to be associated, and the specific implementation of the connection is similar to the foregoing implementation of connecting the 3D transform component with the 3D transform component configuration items.

Exemplarily, referring to FIG. 12h, an interaction interface of a multiplication computation module m3' is connected with the input port 2022 by a line, so that the interaction interface of the multiplication computation module m3' can deliver the addition computation result to the input port 2022, to configure the multiplication computation result as a reference point for determining the surrounding axis system.

And in a practical application, the component or module connected with the input port 2022 may also be connected with one or more modules or components, and acquire data for addition computation from the connected module or component. Exemplarily, as shown in FIG. 12h, the multiplication computation module m3' is also connected with the target object tracking module m2', so that the target object tracking module m2' delivers a detected position of a target object to the multiplication computation module m3'.

In this solution, the reference point configured through the input port 2022 may be fixed or dynamically changed. For example, the reference point configured through the input port 2022 may be periodically transformed in accordance with discrete points with a fixed interval on a curve (such as a circle, a triangle, an ellipse, or the like) of a certain shape; and for another example, a position of another surrounding object in a current frame of the surrounding animation effect may be configured as the reference point through the input port 2022.

In a practical application, the three-dimensional surrounding parameter configuration window 200 may only include the input area 2021, or only include the visualized input port 2022, or, as shown in FIG. 12b, will provide both the two configuration modes of the input area 2021 and the input port 2022 for the user to select.

3. First Revolve Angle Configuration Item 203:

Herein, the first revolve angle represents a revolve angle corresponding to that the surrounding object revolves in the revolve plane for one cycle. For example, the first revolve angle may be, but is not limited to, 360 degrees, 270 degrees, 180 degrees, or the like.

The function and configuration of the first revolve angle configuration item 203 shown in FIG. 12b are similar to those of the first revolve angle configuration item 302 described with reference to FIG. 3b, so that they are not repeated herein. Exemplarily, referring to FIG. 12h, an interaction interface of a division computation module m4' is connected with an input port 2034 by a line, so that the interaction interface of the division computation module m4' can deliver a division computation result to the input port 2034, to configure the division computation result as the first revolve angle.

4. Surrounding Speed Change Mode Configuration Item 204

Herein, the surrounding speed change mode refers to a speed change mode of the surrounding object in one surrounding cycle. Exemplarily, the surrounding speed change mode may include, but is not limited to, linear, fast first and then slow, slow first and then fast, slow-in and slow-out, and the like. Herein, each surrounding speed change mode described above is represented by a corresponding function equation.

The function and configuration of the surrounding speed change mode configuration item 204 shown in FIGS. 12b to 12d are similar to those of the surrounding speed change mode configuration item 303 described with reference to FIGS. 3b to 3d, so that they are not repeated herein.

Exemplarily, referring to FIG. 12h, an interaction interface of a left-eye-blinking event detection module m5' is connected with an input port 2045 by a line, so that the interaction interface of the left-eye-blinking event detection module m5' can deliver a detection result to the input port 2045, so as to adopt a configured surrounding speed change mode when a left-eye-blinking event is detected.

5. Target Single-Surrounding Duration Configuration Item 205

Herein, the target single-surrounding duration represents a time required by the surrounding object to revolve for one surrounding cycle.

The function and configuration of the target single-surrounding duration configuration item 205 shown in FIGS. 12b and 12e are similar to those of the target single-surrounding duration configuration item 304 described with reference to FIGS. 3b and 3e, so that they are not repeated here.

Exemplarily, referring to FIG. 12h, an interaction interface of an addition computation module m6' is connected with an input port 2045 by a line, so that the interaction interface of the addition computation module m6' can deliver an addition computation result to the input port 2045, to configure the addition computation result as the target single-surrounding duration.

6. Target Surrounding Number Configuration Item 206

Herein, the target surrounding number represents a total number of surrounding cycles that the surrounding object needs to complete.

The function and configuration of the target surrounding number configuration item 206 shown in FIGS. 12*b* and 12*f* are similar to those of the target surrounding number configuration item 305 described with reference to FIGS. 3*b* and 3*f*, so that they are not repeated herein.

In another possible implementation, referring to FIG. 12*g*, when it is detected that the user inputs an operation (such as a click operation) for an input box 2061 shown in FIG. 12*b*, a digit scroll bar 2066 is displayed, and numeric values in the digit scroll bar are displayed in a display box. The user can adjust the value in the digit scroll bar by an operation (e.g., a sliding-up operation or a sliding-down operation), thereby configuring the target surrounding number.

Optionally, in conjunction with the cases shown in FIG. 12*b*, FIG. 12*f*, and FIG. 12*g*, the target surrounding number configuration item 206 may further include an input port 2067, wherein the input port 2067 is used for receiving configuration information of the target surrounding number delivered by other module or components.

Exemplarily, referring to FIG. 12*h*, an interaction interface of a random-number generation module m7' is connected with an input port 2054 by a line, so that the interaction interface of the random-number generation module m7' can deliver a generated random number to the input port 2054, to configure the random number as the target surrounding number.

In this solution, the configuration items for generating the target three-dimensional surrounding animation effect are provided in the three-dimensional surrounding parameter configuration window, for the user to operate, which convenient the user to configure the three-dimensional surrounding parameters. If the default values corresponding to the configuration items meet the requirements, the user does not need to modify the default values; and if the default values corresponding to the configuration items do not meet the requirements, reconfiguration can be performed in accordance with the user operation, so that the production efficiency of the effect can be improved.

S403, generating a configuration file for a target three-dimensional surrounding animation effect in accordance with the configuration information of the plurality of configuration items.

In this solution, the target three-dimensional surrounding animation effect is an animation effect that the surrounding object revolves in the three-dimensional space with the surrounded point as the revolve center. Herein, the surrounding plane where the surrounding object is located when surrounding in the three-dimensional space may be dynamically changed or unchanged, which is not limited by the present disclosure. And the surrounding plane is determined in accordance with the configuration information of the surrounded point configuration item and the surrounding axis system configuration item.

Specifically, for the surrounding object, the values of the configuration items displayed in the associated three-dimensional surrounding parameter configuration window are stored into an effect script template corresponding to the three-dimensional surrounding parameter configuration window, to acquire an effect script segment corresponding to the surrounding object.

In the method provided by this embodiment, by packaging requirements for making a three-dimensional surrounding animation effect, and providing a visual three-dimensional surrounding parameter configuration window for a user, the operation of the user is facilitated. After a component bearing a surrounding object is associated with the three-dimensional surrounding parameter configuration window, three-dimensional surrounding parameters corresponding to the surrounding object can be configured by operating configuration items provided in the three-dimensional surrounding parameter configuration window. And then, in accordance with the value of each configuration item in the three-dimensional surrounding parameter configuration window associated with the surrounding object, a configuration file of a target three-dimensional surrounding animation effect is automatically generated. As compared with the manner of handwriting scripts in the related art, the method provided by this embodiment is more convenient and fast, and can effectively improve the production efficiency of the three-dimensional surrounding animation effect. Moreover, the method provided by this embodiment can be suitable for the production and making of the target three-dimensional surrounding animation effect with any type of material as the surrounding object, and is wide in application range.

In a practical application scenario, for the target three-dimensional surrounding animation effect, information for controlling the surrounding object in the target three-dimensional surrounding animation effect to start surrounding, pause surround, continue surrounding, and stop surrounding might need to be configured. Therefore, the three-dimensional surrounding parameter configuration window may further include: an event-triggering type of configuration item; and wherein the event-triggering type of configuration item may include: one or more of a start surrounding configuration item, a pause surrounding configuration item, a continue surrounding configuration item, and a stop surrounding configuration item.

Correspondingly, if the user inputs a configuration operation for a first target configuration item, the configuration file corresponding to the target three-dimensional surrounding animation effect may further include configuration information of the first target configuration item. The first target configuration item may include one or more of the start surrounding configuration item, the pause surrounding configuration item, the continue surrounding configuration item, and the stop surrounding configuration item described above.

Figures 13A, 13B:
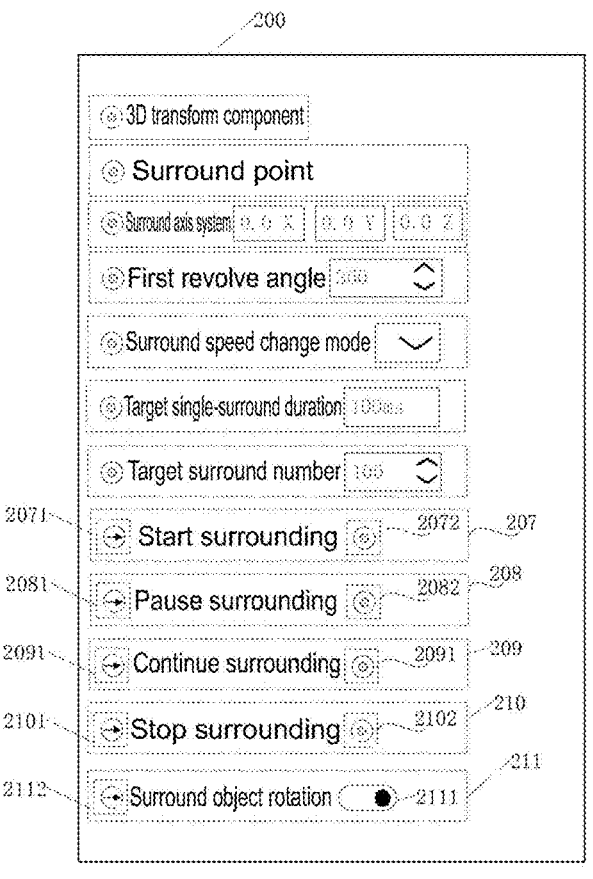
FIGS. 13a to 13b are schematic diagrams of a three-dimensional surrounding parameter configuration window in accordance with the present disclosure.
Figure 15:
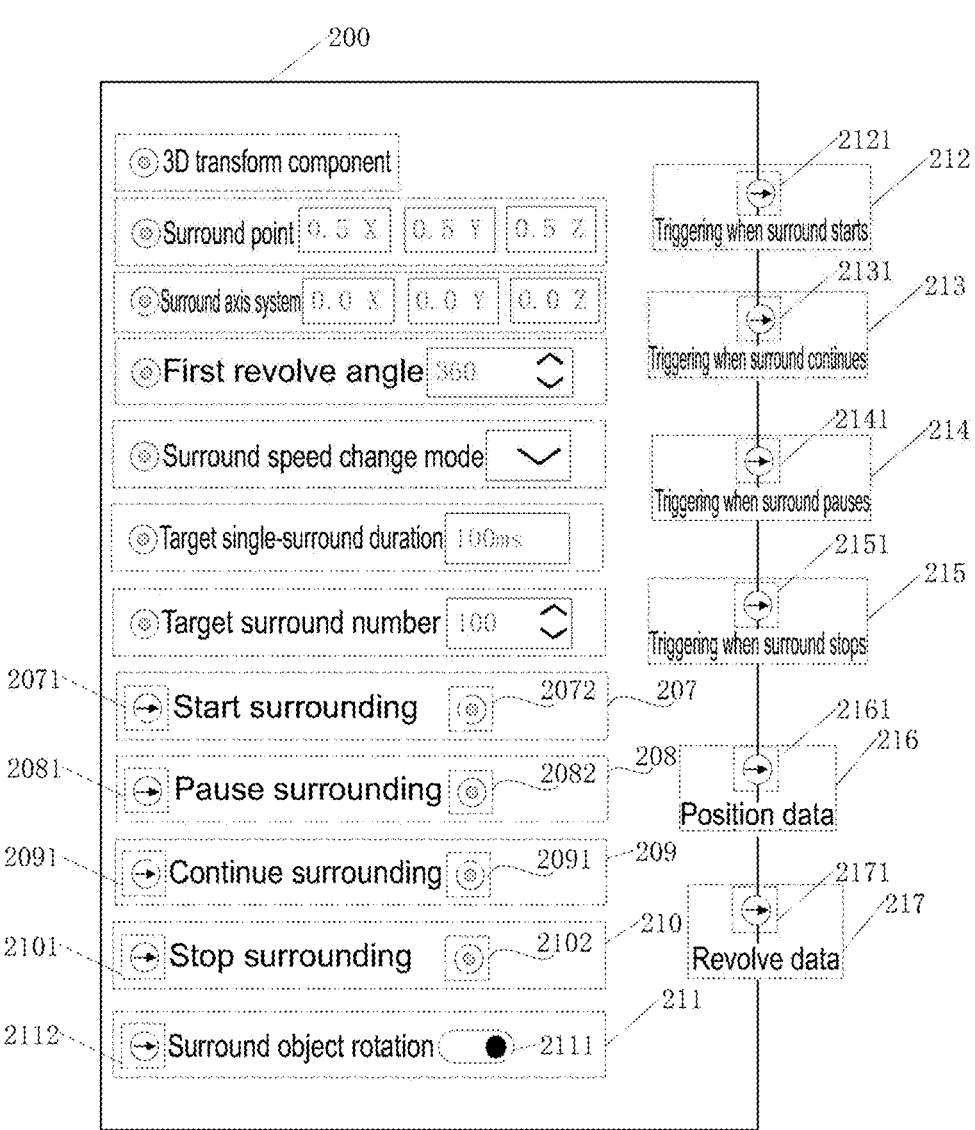
FIG. 15 is a schematic diagram of a three-dimensional surrounding parameter configuration window in accordance with the present disclosure.
Figure 16A:
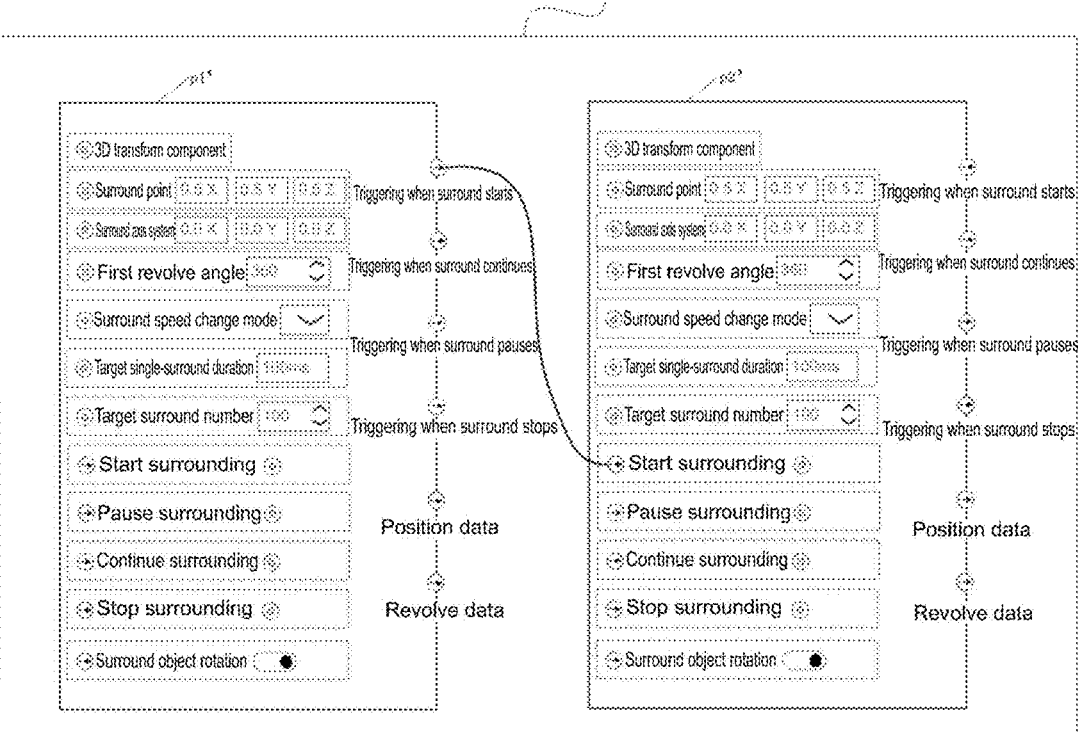
FIGS. 16a to 16f are schematic diagrams of a three-dimensional surrounding parameter configuration window in accordance with the present disclosure.
Figure 16B:
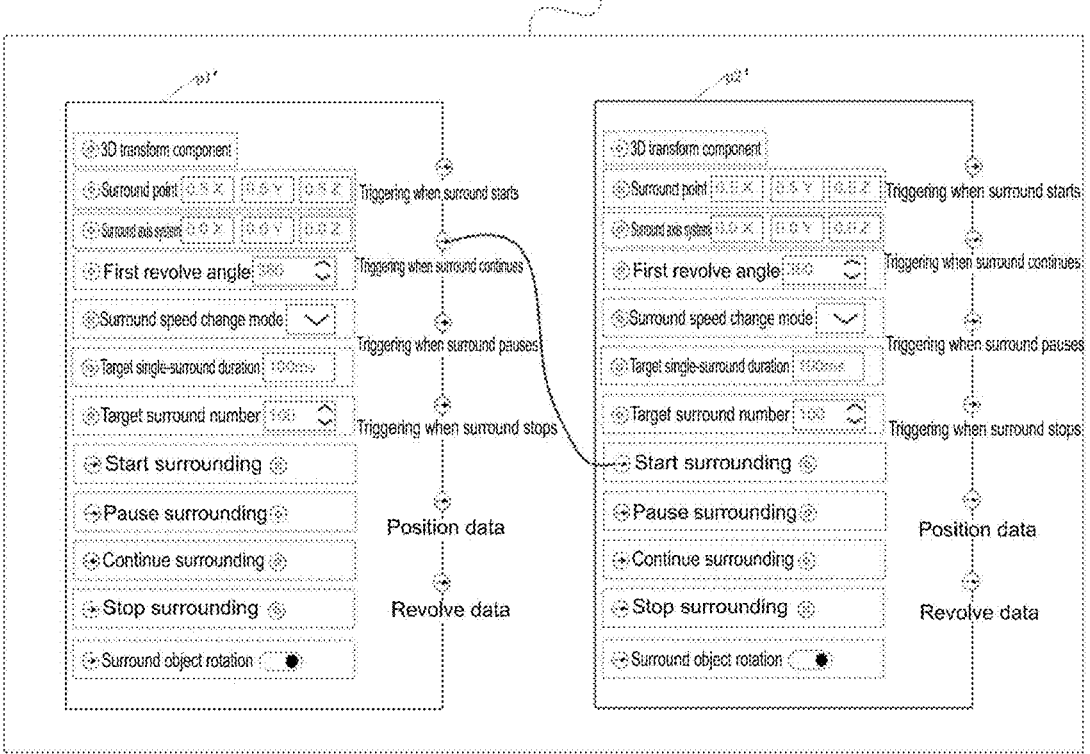
Figure 16C:
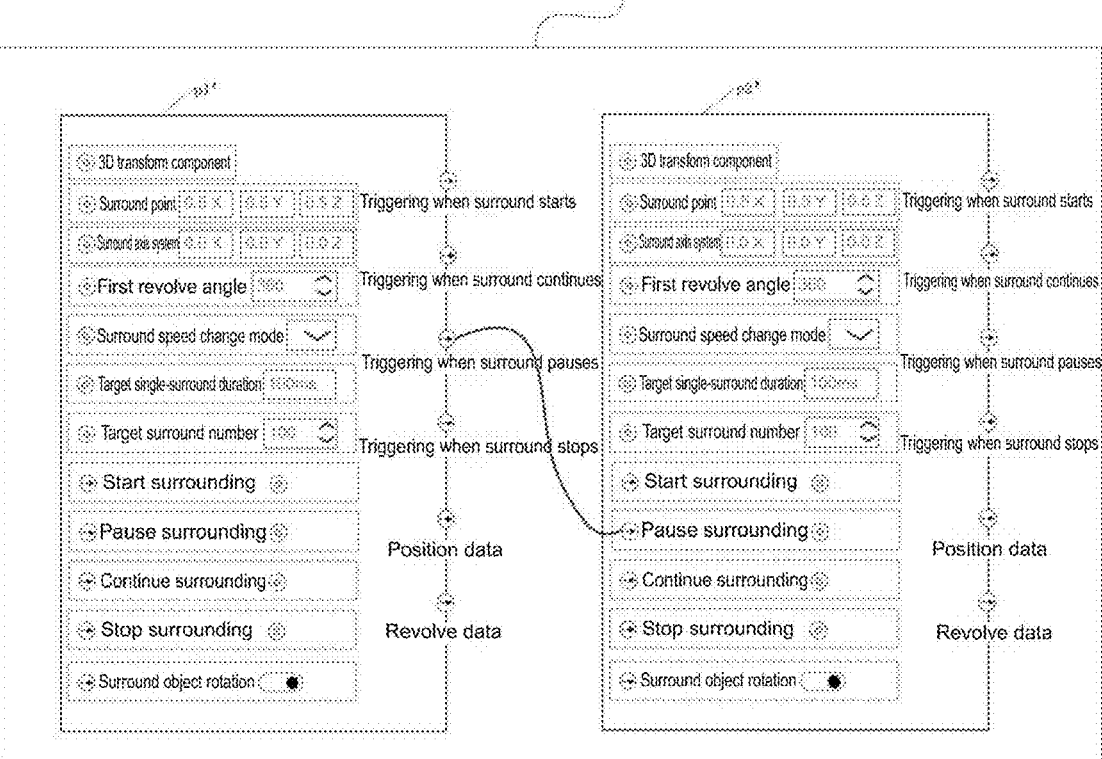
Figure 16D:
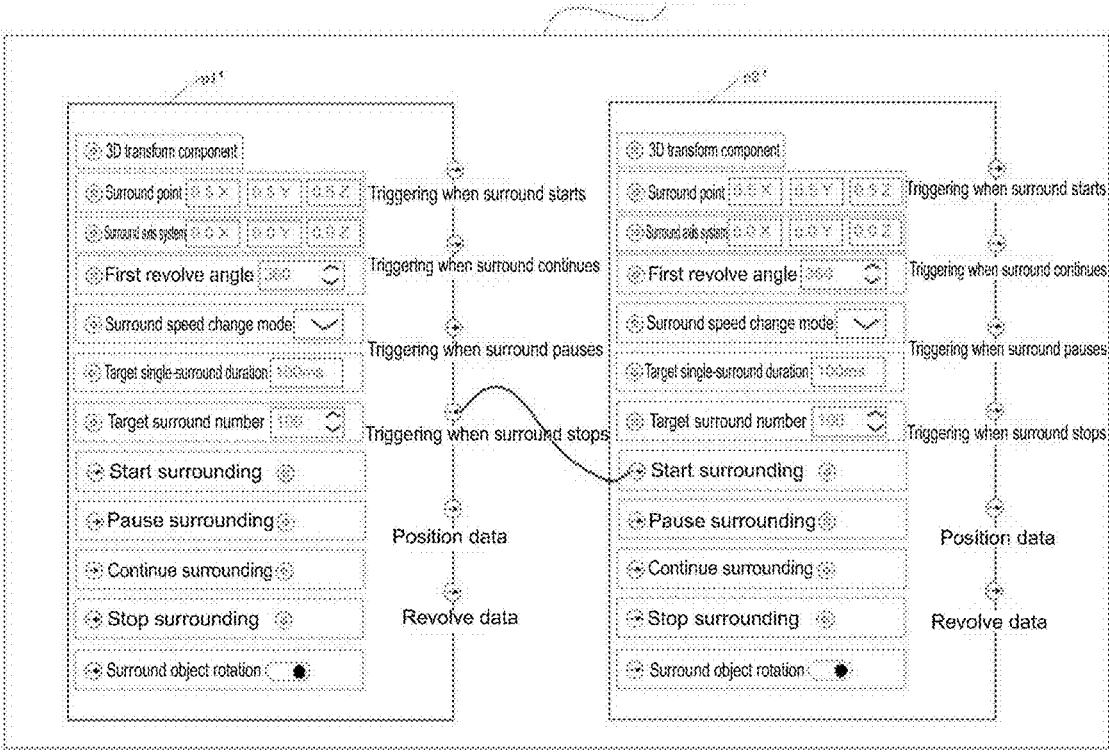
Figure 16E:
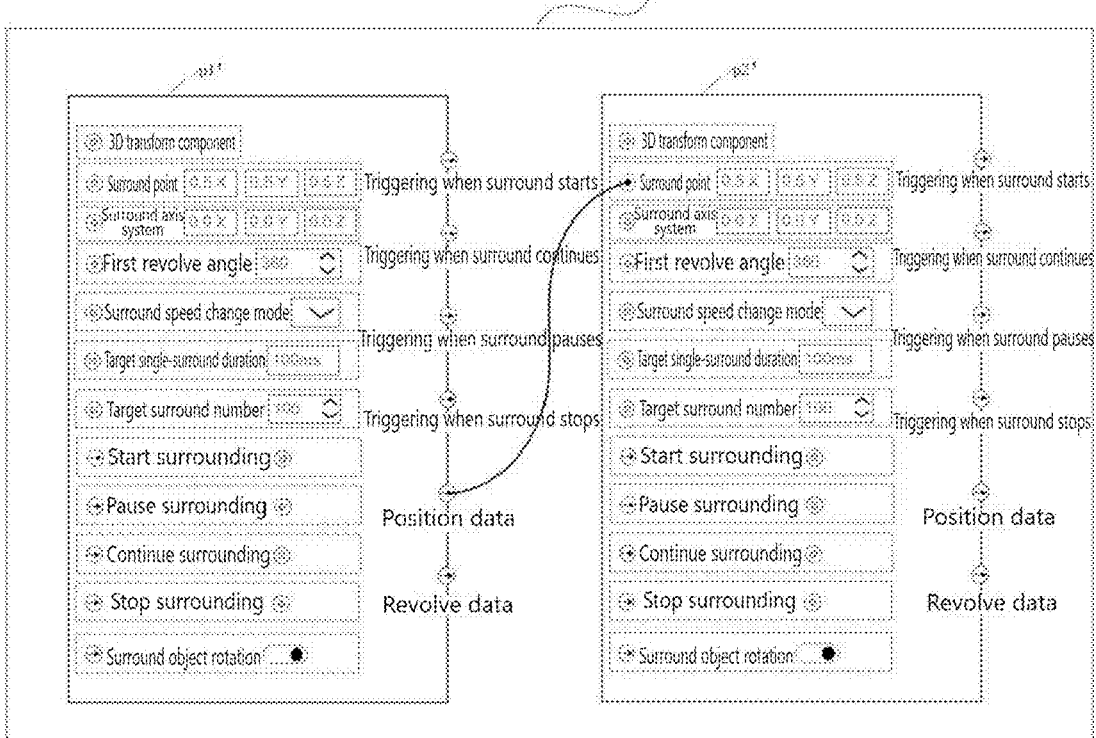
Figure 16F:
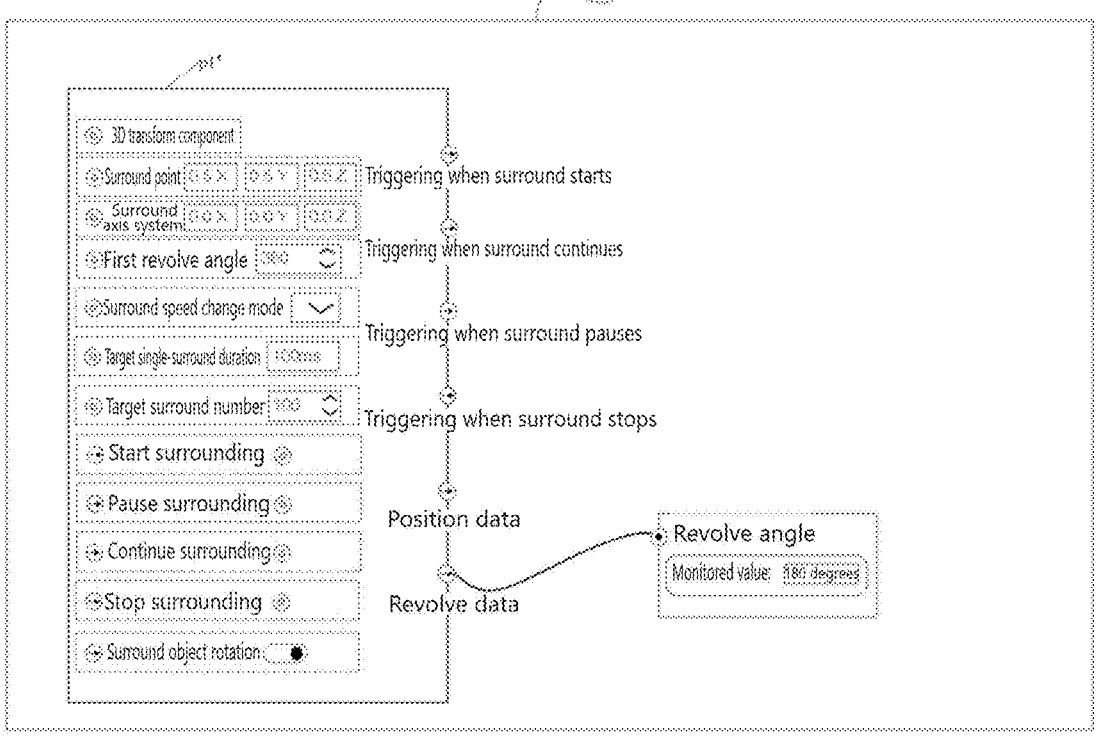

The functions and configurations of the start surrounding configuration item 207, the pause surrounding configuration item 208, the continue surrounding configuration item 209, and the stop surrounding configuration item 210 shown in FIGS. 13*a* and 13*b* are similar to those of the start surrounding configuration item 306, the pause surrounding configuration item 307, the continue surrounding configuration item 308, and the stop surrounding configuration item 309 described with reference to FIGS. 4*a* and 4*b*, so that they are not repeated herein.

Optionally, on the basis of the embodiment shown in FIG. 13*a*, the three-dimensional surrounding parameter configuration window 200 may further include: a surrounding object rotation configuration item 211. The surrounding object rotation configuration item 211 is used for receiving configuration information for controlling the surrounding object to rotate that is inputted by the user.

Referring to FIG. 13*a*, the surrounding object rotation configuration item 211 may include: a control 2111.

When the control 2111 is on, the surrounding object rotates simultaneously while surrounding around the surrounded point; and when the control 2111 is off, the surrounding object does not rotate while surrounding around the surrounded point.

Exemplarily, the situations of rotation and non-rotation of the surrounding object will be described below by the frames of the surrounding animation effect shown in FIGS. 14a to 14c.

Assuming that the control 2111 is off, the surrounding object will not rotate while revolving. Exemplarily, in conjunction with FIGS. 14a and 14b, a direction indicated by an arrow does not change, and a front of the surrounding object always faces forwards.

Assuming that the control 2111 is on, the surrounding object rotates while revolving. Exemplarily, in conjunction with FIGS. 14a and 14c, the direction indicated by the arrow changes, wherein the front of the surrounding object faces forwards in FIG. 14a, and the front of the surrounding object faces sideways in FIG. 14c.

In a practical application, the control 2111 can be set to be on or off in accordance with requirements.

In some cases, the surrounding object rotation configuration item 211 may include: a visualized input port 2112. The input port 2112 is used for receiving configuration information for the rotation of the surrounding object that is delivered by other module or components.

Exemplarily, referring to FIG. 13b, an interaction interface of a numeric value comparison module m8' is connected with an input port 2112 by a line, so that the interaction interface of the numeric value comparison module m8' can deliver a numeric value comparison result of values A and B to the input port 2112, to configure that the surrounding object rotation to be on or off in accordance with the numeric value comparison result.

And in a practical application, the component or module connected with the input port 2112 may also be connected with one or more modules or components, and acquire data or a trigger signal, or the like from the connected module or component. For example, as shown in FIG. 13b, the numeric value comparison module m8' is further connected with a random-number generation module, so that the random-number generation module delivers a generated random number to the numeric value comparison module m8', and the numeric value comparison module m8' configures the random number to a numeric value A, and then compares the random number with a numeric value B inputted by the user by operating an input box, thereby acquiring a numeric value comparison result.

It should be noted that the above configuration items 201 to 211 may respectively include one input port or a plurality of input ports.

In some cases, a plurality of surrounding objects may be associated with each other. Therefore, some visualized output ports may also be included in the three-dimensional surrounding parameter configuration window corresponding to the surrounding object. For example, a start-surrounding trigger configuration item, a pause-surrounding trigger configuration item, a continue-surrounding trigger configuration item, a stop-surrounding trigger configuration item, a position data output configuration item, a revolve data output configuration item, and the like.

Correspondingly, if the user inputs a configuration operation for a second target configuration item, the configuration file corresponding to the target two-dimensional surrounding animation effect may further include configuration information of the second target configuration item. The second target configuration item may comprise one or more of a start-surrounding trigger configuration item, a pause-surrounding trigger configuration item, a continue-surrounding trigger configuration item, and a stop-surrounding trigger configuration item.

If the user inputs a configuration operation for the position data output configuration item and/or the revolve data output configuration item, the configuration file for the target three-dimensional surrounding animation effect may further include configuration information of the position data output configuration item and/or the revolve data output configuration item.

The functions and configurations of the start-surrounding trigger configuration item 212, the pause-surrounding trigger configuration item 213, the continue-surrounding trigger configuration item 214, the stop-surrounding trigger configuration item 215, the position data output configuration item 216, and the revolve data output configuration item 217 shown in FIG. 15 and FIGS. 16a to 16f are similar to those of the corresponding configuration items described with reference to FIGS. 6a to 6g, so that they are not repeated herein.

Figure 17:
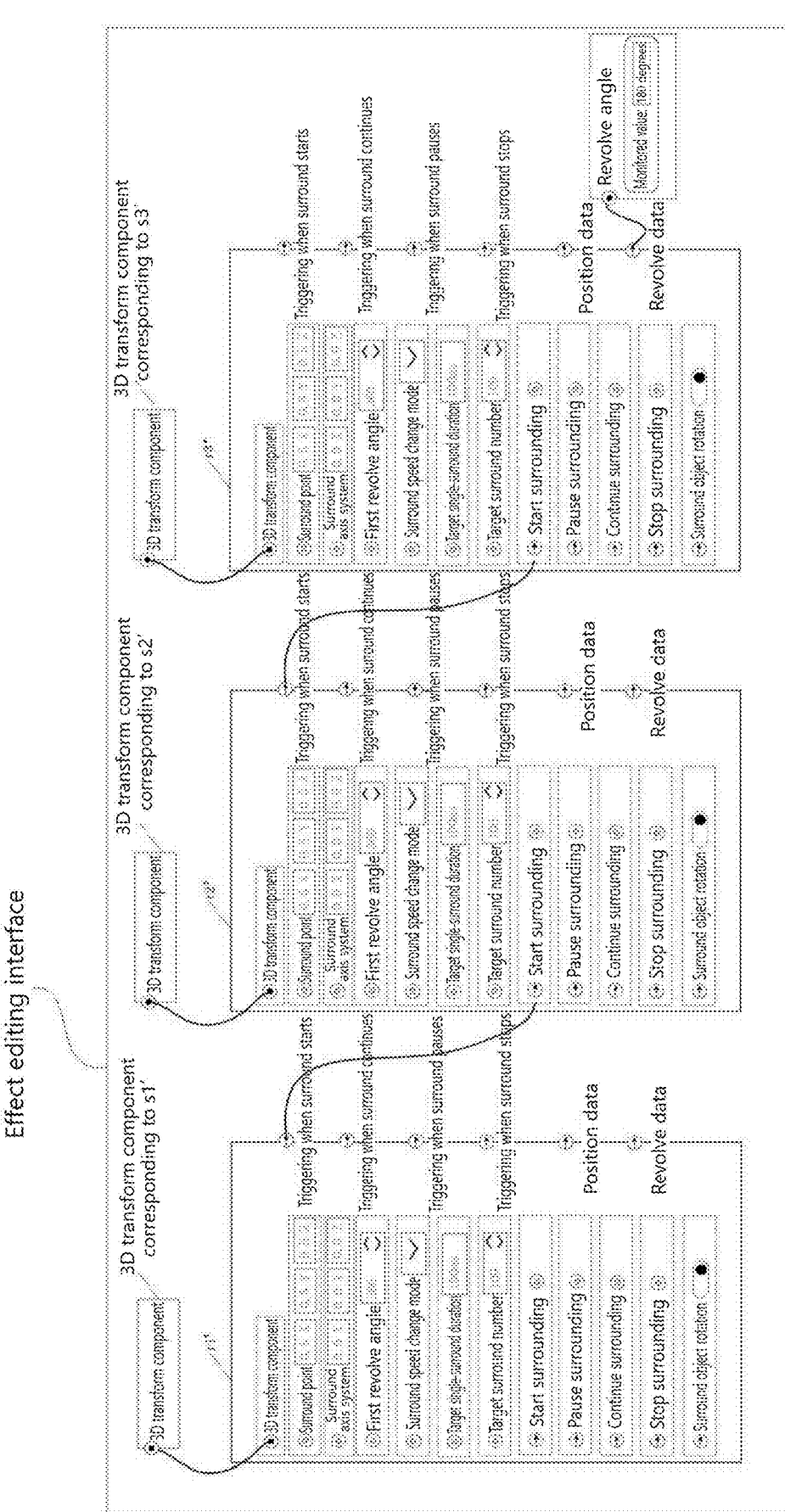
FIG. 17 is a schematic diagram of a three-dimensional surrounding parameter configuration window in accordance with the present disclosure.

FIG. 17 is a schematic structural diagram wherein three-dimensional surrounding parameter configuration windows of a plurality of surrounding objects are sequentially associated in accordance with an embodiment of the present disclosure. The schematic structural diagram of FIG. 17 is similar to that of FIG. 7, so that it is not repeated herein.

Figure 18:
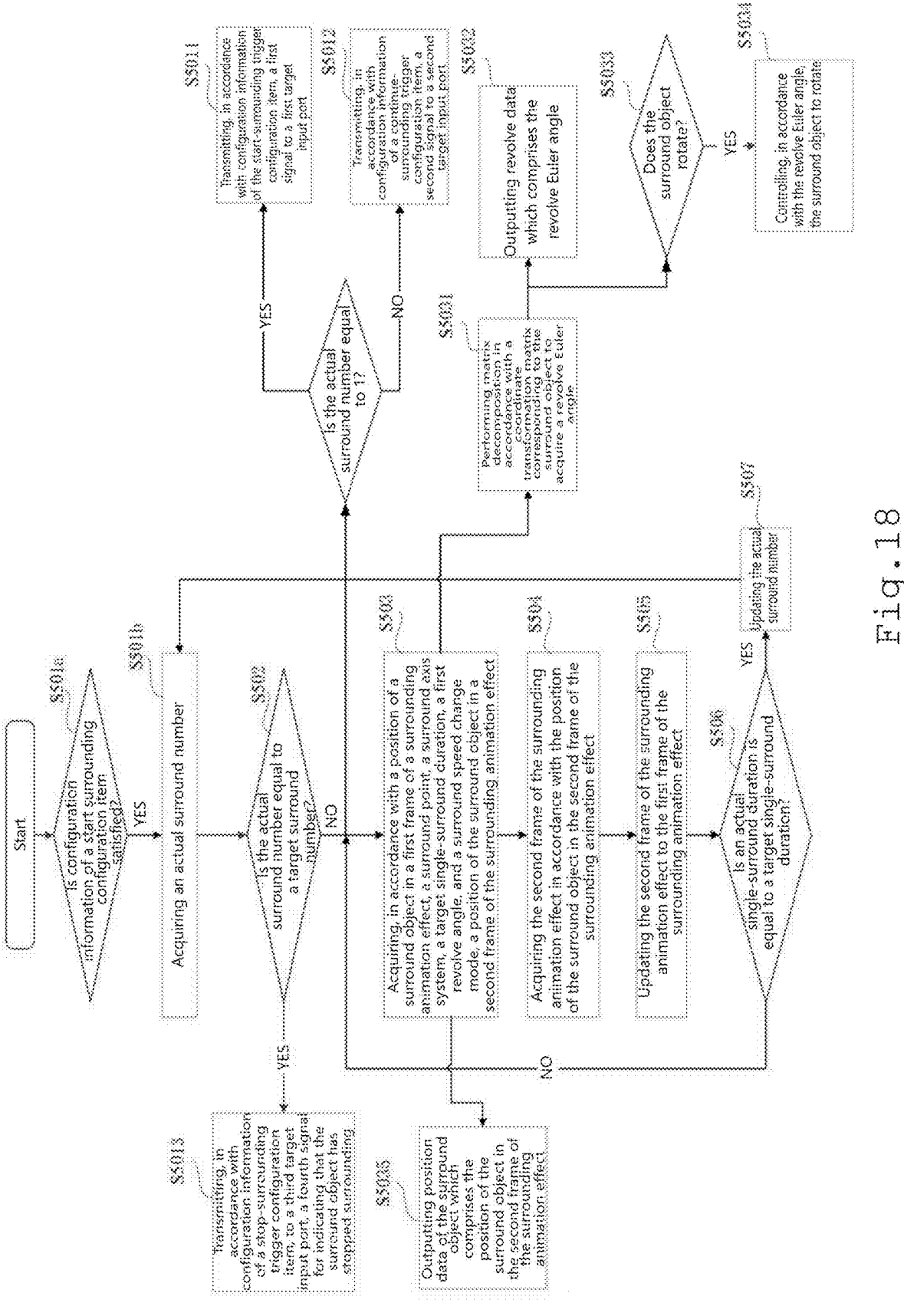
FIG. 18 is a flowchart of a method for processing a surrounding animation effect in accordance with another embodiment of the present disclosure.

FIG. 18 is a flowchart of a control principle of a target three-dimensional surrounding animation effect in accordance with an embodiment of the present disclosure. Except for the steps S503 and S5031 to S5034, steps in the flowchart shown in FIG. 18 are similar to those in the flowchart shown in FIG. 8, so that they are not repeated herein.

S503: acquiring, in accordance with a position of a surrounding object in a first frame of a surrounding animation effect, a surrounded point, a surrounding axis system, a target single-surrounding duration, a first revolve angle, and a surrounding speed change mode, a position of the surrounding object in a second frame of the surrounding animation effect.

Herein, the first frame of the surrounding animation effect and the second frame of the surrounding animation effect are two adjacent frames of the surrounding animation effect, and the first frame of the surrounding animation effect precedes the second frame of the surrounding animation effect; and an initial value of the position of the surrounding object in the first frame of the surrounding animation effect is a position of the surrounding object set when the surrounding object is acquired.

Herein, the position of the surrounding object set when the surrounding object is acquired may also be referred to as an initial position of the surrounding object. Optionally, the initial position of the surrounding object may be acquired by a component for bearing attribute information of the surrounding object in a 3D transform component for the surrounding object.

A possible implementation may include the following steps:

first, performing calculation in accordance with the target single-surrounding duration, the first revolve angle, the surrounding speed change mode, and a time difference between the first frame of the surrounding animation effect and the second frame of the surrounding animation effect, to acquire a second revolve angle. Herein, the second revolve angle refers to an angle at which the surrounding object needs to revolve when the first frame of the surrounding animation effect is updated to the second frame of the surrounding animation effect.

Next, acquiring the position of the surrounding object in the second frame of the surrounding animation effect in accordance with the surrounded point, the surrounding axis system, and the second revolve angle. Specifically, calculation is performed in accordance with the surrounded point, the surrounding axis system, and the second revolve angle to acquire a coordinate transformation matrix, and the position of the surrounding object in the second frame of the surrounding animation effect can be acquired in accordance with the position of the surrounding object in the first frame of the surrounding animation effect and the coordinate transformation matrix.

Hereinafter, exemplarily, a detailed description is made by a coordinate system shown in FIG. 19.

Figure 19:
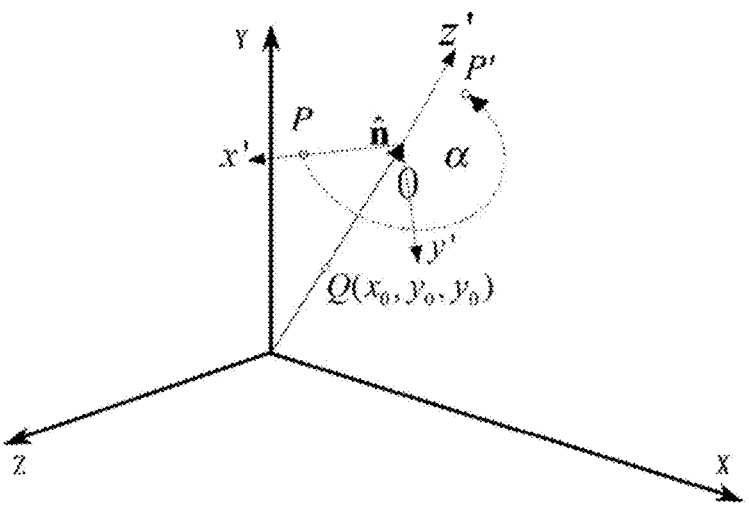
FIG. 19 is a schematic diagram of a position change of a surrounding object in a coordinate system in accordance with the present disclosure.

Referring to FIG. 19, two coordinate systems are included, which are an XYZ coordinate system and an x'y'z' coordinate system, respectively.

The XYZ coordinate system is a world coordinate system which can be understood as an imaginary coordinate system and is a three-dimensional coordinate system that does not change once specified in the process of making the three-dimensional surrounding animation effect.

The x'y'z' coordinate system is a three-dimensional coordinate system established in accordance with a first revolve plane where the surrounding object is located, a surrounding axis system, and a position (point P) of the surrounding object in a first frame of the surrounding animation effect. Referring to FIG. 19, z'-axis is a surrounding axis system, x'Oy' is the first revolve plane, and a positive direction of x'-axis is a direction from an actual revolve center, point O, to the position, point P, of the surrounding object in the first frame of the surrounding animation effect, and y'-axis is a direction perpendicular to the x'-axis and the z'-axis.

Referring to the x'y'z' coordinate system shown in FIG. 19, it can be seen that the surrounding object, in the x'y'z' coordinate system, revolves on the x'Oy' plane with the point O as the actual revolve center. And the surrounding object revolves from the point P to a point P' within unit time dt.

The unit time dt mentioned herein is the above-described time difference between the first frame of the surrounding animation effect and the second frame of the surrounding animation effect; and the revolve angle of the surrounding object within the unit time dt is α, which is the second revolve angle described above.

The second revolve angle α can be acquired by calculation by using a Bezier curve formula, in accordance with a curve type corresponding to the surrounding speed change mode configured by the surrounding speed change mode configuration item, the target single-surrounding duration, and the first revolve angle. Of course, in a practical application, it is not limited to use the Bezier curve formula, and another curve capable of performing smooth speed change control may be also used.

Referring to FIG. 19 continually, a unit vector of the surrounding axis system is $$\overset{r}{n} = (n_x, n_y, n_z),$$

and satisfies $n_x{}^2 + n_y{}^2 + n_z{}^2 = 1$. $n_x$ represents a component of a unit vector $$\overset{r}{n}$$

of the surrounding axis system on an X-axis; $n_y$ represents a component of the unit vector $$\overset{r}{n}$$

of the surrounding axis system on a Y-axis; and $n_z$ represents a component of the unit vector $$\overset{r}{n}$$

of the surrounding axis system on a Z-axis.

A line equation for the surrounding axis system n in the plane coordinate system is shown in formula (1):

$$x = x_0 + n_x k \qquad\qquad \text{Formula (1)}$$
$$y = y_0 + n_y k$$
$$z = z_0 + n_z k$$

In the formula (1), k is an independent variable. $x_0$, $y_0$, and $z_0$ are coordinate values of the surrounded point Q in the XYZ coordinate system.

A first surrounding plane where an arc PP' is located satisfies a formula (2) as follows:

$$n_x(x - P_x) + n_y(y - P_y) + n_z(z - P_z) = 0 \qquad \text{Formula (2)}$$

$P_x$ represents a coordinate of the point P on the X-axis; $P_y$ represents a coordinate of the point P on the Y-axis; and $P_z$ represents a coordinate of the point P on the Z-axis.

In accordance with the formulas (1) and (2), formula (3) can be obtained as follows:

$$k_0 = n_x(P_x - x_0) + n_y(P_y - y_0) + n_z(P_z - z_0) \qquad \text{Formula (3)}$$

Assuming that a coordinate of the actual revolve center, point O, in the XYZ coordinate system is $(x_c, y_c, z_c)$. The formula (3) is substituted into the formula (1), so that the actual revolve center, point O, satisfies formula (4) in the XYZ coordinate system:

$$x_c = x_0 + n_x k_0 \qquad\qquad \text{Formula (4)}$$
$$y_c = y_0 + n_y k_0$$
$$z_c = z_0 + n_z k_0$$

In the formula (4), $k_0$ is a constant.

A revolve radius r of the surrounding object in the first revolve plane satisfies formula (5):

$$r = \sqrt{(P_x - x_c)^2 + (P_y - y_c)^2 + (P_z - z_c)^2} \qquad \text{Formula (5)}$$

The unit vector $\overrightarrow{QP}$ satisfies formula (6) as follows:

$$\overline{QP} = \frac{[(P_x - x_c) \ (P_y - y_c) \ (P_z - z_c)]^T}{r} \qquad \text{Formula (6)}$$

On the basis of the above formulas (1) to (6), a revolve transformation matrix from the x'y'z' coordinate system to the XYZ coordinate system satisfies formula (7):

$$R_{3*3} = \begin{bmatrix} R_{11} & R_{12} & R_{13} \\ R_{21} & R_{22} & R_{23} \end{bmatrix} = \begin{bmatrix} \overline{QP} & [n_x \ n_y \ n_z]^T * \overline{QP} & \overline{n} \end{bmatrix} \qquad \text{Formula (7)}$$

The point P' satisfies formula (8) in the x'y'z' coordinate system:

$$x_t = r \cos(\alpha) \qquad \text{Formula (8)}$$

$$y_t = r \sin(\alpha)$$

$$z_t = 0$$

In the formula (8), $x_t$ represents a coordinate of the point P' on the x'-axis; $y_t$ represents a coordinate of the P' point on the y'-axis; and $z_t$ represents a coordinate of the P' point on the z'-axis.

A homogeneous transformation is performed on the formula (8), so that the transformation of the point P' from the coordinate in the x'y'z' coordinate system to the coordinate in the XYZ coordinate system satisfies formula (9):

$$\begin{bmatrix} P'_x \\ P'_y \\ P'_z \\ 1 \end{bmatrix} = T_{4*4} \begin{bmatrix} x_t \\ y_t \\ z_t \\ 1 \end{bmatrix} \qquad \text{Formula (9)}$$

In the formula (9), $$P'_x$$

represents a coordinate of the point P' on the X-axis;

$$P'_y$$

represents a coordinate of the point P' on the Y-axis;

$$P'_z$$

represents a coordinate of the point P' on the Z-axis; and $T_{4*4}$ represents a coordinate transformation matrix.

Herein, the coordinate transformation matrix $T_{4*4}$ satisfies formula (10):

$$T_{4*4} = \begin{bmatrix} R_{11} & R_{12} & R_{13} & x_c \\ R_{21} & R_{22} & R_{23} & y_c \\ R_{31} & R_{32} & R_{33} & z_c \\ 0 & 0 & 0 & 1 \end{bmatrix} \qquad \text{Formula (10)}$$

Optionally, in the above process, after the step S503 is performed, the following steps may be further included:

S5031: performing matrix decomposition in accordance with the coordinate transformation matrix corresponding to the surrounding object to acquire a revolve Euler angle.

S5032: outputting revolve data which comprises the revolve Euler angle.

Specifically, the revolve data of the surrounding object is delivered to a fourth target input port.

The fourth target input port is a port connected with a revolve data output configuration item associated with the surrounding object in an effect editing interface.

S5033: determining whether the surrounding object rotates. If the surrounding object rotates, S5034 is performed.

S5034: controlling, in accordance with the revolve Euler angle, the surrounding object to rotate.

Specifically, it may be determined whether it is needed to control the surrounding object to rotate in the second frame of the surrounding animation effect in accordance with configuration information of a surrounding object rotation configuration item. If it is determined that the surrounding object needs to rotate, an angle at which the surrounding object rotates is the revolve Euler angle.

Exemplarily, the present disclosure provides an apparatus for processing the surrounding animation effect.

Figure 20:
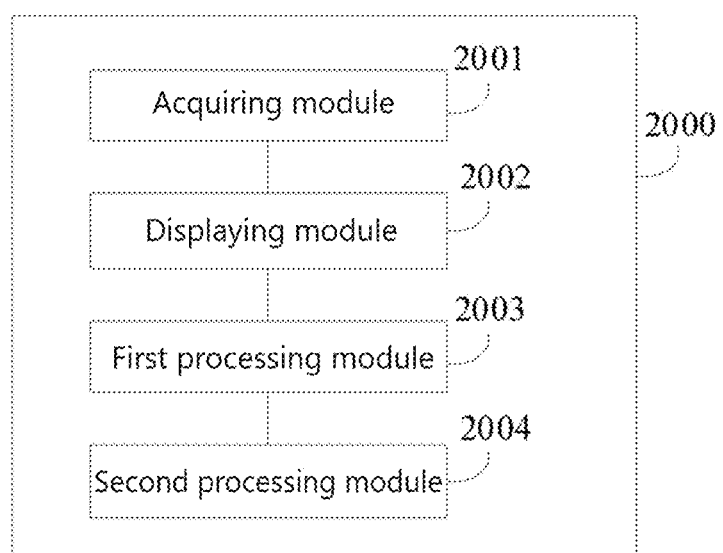
FIG. 20 is a schematic structural diagram of an apparatus for processing a surrounding animation effect in accordance with an embodiment of the present disclosure.

FIG. 20 is a schematic structural diagram of an apparatus for processing the surrounding animation effect in accordance with an embodiment of the present disclosure. Referring to FIG. 20, the apparatus 2000 for processing the surrounding animation effect provided by this embodiment comprises:

an acquiring module 2001 configured to acquire a surrounding object;

a displaying module 2002 configured to display a three-dimensional surrounding parameter configuration window;

a first processing module 2003 configured to associate the surrounding object with the three-dimensional surrounding parameter configuration window; wherein the three-dimensional surrounding parameter configuration window comprises a plurality of configuration items for generating a three-dimensional surrounding animation effect; and to generate a configuration file for a target three-dimensional surrounding animation effect in accordance with configuration information of the plurality of configuration items, wherein the target three-dimensional surrounding animation effect is an animation effect that the surrounding object surrounds in a three-dimensional space.

The apparatus provided by this embodiment may be used for implementing the technical solutions in FIG. 11 and FIG. 18, and has the similar implementation principle and technical effects, so that reference may be made to the detailed description in the foregoing method embodiments, and they are not repeated herein for brevity.

Figure 21:
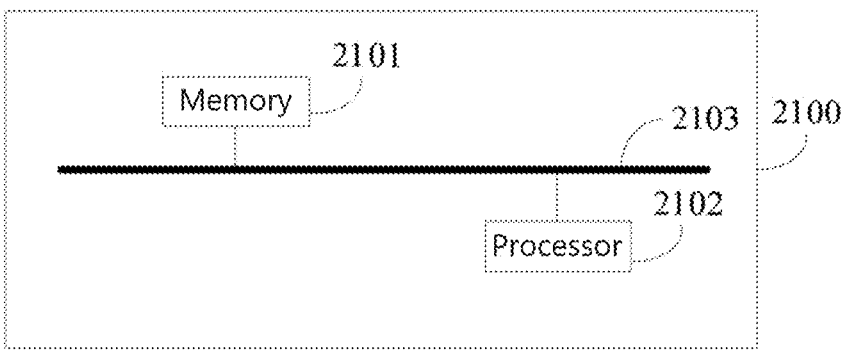
FIG. 21 is a schematic structural diagram of an electronic device in accordance with another embodiment of the present disclosure.

FIG. 21 is a schematic structural diagram of an electronic device in accordance with an embodiment of the present disclosure. Referring to FIG. 21, the electronic device 2100 provided by this embodiment comprises: a memory 2101, and a processor 2102.

The memory 2101 may be a separate physical unit, which may be connected with the processor 2102 via a bus 2103. The memory 2101 and the processor 2102 may also be integrated together, implemented by hardware, or the like.

The memory 2101 is configured to store program instructions, which are called by the processor 2102 to perform the technical solution in accordance with any of the above method embodiments.

Optionally, when part or all of the method of the above embodiments is implemented by software, the above electronic device 2100 may only include the processor 2102. The memory 2101 configured to store programs is located outside the electronic device 2100, and the processor 2102, which is connected with the memory by a circuit/wire, is configured to read and execute the programs stored in the memory.

The processor 2102 may be a central processing unit (CPU), a network processor (NP), or a combination of the CPU and the NP.

The processor 2102 may further include a hardware chip. The above hardware chip may be an application-specific integrated circuit (ASIC), a programmable logic device (PLD), or a combination thereof. The above PLD may be a complex programmable logic device (CPLD), a field-programmable gate array (FPGA), a generic array logic (GAL), or any combination thereof.

The memory 2101 may include a volatile memory, for example, a random-access memory (RAM); the memory may also include a non-volatile memory, for example, a flash memory, a hard disk drive (HDD) or a solid-state drive (SSD); and the memory may also include a combination of the above types of memories.

The present disclosure further provides a non-transitory computer-readable storage medium comprising computer program instructions which, when executed by at least one processor of an electronic device, perform the technical solution in accordance with any of the above method embodiments.

The present disclosure further provides a computer program product comprising a computer program, wherein the computer program is stored in a readable storage medium; at least one processor of the electronic device can read the computer program from the readable storage medium, and execute the computer program to cause the electronic device to perform the technical solution in accordance with any of the above method embodiments.

The present disclosure further provides a computer program which, when executed by a processor, implements the technical solution in accordance with any of the above method embodiments.

It should be noted that, relational terms such as "first" and "second", herein, are only used for distinguishing one entity or operation from another entity or operation without necessarily requiring or implying any such actual relation or order between these entities or operations. Moreover, the term "comprise", "include", or any other variation thereof, is intended to encompass a non-exclusive inclusion, such that a process, method, article, or device including a list of elements includes not only those elements but also other elements not expressly listed, or elements inherent to such a process, method, article, or device. Without more limitations, an element defined by a statement "including one . . . " does not exclude the presence of another identical element in the process, method, article, or device that includes the element.

The above contents are only specific implementations of the present disclosure, which enable those skilled in the art to understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to these embodiments described herein, but conform to the widest scope consistent with the principles and novel features disclosed herein.

What is claimed is:

1. A method for processing a surrounding animation effect, comprising:

acquiring a surrounding object;

displaying a surrounding parameter configuration window, and associating the surrounding object with the surrounding parameter configuration window; wherein the surrounding parameter configuration window comprises a plurality of configuration items for generating a surrounding animation effect;

generating a configuration file for the surrounding animation effect in accordance with configuration information of the plurality of configuration items; wherein the surrounding animation effect is an animation effect that the surrounding object surrounds a surrounded point on a two-dimensional plane with the surrounded point as a center; and updating a frame of the surrounding animation effect in accordance with the configuration file for the surrounding animation effect, wherein the plurality of configuration items comprise two or more of: a surrounded point configuration item, a first single-surrounding duration configuration item, a first revolve angle configuration item, a surrounding speed change mode configuration item, and a first surrounding number configuration item; wherein the first revolve angle is an angle at which the surrounding object revolves within the first single-surrounding duration, and the first surrounding number is a number of single surroundings that the surrounding object needs to complete.

2. The method according to claim 1, wherein the plurality of configuration items further comprise one or more of: a start surrounding configuration item, a pause surrounding configuration item, a continue surrounding configuration item, and a stop surrounding configuration item.

3. The method according to claim 2, further comprising:
before generating the configuration file for the surrounding animation effect in accordance with the configuration information of the plurality of configuration items, receiving a configuration operation for a first configuration item that is inputted by a user; and acquiring configuration information corresponding to the first configuration item in accordance with the configuration operation for the first configuration item; wherein the configuration file further comprises the configuration information corresponding to the first configuration item, wherein, the first configuration item comprises one or more of the start surrounding configuration item, the pause surrounding configuration item, the continue surrounding configuration item, and the stop surrounding configuration item.

4. The method according to claim 1, wherein the plurality of configuration items further comprise one or more of: a start-surrounding trigger configuration item, a pause-surrounding trigger configuration item, a continue-surrounding trigger configuration item, a stop-surrounding trigger configuration item, a position data output configuration item, and a revolve data output configuration item.

5. The method according to claim 4, further comprising:
before generating the configuration file for the surrounding animation effect in accordance with the configuration information of the plurality of configuration items, receiving a configuration operation for a second configuration item that is inputted by a user; and acquiring configuration information corresponding to the second configuration item in accordance with the configuration operation for the second configuration item; wherein the configuration file further comprises the configuration information of the second configuration item;

wherein, the second configuration item comprises one or more of the start-surrounding trigger configuration item, the pause-surrounding trigger configuration item, the continue-surrounding trigger configuration item, and the stop-surrounding trigger configuration item.

6. The method according to claim 1, wherein updating the frame of the surrounding animation effect in accordance with the configuration file for the surrounding animation effect comprises:

acquiring, in accordance with the configuration file for the surrounding animation effect and a position of the surrounding object in a first frame of the surrounding animation effect, a position of the surrounding object in a second frame of the surrounding animation effect, wherein the first frame of the surrounding animation effect precedes the second frame of the surrounding animation effect.

7. The method according to claim 6, wherein acquiring, in accordance with the configuration file for the surrounding animation effect and the position of the surrounding object in the first frame of the surrounding animation effect, the position of the surrounding object in the second frame of the surrounding animation effect comprises:

step (a): acquiring an actual surrounding number of the surrounding object, and determining whether the actual surrounding number is equal to a first surrounding number configured by the first surrounding number configuration item;

step (b): if the actual surrounding number is less than the first surrounding number, acquiring, in accordance with the position of the surrounding object in the first frame of the surrounding animation effect, and the configuration information of the surrounded point configuration item, the first single-surrounding duration configuration item, the first revolve angle configuration item, and the surrounding speed change mode configuration item, the position of the surrounding object in the second frame of the surrounding animation effect, wherein the first frame of the surrounding animation effect and the second frame of the surrounding animation effect are two adjacent frames of the surrounding animation effect; and an initial value of the position of the surrounding object in the first frame of the surrounding animation effect is a position of the surrounding object set when the surrounding object is acquired;

step (c): acquiring the second frame of the surrounding animation effect in accordance with the position of the surrounding object in the second frame of the surrounding animation effect; and step (d): updating the second frame of the surrounding animation effect to the first frame of the surrounding animation effect;

wherein the steps (a) to (d) are repeatedly performed until the actual surrounding number is equal to the first surrounding number.

8. The method according to claim 7, further comprising: after updating the second frame of the surrounding animation effect to the first frame of the surrounding animation effect, acquiring an actual single-surrounding duration of the surrounding object;

updating the actual surrounding number if the actual single-surrounding duration is equal to the first single-surrounding duration; and not updating the actual surrounding number if the actual single surrounding duration is less than the first single-surrounding duration.

9. The method according to claim 7, wherein acquiring, in accordance with the position of the surrounding object in the first frame of the surrounding animation effect, and the configuration information of the surrounded point configuration item, the first single-surrounding duration configuration item, the first revolve angle configuration item, and the surrounding speed change mode configuration item, the position of the surrounding object in the second frame of the surrounding animation effect comprises:

acquiring a time difference between the first frame of the surrounding animation effect and the second frame of the surrounding animation effect;

acquiring a second revolve angle in accordance with the configuration information of the first single-surrounding duration configuration item, the configuration information of the first revolve angle configuration item, the configuration information of the surrounding speed change mode configuration item, and the time difference;

acquiring a coordinate transformation matrix in accordance with the position of the surrounding object in the first frame of the surrounding animation effect, the configuration information of the surrounded point configuration item, and the second revolve angle; and acquiring the position of the surrounding object in the second frame of the surrounding animation effect in accordance with the coordinate transformation matrix and the position of the surrounding object in the first frame of the surrounding animation effect.

10. The method according to claim 9, wherein, if the configuration file comprises configuration information of a surrounding object rotation configuration item, and the configuration information of the rotation configuration item indicates the surrounding object to rotate, the method further comprises:

controlling the surrounding object to rotate in the second frame of the surrounding animation effect in accordance with the coordinate transformation matrix.

11. The method according to claim 2, wherein if the configuration file comprises configuration information of the pause surrounding configuration item, the method further comprises:

during the configuration file being run, when it is detected that the configuration information of the pause surrounding configuration item is satisfied, controlling the surrounding object to pause surrounding.

12. The method according to claim 11, wherein if the configuration file comprises configuration information of the continue surrounding configuration item, the method further comprises:

during the configuration file being run, when it is detected that the configuration information of the continue surrounding configuration item is satisfied, controlling the surrounding object to continue surrounding from a pause position; wherein the pause position is a position where the surrounding object is paused surrounding.

13. The method according to claim 2, wherein if the configuration file comprises configuration information of the stop surrounding configuration item, the method further comprises:

during the configuration file being run, when it is detected that the configuration information of the stop surrounding configuration item is satisfied, controlling the surrounding object to stop surrounding and restore to a position of the surrounding object set when the surrounding object is acquired.

14. The method according to claim 5, wherein if the configuration file comprises the configuration information of the second configuration item, the method further comprises:

during the configuration file being run, if it is detected that the configuration information of the second configuration item is satisfied, outputting a signal which corresponds to the second configuration item, wherein if the second configuration item comprises the start-surrounding trigger configuration item, the signal comprises a signal which indicates that the surrounding object has started surrounding;

if the second configuration item comprises the pause-surrounding trigger configuration item, the signal comprises a signal which indicates that the surrounding object has paused surrounding;

if the second configuration item comprises the continue-surrounding trigger configuration item, the signal comprises a signal which indicates that the surrounding object has continued surrounding; or if the second configuration item comprises the stop-surrounding trigger configuration item, the signal comprises a signal which indicates that the surrounding object has stopped surrounding.

15. The method according to claim 6, wherein if the configuration file comprises configuration information of a position data output configuration item, the method further comprises:

outputting position data of the surrounding object in accordance with the configuration information of the position data output configuration item, wherein the position data comprises the position of the surrounding object in the first frame of the surrounding animation effect.

16. An electronic device, comprising: a memory and a processor, wherein the memory is configured to store computer program instructions; and the processor is configured to execute the computer program instructions to implement the method for processing the surrounding animation effect according to claim 1.

17. A non-transitory readable storage medium, comprising: computer program instructions, wherein the computer program instructions, when executed by at least one processor of an electronic device, implement following operations for processing a surrounding animation effect:

acquiring a surrounding object;

displaying a surrounding parameter configuration window, and associating the surrounding object with the surrounding parameter configuration window; wherein the surrounding parameter configuration window comprises a plurality of configuration items for generating a surrounding animation effect;

generating a configuration file for the surrounding animation effect in accordance with configuration information of the plurality of configuration items; wherein the surrounding animation effect is an animation effect that the surrounding object surrounds a surrounded point on a two-dimensional plane with the surrounded point as a center; and updating a frame of the surrounding animation effect in accordance with the configuration file for the surrounding animation effect, wherein the plurality of configuration items comprise two or more of: a surrounded point configuration item, a first single-surrounding duration configuration item, a first revolve angle configuration item, a surrounding speed change mode configuration item, and a first surrounding number configuration item; wherein the first revolve angle is an angle at which the surrounding object revolves within the first single-surrounding duration, and the first surrounding number is a number of single surroundings that the surrounding object needs to complete.

18. A method for processing a surrounding animation effect, comprising:

acquiring a surrounding object;

displaying a surrounding parameter configuration window, and associating the surrounding object with the surrounding parameter configuration window; wherein the surrounding parameter configuration window comprises a plurality of configuration items for generating a surrounding animation effect;

generating a configuration file for the surrounding animation effect in accordance with configuration information of the plurality of configuration items; wherein the surrounding animation effect is an animation effect that the surrounding object surrounds a surrounded point in a three-dimensional space with the surrounded point as a center; and updating a frame of the surrounding animation effect in accordance with the configuration file for the surrounding animation effect, wherein the plurality of configuration items comprise two or more of: a surrounded point configuration item, a first single-surrounding duration configuration item, a surrounding axis system configuration item, a first revolve angle configuration item, a surrounding speed change mode configuration item, and a first surrounding number configuration item; wherein the first revolve angle is an angle at which the surrounding object revolves within the first single-surrounding duration, and the first surrounding number is a number of single surroundings that the surrounding object needs to complete.

19. The method according to claim 18, wherein updating the frame of the surrounding animation effect in accordance with the configuration file for the surrounding animation effect comprises:

acquiring, in accordance with the configuration file for the surrounding animation effect and a position of the surrounding object in a first frame of the surrounding animation effect, a position of the surrounding object in a second frame of the surrounding animation effect, wherein the first frame of the surrounding animation effect precedes the second frame of the surrounding animation effect.

20. The method according to claim 19, wherein acquiring, in accordance with the configuration file for the surrounding animation effect and the position of the surrounding object in the first frame of the surrounding animation effect, the position of the surrounding object in the second frame of the surrounding animation effect comprises:

step (a): acquiring an actual surrounding number of the surrounding object, and determining whether the actual surrounding number is equal to a first surrounding number configured by the first surrounding number configuration item;

step (b): if the actual surrounding number is less than the first surrounding number, acquiring, in accordance with the position of the surrounding object in the first frame of the surrounding animation effect, and the configuration information of the surrounded point configuration item, the surrounding axis system configuration item, the first single-surrounding duration configuration item, the first revolve angle configuration item, and the surrounding speed change mode configuration item, the position of the surrounding object in the second frame of the surrounding animation effect, wherein the first frame of the surrounding animation effect and the second frame of the surrounding animation effect are two adjacent frames of the surrounding animation effect; and an initial value of the position of the surrounding object in the first frame of the surrounding animation effect is a position of the surrounding object set when the surrounding object is acquired;

step (c): acquiring the second frame of the surrounding animation effect in accordance with the position of the surrounding object in the second frame of the surrounding animation effect; and step (d): updating the second frame of the surrounding animation effect to the first frame of the surrounding animation effect;

wherein the steps (a) to (d) are repeatedly performed until the actual surrounding number is equal to the first surrounding number.

* * * * *